US011920403B2

(12) United States Patent
Bernhagen et al.

(10) Patent No.: US 11,920,403 B2
(45) Date of Patent: Mar. 5, 2024

(54) SLIDING AND PIVOT FENESTRATION UNIT

(71) Applicant: Pella Corporation, Pella, IA (US)

(72) Inventors: Todd A. Bernhagen, Pella, IA (US); Nathan R. Erickson, Altoona, IA (US); Paul D. Schroder, Pella, IA (US)

(73) Assignee: Pella Corporation, Pella, IA (US)

( * ) Notice: Subject to any disclaimer, the term of this patent is extended or adjusted under 35 U.S.C. 154(b) by 917 days.

(21) Appl. No.: 16/736,143

(22) Filed: Jan. 7, 2020

(65) Prior Publication Data

US 2020/0217124 A1 Jul. 9, 2020

Related U.S. Application Data

(60) Provisional application No. 62/790,381, filed on Jan. 9, 2019.

(51) Int. Cl.

*E06B 3/50* (2006.01)
*E05D 15/58* (2006.01)
*E06B 1/04* (2006.01)
*E06B 1/70* (2006.01)

(52) U.S. Cl.

CPC ............ *E06B 3/5072* (2013.01); *E05D 15/58* (2013.01); *E06B 1/04* (2013.01); *E06B 1/70* (2013.01)

(58) Field of Classification Search

CPC . E06B 3/5072; E05D 15/58; E05D 2015/485; E05D 2015/585; E05D 2015/586

See application file for complete search history.

(56) References Cited

U.S. PATENT DOCUMENTS

| | | | | | |
|---|---|---|---|---|---|
| 782,139 | A * | 2/1905 | Jones | E06B 3/5072 49/257 |
| 2,317,312 | A | 4/1943 | Swanson et al. | |
| 2,680,268 | A | 6/1954 | Rutherford | |
| 3,041,680 | A * | 7/1962 | Gurniak | E06B 3/50 49/152 |

(Continued)

FOREIGN PATENT DOCUMENTS

| | | | |
|---|---|---|---|
| CA | 2969055 | A1 | 6/2016 |
| DE | 2912256 | A1 * | 10/1980 |

(Continued)

OTHER PUBLICATIONS

Hoppe. "Parallel-Retract and Slide," product brochure, available at least as early as Dec. 12, 2017, 2 pages.

(Continued)

*Primary Examiner* — Catherine A Kelly
(74) *Attorney, Agent, or Firm* — FAEGRE DRINKER BIDDLE & REATH

(57) ABSTRACT

A fenestration unit is disclosed. In various examples, the fenestration unit includes a plurality of panels, including first and second panels. In some examples, one or more of the plurality of panels is configured to slide relative to a frame of the fenestration unit to provide an opening in the fenestration unit. In various examples, each of the first and second panels are also configured to be pivoted relative to the frame such that the first and second panels can be hinged or otherwise pivoted open to increase the size of the opening in the fenestration unit.

13 Claims, 43 Drawing Sheets

(56) References Cited

U.S. PATENT DOCUMENTS

| | | | | | |
|---|---|---|---|---|---|
| 3,303,612 | A | * | 2/1967 | Baker | E05D 15/58 49/127 |
| 3,810,330 | A | * | 5/1974 | Daggy | E05D 15/58 49/404 |
| 4,324,072 | A | | 4/1982 | Sterner, Jr. | |
| 4,384,429 | A | | 5/1983 | Rokicki et al. | |
| 4,570,381 | A | | 2/1986 | Sterner, Jr. | |
| 4,603,452 | A | | 8/1986 | Paciorek | |
| 4,619,074 | A | * | 10/1986 | Leung | E05D 15/58 49/165 |
| 4,682,455 | A | * | 7/1987 | Klompenburg | E05D 15/58 49/181 |
| 5,058,321 | A | * | 10/1991 | Harbom | E05D 15/58 49/177 |
| 5,131,449 | A | | 7/1992 | Winn et al. | |
| 5,153,034 | A | | 10/1992 | Telchuk et al. | |
| 5,394,648 | A | * | 3/1995 | Kordes | E05D 15/48 49/177 |
| 5,448,858 | A | * | 9/1995 | Briggs | E05D 15/0604 49/453 |
| 5,486,026 | A | * | 1/1996 | Borgardt | E05B 65/0876 49/141 |
| 5,548,926 | A | * | 8/1996 | Sjoholm | E06B 3/922 49/125 |
| 5,596,842 | A | * | 1/1997 | Sjoholm | E05D 15/58 49/177 |
| 5,832,980 | A | * | 11/1998 | Cianciolo | E05D 15/58 160/197 |
| 5,927,014 | A | * | 7/1999 | Goldenberg | E05D 13/08 49/184 |
| 5,996,282 | A | | 12/1999 | Giovannetti | |
| 6,052,867 | A | | 4/2000 | Haab et al. | |
| 6,142,082 | A | | 11/2000 | Burke et al. | |
| 6,148,896 | A | | 11/2000 | Pinto et al. | |
| 6,167,936 | B1 | | 1/2001 | Stover et al. | |
| 6,170,207 | B1 | | 1/2001 | Saindon | |
| 6,176,041 | B1 | | 1/2001 | Roberts | |
| 6,216,392 | B1 | | 4/2001 | DiGinosa | |
| 6,233,888 | B1 | * | 5/2001 | Wu | E05D 15/58 49/504 |
| 6,238,374 | B1 | | 5/2001 | Winkler | |
| 6,276,092 | B1 | * | 8/2001 | Neo | E05D 15/0604 49/176 |
| 6,336,246 | B1 | | 1/2002 | Giovannetti | |
| 6,374,456 | B1 | | 4/2002 | Fort et al. | |
| 6,405,781 | B2 | | 6/2002 | Davies et al. | |
| 6,446,696 | B1 | | 9/2002 | Davies et al. | |
| 6,454,320 | B1 | | 9/2002 | Weinerman et al. | |
| 6,470,947 | B1 | | 10/2002 | Holevas | |
| 6,497,072 | B2 | | 12/2002 | Fries | |
| 6,526,695 | B1 | * | 3/2003 | Nguyen | E05D 15/48 49/260 |
| 6,550,184 | B1 | * | 4/2003 | O'Donnell | E05D 15/22 49/176 |
| 6,618,994 | B1 | * | 9/2003 | Nussbaum | E05D 15/58 292/171 |
| 6,618,998 | B1 | | 9/2003 | Thomas et al. | |
| 6,826,867 | B1 | | 12/2004 | McDonald et al. | |
| 6,840,009 | B2 | | 1/2005 | Ronay et al. | |
| 6,860,064 | B2 | | 3/2005 | Bakalar | |
| 6,860,078 | B1 | | 3/2005 | Geisthardt | |
| 6,899,362 | B1 | | 5/2005 | Weinerman et al. | |
| 7,003,916 | B2 | | 2/2006 | Nestell et al. | |
| 7,124,538 | B1 | | 10/2006 | Kline | |
| 7,155,861 | B2 | | 1/2007 | Berry et al. | |
| 7,155,863 | B2 | | 1/2007 | Daniel et al. | |
| 7,219,470 | B2 | | 5/2007 | Lahnala | |
| 7,255,045 | B2 | | 8/2007 | Owens | |
| 7,451,802 | B2 | * | 11/2008 | Cianciolo | E05D 15/58 160/225 |
| 7,584,574 | B2 | | 9/2009 | Kinross et al. | |
| 7,610,718 | B2 | | 11/2009 | Kopish | |
| 7,647,728 | B2 | | 1/2010 | Bortoluzzi | |
| 7,647,729 | B2 | | 1/2010 | Polus | |
| 7,673,419 | B2 | | 3/2010 | Arimoto | |
| D616,566 | S | | 5/2010 | Desrosiers et al. | |
| D616,567 | S | | 5/2010 | Desrosiers et al. | |
| D616,568 | S | | 5/2010 | Desrosiers et al. | |
| 7,735,897 | B2 | | 6/2010 | Seiple et al. | |
| 7,819,167 | B2 | | 10/2010 | Morin | |
| 7,861,475 | B2 | * | 1/2011 | Sprague | E05B 65/0085 52/64 |
| 7,934,342 | B2 | | 5/2011 | Lahnala | |
| 7,963,070 | B2 | | 6/2011 | Recker | |
| 7,980,027 | B2 | | 7/2011 | Kraus et al. | |
| 8,065,779 | B2 | * | 11/2011 | Kuchas | E05D 15/58 16/81 |
| 8,112,954 | B2 | | 2/2012 | Gosling et al. | |
| 8,113,607 | B2 | | 2/2012 | Slager et al. | |
| 8,181,394 | B2 | | 5/2012 | Michaels | |
| 8,235,085 | B2 | | 8/2012 | Coleman et al. | |
| 8,261,500 | B2 | * | 9/2012 | Sprague | E04B 2/827 160/214 |
| 8,297,334 | B2 | | 10/2012 | Chu | |
| 8,375,645 | B2 | | 2/2013 | Wauchi et al. | |
| 8,375,646 | B2 | | 2/2013 | Newkirk et al. | |
| 8,381,443 | B2 | * | 2/2013 | Smith | E05D 15/48 49/141 |
| 8,381,444 | B1 | | 2/2013 | McDonald et al. | |
| 8,387,309 | B2 | | 3/2013 | Tseng | |
| 8,438,783 | B2 | | 5/2013 | Giovannetti | |
| 8,448,688 | B2 | | 5/2013 | Goodman et al. | |
| 8,479,798 | B2 | | 7/2013 | Goodman | |
| 8,496,038 | B2 | | 7/2013 | Kondash et al. | |
| 8,627,604 | B2 | | 1/2014 | Seymour et al. | |
| 8,665,582 | B2 | | 3/2014 | Robinson et al. | |
| 8,677,688 | B2 | | 3/2014 | Skibinski et al. | |
| 8,756,864 | B2 | * | 6/2014 | Hamaker | E05D 15/48 49/168 |
| 8,756,865 | B2 | * | 6/2014 | Nicholson | E05D 15/48 49/180 |
| 8,757,238 | B2 | | 6/2014 | Goodman et al. | |
| 8,826,964 | B2 | | 9/2014 | Goodman | |
| 8,905,500 | B2 | | 12/2014 | Larson et al. | |
| 8,919,860 | B2 | | 12/2014 | Thiele | |
| 8,950,114 | B1 | | 2/2015 | Groening | |
| 8,955,195 | B2 | | 2/2015 | Chang et al. | |
| 8,955,260 | B2 | | 2/2015 | Newkirk et al. | |
| 8,960,257 | B2 | | 2/2015 | Goodman | |
| 8,984,810 | B2 | | 3/2015 | Bortoluzzi et al. | |
| 9,016,762 | B2 | * | 4/2015 | Ojima | B60J 5/047 701/49 |
| 9,027,295 | B2 | | 5/2015 | Kopish et al. | |
| 9,074,420 | B2 | | 7/2015 | Goodman et al. | |
| 9,157,264 | B2 | | 10/2015 | Bortoluzzi et al. | |
| 9,200,860 | B1 | | 12/2015 | Groening | |
| 9,282,831 | B2 | | 3/2016 | Scibetta et al. | |
| D757,300 | S | | 5/2016 | Haberland et al. | |
| 9,416,576 | B2 | | 8/2016 | Andersson et al. | |
| 9,447,579 | B2 | | 9/2016 | Kopish et al. | |
| 9,470,028 | B2 | | 10/2016 | Header et al. | |
| 9,637,961 | B2 | | 5/2017 | Header et al. | |
| 9,663,980 | B2 | | 5/2017 | Bakalar | |
| 9,970,232 | B2 | | 5/2018 | Koenitz | |
| 10,077,588 | B1 | | 9/2018 | Header | |
| 10,415,289 | B2 | * | 9/2019 | Hailey | E05D 15/58 |
| 10,472,872 | B2 | * | 11/2019 | Ingram | E06B 3/509 |
| 10,526,831 | B2 | * | 1/2020 | Haworth | E05D 15/581 |
| 10,641,031 | B2 | | 5/2020 | Koenitz | |
| 10,822,863 | B2 | * | 11/2020 | Bernhagen | E06B 3/4609 |
| 11,286,709 | B2 | * | 3/2022 | Bernhagen | E05D 15/48 |
| 2001/0037613 | A1 | | 11/2001 | Owens | |
| 2003/0070363 | A1 | | 4/2003 | Bakalar | |
| 2003/0150165 | A1 | | 8/2003 | Ronay et al. | |
| 2005/0044798 | A1 | | 3/2005 | Daniel et al. | |
| 2006/0225357 | A1 | | 10/2006 | Bortoluzzi | |
| 2007/0062122 | A1 | | 3/2007 | Polus | |
| 2007/0261799 | A1 | | 11/2007 | Chu | |
| 2008/0078216 | A1 | | 4/2008 | Fleming | |
| 2008/0100093 | A1 | | 5/2008 | Seiple et al. | |
| 2008/0302016 | A1 | | 12/2008 | Halfon et al. | |
| 2008/0302021 | A1 | | 12/2008 | Gosling et al. | |

(56) References Cited

U.S. PATENT DOCUMENTS

| | | | |
|---|---|---|---|
| 2009/0126279 | A1 | 5/2009 | Kopish |
| 2010/0199563 | A1 | 8/2010 | Bortoluzzi |
| 2010/0205865 | A1 | 8/2010 | Iwauchi et al. |
| 2010/0212233 | A1 | 8/2010 | Robinson et al. |
| 2010/0281931 | A1 | 11/2010 | Slager et al. |
| 2010/0299871 | A1 | 12/2010 | Kondash et al. |
| 2011/0093095 | A1 | 4/2011 | Goodman et al. |
| 2011/0126463 | A1 | 6/2011 | Skibinski et al. |
| 2011/0185638 | A1 | 8/2011 | Giovannetti |
| 2011/0186249 | A1 | 8/2011 | Coleman et al. |
| 2012/0005960 | A1 | 1/2012 | Tseng |
| 2012/0043865 | A1 | 2/2012 | Newkirk et al. |
| 2013/0082582 | A1 | 4/2013 | Newkirk et al. |
| 2014/0013685 | A1 | 1/2014 | Coleman et al. |
| 2014/0182212 | A1 | 7/2014 | Bortoluzzi et al. |
| 2015/0376939 | A1 | 12/2015 | Bakalar |
| 2019/0323275 | A1 | 10/2019 | Stell |
| 2019/0338581 | A1 | 11/2019 | Bernhagen et al. |
| 2020/0002986 | A1 | 1/2020 | Smith |
| 2021/0131165 | A1 | 5/2021 | Bernhagen et al. |
| 2021/0222473 | A1 | 7/2021 | Procton et al. |
| 2021/0254394 | A1 | 8/2021 | Bernhagen et al. |

FOREIGN PATENT DOCUMENTS

| | | | | | |
|---|---|---|---|---|---|
| DE | 29614902 | U1 | * | 1/1998 | E05B 65/0876 |
| DE | 102010037604 | A1 | * | 9/2011 | E05D 15/063 |
| EP | 0605353 | A1 | | 7/1994 | |
| EP | 3315700 | A1 | * | 5/2018 | E05D 15/581 |
| FR | 3018306 | A1 | | 9/2015 | |
| FR | 3095224 | A1 | | 10/2020 | |
| WO | WO-2007068789 | A1 | * | 6/2007 | E04B 2/827 |

OTHER PUBLICATIONS

Omnitrack. "9820 Omnitrack High Capacity Ball transfer Unit," Revision 1, Jun. 22, 2012, 1 page. Retrieved from <URL:https://resources.omnitrack.com/files/pdf/9820_2D.pdf>.

* cited by examiner

SLIDING AND PIVOT FENESTRATION UNIT

CROSS REFERENCE TO RELATED APPLICATION

This application claims the benefit of Provisional Application No. 62/790,381, filed Jan. 9, 2019, which is herein incorporated by reference in its entirety.

TECHNICAL FIELD

Various aspects of the instant disclosure relate to fenestration products, such as sliding doors and windows. In some specific examples, the disclosure concerns sliding doors and windows with hinge access.

BACKGROUND

Traditionally, sliding fenestration units including doors and windows with sliding panels are configured to block part (e.g., about half for a two-panel unit) of their frame openings in an open position and to allow only part (e.g., about half for a two-panel unit) of their frame openings to be accessible for egress and ingress. In contrast, hinged fenestration units (e.g., entry doors) with rotating panels are configured to allow a substantial portion (e.g., above 90%) of their frame openings to be accessible for egress and ingress in an open position. Hinged panels, however, require more floor space than sliding panels to transition (e.g., swing) between the closed and open positions. It is desirable to have a fenestration unit configured to transition between operating as a sliding fenestration unit and operating as a hinged sliding fenestration unit.

SUMMARY

According to one example ("Example 1"), a fenestration unit includes a frame including a sill, a head opposite the sill, a first jamb, and a second jamb opposite the first jamb; and a first panel supported by the frame, the first panel including: a first rider coupled to the first panel and to the sill, the first rider being actuatable such that the first panel is decouplable from the sill; and a second rider coupled to the first panel and to the sill; wherein the first panel is operable to be translated laterally along the sill between the first and second jambs without pivoting relative to the frame, and wherein the first panel is operable to be pivoted relative to the frame while the second rider is coupled to the sill.

According to another example ("Example 2"), further to Example 1, the fenestration unit further includes a turntable rotatably coupled to the sill of the frame and configured to rotate relative to the sill as the first panel is pivoted relative to the frame.

According to another example ("Example 3"), further to Example 2, the turntable is configured to receive the second rider of the first panel such that the second rider remains coupled to the sill while the first panel is pivoted relative to the frame.

According to another example ("Example 4"), further to any of Examples 2 to 3, the turntable is part of a pivot assembly, the pivot assembly further comprising a hub having a hub channel configured to accommodate the second rider, the hub being fixed relative to the sill such that the turntable is operable to rotate relative to the hub and the hub channel.

According to another example ("Example 5"), further to any of Examples 2 to 4, an orientation of the second rider relative to the turntable is maintained while the first panel is pivoted relative to the frame.

According to another example ("Example 6"), further to any of Examples 2 to 5, the sill includes a strike plate, wherein the strike plate is configured to facilitate the decoupling of the first rider from the frame.

According to another example ("Example 7"), further to any of Examples 2 to 6, the fenestration unit further includes a slider bar slideably coupled to the head and releasably coupled to the first panel.

According to another example ("Example 8"), further to Example 7, the slider bar is configured to slide relative to the frame when coupled to with the first panel, and where in the slider bar is configured to fixedly couple to the frame when the first panel is released from the slider bar.

According to another example ("Example 9"), further to any of Examples 7 to 8, wherein the first panel further includes a retractable bolt, and wherein the retractable bolt defines the releasable coupling between the first panel and the slider bar.

According to another example ("Example 10"), further to any of Examples 2 to 9, the first rider is one of a wheel, a unidirectional roller bearing, a multi-directional roller bearing, and an omnidirectional roller bearing.

According to another example ("Example 11"), further to any of Example 1, the fenestration unit further includes a rider catch in one or more of the head and the sill, the rider catch being transitionable between an extended configuration and a retracted configuration, wherein in the extended configuration, the rider catch is operable to secure the first panel against translation along the frame.

According to another example ("Example 12"), further to Example 11, the rider catch includes a rider receptacle that is configured to accommodate the second rider of the first panel.

According to another example ("Example 13"), further to any of Examples 2 to 11, the sill defines a first track configured to receive the first rider and a second track configured to receive the second rider.

According to another example ("Example 14"), further to Example 13, the first and second tracks are the same track.

According to another example ("Example 15"), further to any of Examples 2 to 14, the fenestration unit further includes a second panel supported by the frame, the second panel being releasably coupled to the sill such that the second panel is operable to pivot relative to the frame and relative to the first panel, wherein the first panel is operable to translate relative to the second panel without pivoting relative to the second panel.

According to another example ("Example 16"), a fenestration unit configured to transition between a closed configuration, a pivot-ready configuration, and an open configuration, includes a frame including a sill, a head opposite the sill, a first jamb, and a second jamb opposite the first jamb; a first panel supported by the frame, and a second panel supported by the frame, wherein in the closed configuration the first panel and the second panel are parallel with one another with the first panel being in a first lateral position relative to the second panel and the frame, and wherein in the pivot-ready configuration the first panel and the second panel are parallel with one another with the first panel translated to a second lateral position relative to the second panel and the frame, and wherein in the open configuration the first panel is pivoted relative to the frame such that the first panel is nonparallel with the frame and the second panel.

According to another example ("Example 17"), a method of operating a fenestration unit including a first panel, a second panel, and a frame supporting the first and second panels, includes sliding the first panel from a closed position to a pivot-ready position without causing the first panel to pivot relative to the frame or the second panel, the first panel translating relative to the frame and the second panel; releasing the second panel from the frame such that the second panel is operable to pivot relative to the frame and relative to the first panel; pivoting the second panel relative to the frame and relative to the first panel; releasing the first panel from the frame such that the first panel is operable to pivot relative to the frame and relative to the second panel; and pivoting the first panel relative to the frame and relative to the second panel.

According to another example ("Example 18"), further to Example 17, the first panel is parallel with the second panel in the closed position and in the pivot-ready position.

According to another example ("Example 19"), further to any of Examples 17 to 18, wherein the first panel includes a first rider coupled with the frame and wherein releasing the first panel from the frame includes retracting the first rider of the first panel to decouple the first rider from the frame at the first rider.

According to another example ("Example 20"), further to any of Examples 17 to 19, the frame includes a rider catch and the first panel includes a second rider, the method further comprising actuating the rider catch to capture the second rider of the first panel such that the first panel is secured against translation relative to the frame and the second panel.

While multiple inventive examples are specifically disclosed, various modifications and combinations of features from those examples will become apparent to those skilled in the art from the following detailed description. Accordingly, the disclosed examples are meant to be regarded as illustrative in nature and not restrictive.

Figure 1:
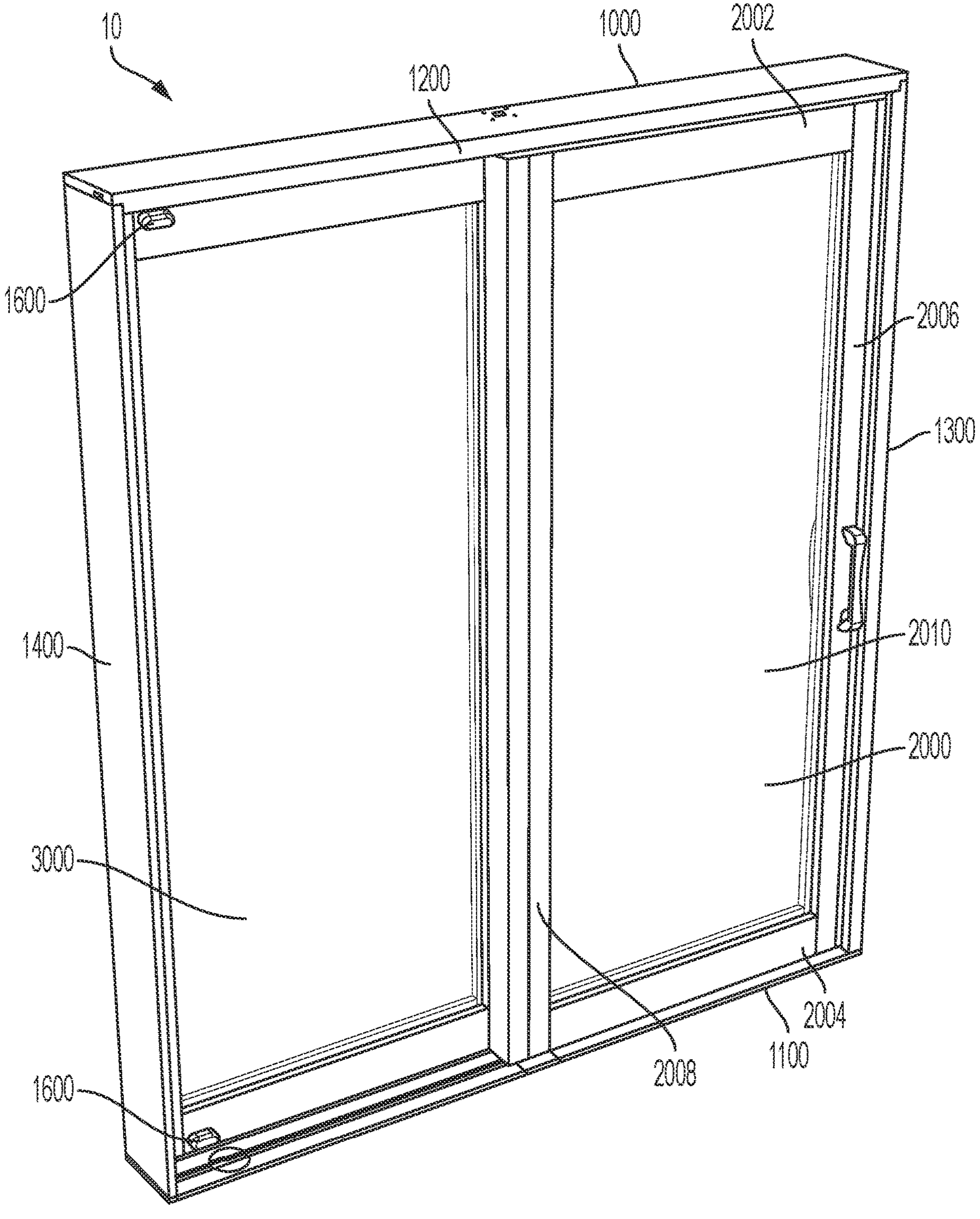
FIG. 1 shows a fenestration unit in a closed configuration, according to some examples.

While the disclosure is amenable to various modifications and alternative forms, specific embodiments have been shown by way of example in the drawings and are described in detail below. The disclosure, however, is not limited to the particular embodiments described. On the contrary, the disclosure is intended to cover all modifications, equivalents, and alternatives falling within the scope of the disclosure as defined by the appended claims.

DETAILED DESCRIPTION

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting. Moreover, while embodiments including two movable panels are disclosed herein, other embodiments including a fenestration unit having more than two movable panels are also contemplated.

Various aspects of the present disclosure are directed toward fenestration units that are adapted to provide for versatility in how they may be opened. Fenestration units according to the present disclosure may be adapted for sliding doors, sliding windows, and any other fenestration unit having one or more sliding panels. An exemplary fenestration unit 10 is illustrated in FIG. 1. As shown, the fenestration unit 10 includes a frame 1000 and a plurality of panels, such as first panel 2000 and second panel 3000. The fenestration unit 10 is configured to define a boundary between an interior space and an exterior space, such as an interior space of a home and the elements outside of the home for example, while providing access through an opening in the fenestration unit between the interior and exterior spaces.

Figure 2:
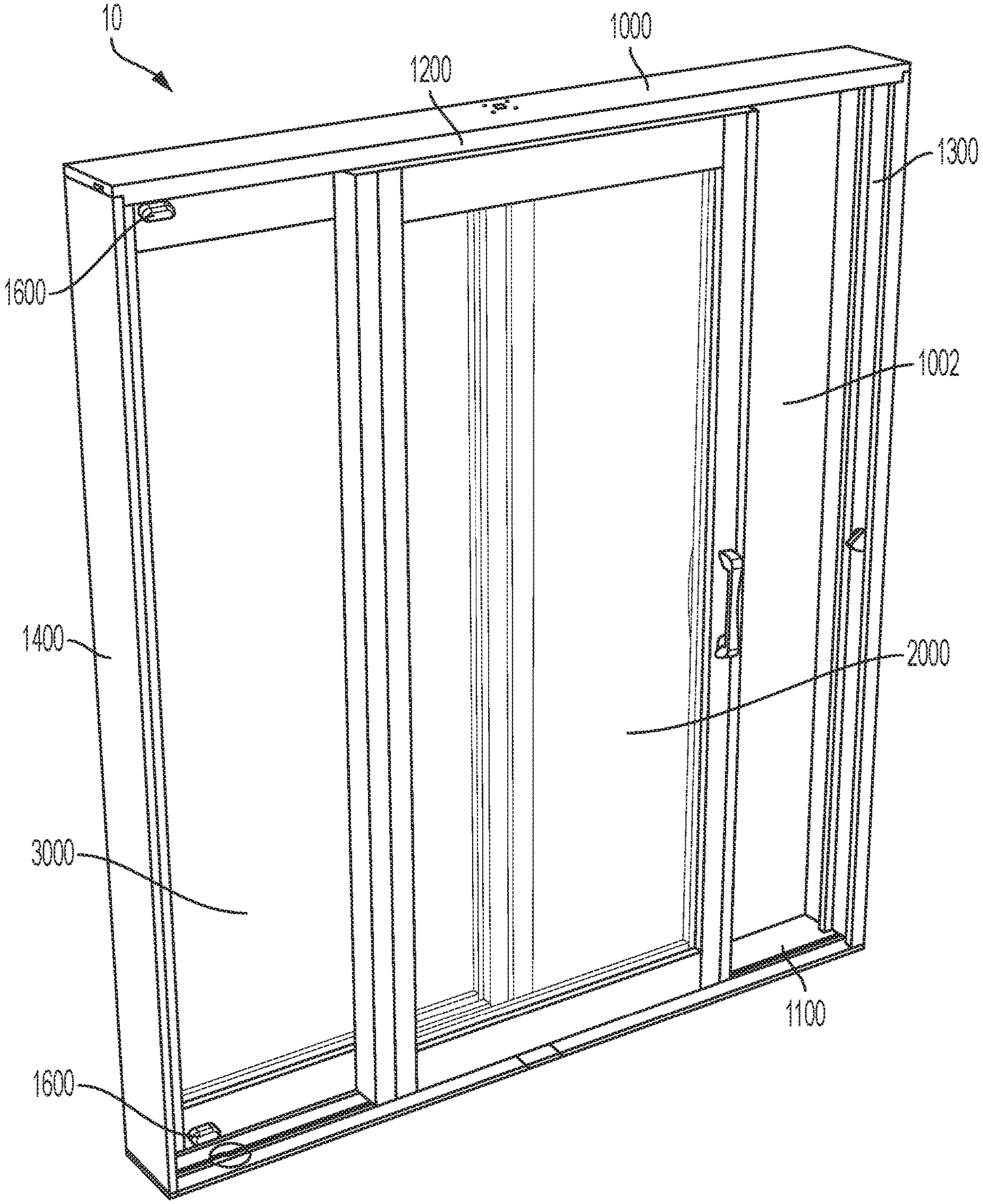
FIG. 2 shows the fenestration unit of FIG. 1 at an intermediate position between a closed position and a first open position, according to some examples.

As shown in FIG. 1, situated within the frame 1000 is a first panel 2000 and a second panel 3000, wherein the first panel 2000 and the second panel 3000 are each supported by the frame 1000. In various embodiments, one or more of the first and second panels 2000 and 3000 are configured to slide relative to the frame 1000 to provide an opening in the fenestration unit 10. For example, as shown in FIG. 2, the fenestration unit 10 is shown in a partially open configuration where the first panel 2000 has been slid partially open to define a partial frame opening 1002.

Figure 5:
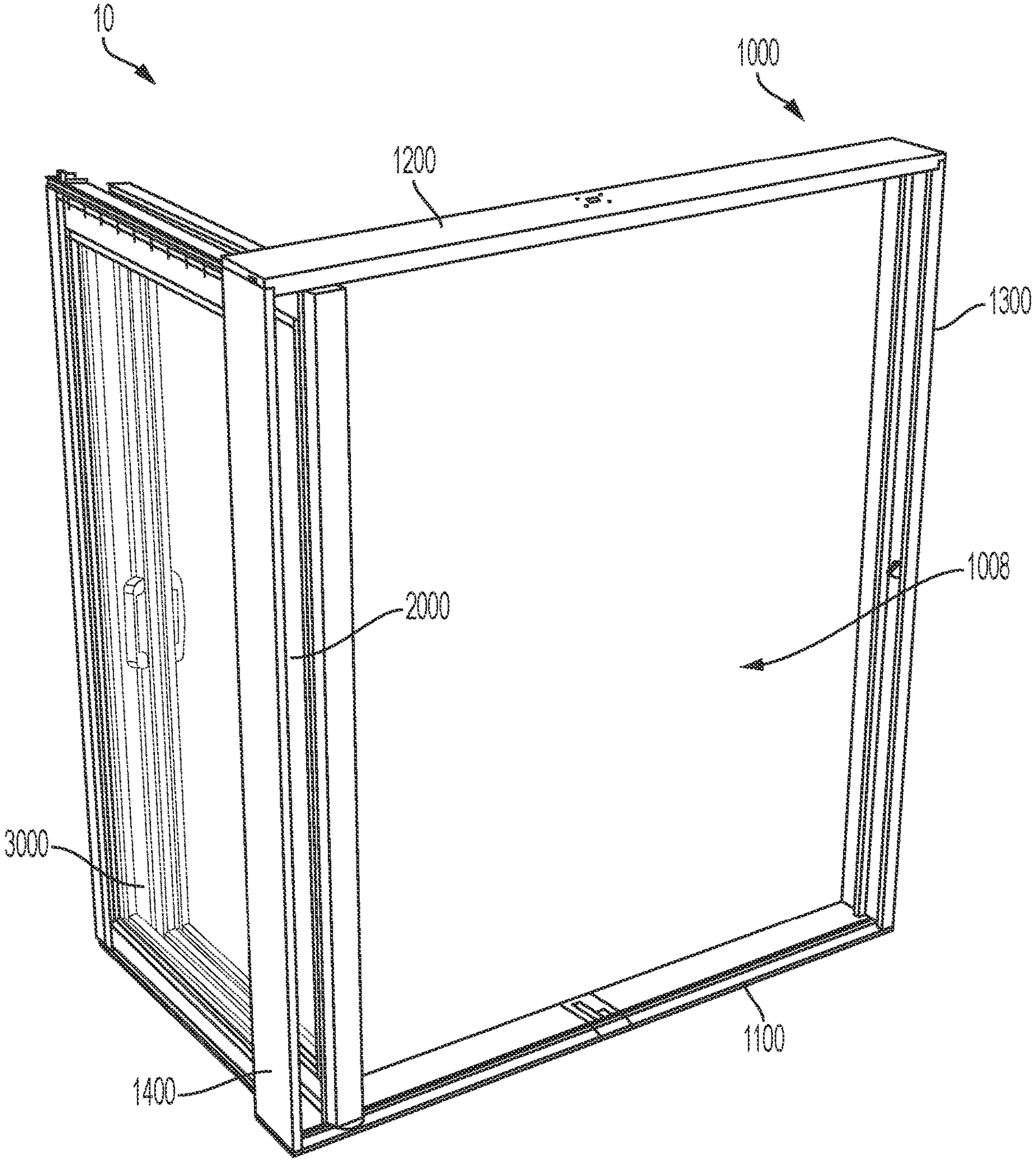
FIG. 5 shows the fenestration unit of FIG. 1 in a second open position, according to some examples.

Each of the first and second panels 2000 and 3000 are also configured to be pivoted relative to the frame 1000 such that the first and second panels 2000 and 3000 can be hinged or otherwise pivoted open to increase the size of the opening in the fenestration unit 10. For example, as shown in FIG. 5, each of the first and second panels 2000 and 3000 are shown hinged open or otherwise pivoted open relative to the frame 1000 to define a full frame opening 1008. It is to be appreciated that the first and second panels 2000 and 3000 can be configured to pivot outwardly toward an exterior and/or inwardly toward an interior. Moreover, it is to be appreciated that the first panel 2000 may be situated on either an interior or an exterior side of the second panel 3000.

Thus, in various examples, the fenestration unit 10 may include a plurality of panels, where one or more of the panels is configured to slide and pivot relative to the frame 1000 of the fenestration unit 10. Such a configuration provides for a fenestration unit that is adapted for providing a relatively large opening in comparison to conventional fenestration units having sliding panels. Such a configuration also provides for a fenestration unit having one or more panels that can slide (e.g., to provide an opening where pivoting the same to provide for a larger opening is unnecessary).

With continued reference to FIG. 1, the frame 1000 of the fenestration unit 10 includes a sill 1100, a head 1200, a first jamb 1300, and a second jamb 1400. The sill 1100 is a structural frame element that generally defining the bottom of the frame 1000, while the head 1200 is a structural frame element that generally defines the top of the frame 1000. The sill 1100 and the head 1200 each generally extend laterally between the first and second jambs 1300 and 1400, as shown. The first and second jambs 1300 and 1400 are structural frame elements that extend vertically between the sill 1100 and the head 1200. In various examples, the head 1200 is supported by each of the first and second jambs 1300 and 1400. The first jamb 1300 generally defines a first side of the frame 1000, while the second jamb 1400 is situated opposite the first jamb 1300 and generally defines a second side of the frame 1000.

Figure 3:
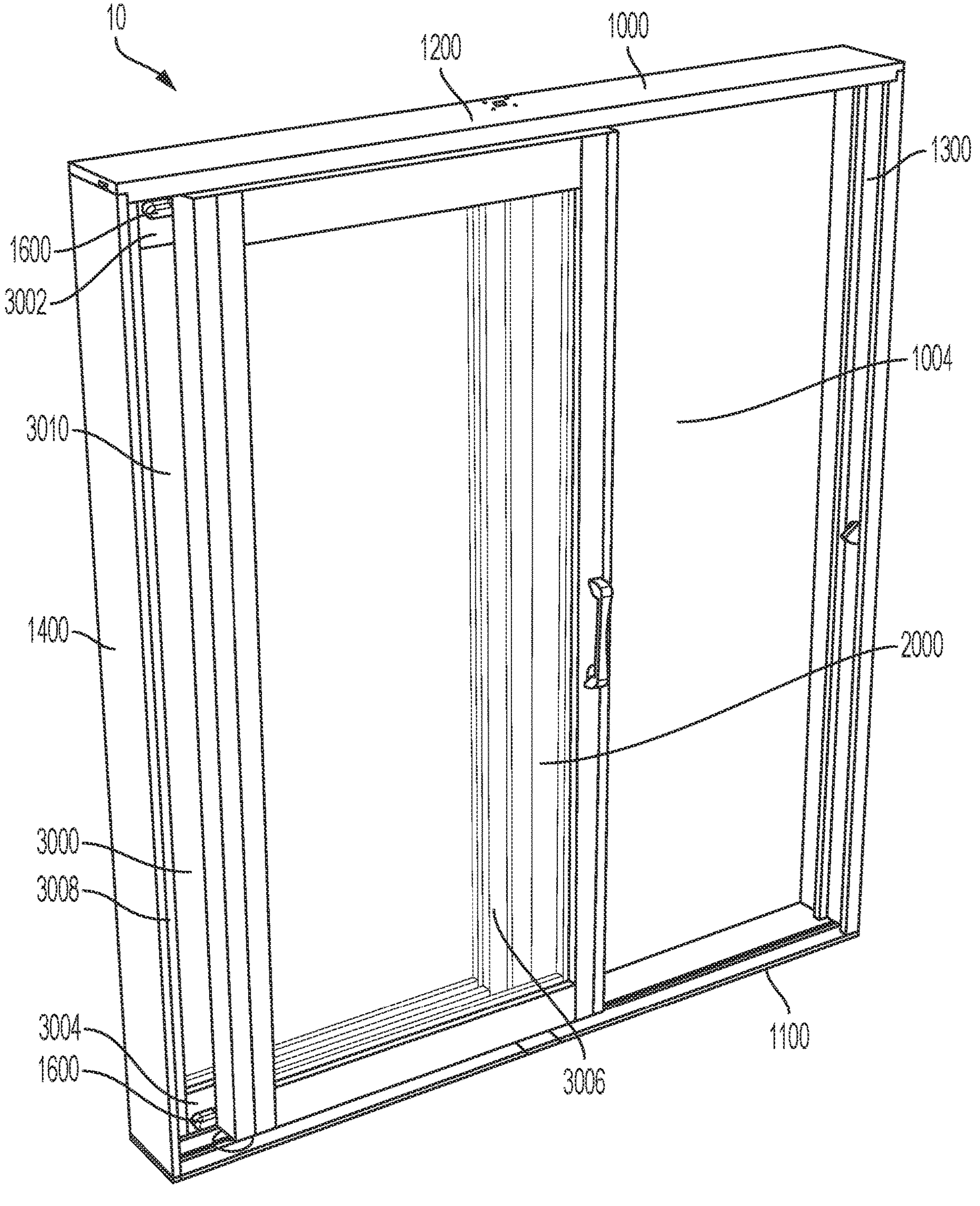
FIG. 3 shows the fenestration unit of FIG. 1 in a first open position, according to some examples.

FIGS. 1 to 5 show an example opening sequence of the fenestration unit 10. For instance, the fenestration unit 10 is shown in FIG. 1 in a closed configuration. The fenestration unit 10 is shown in FIG. 2 in a partially open configuration where the first panel 2000 is translated relative to the second panel 3000 and the frame 1000 to a partially opened position, thereby defining a partial frame opening 1002. The fenestration unit 10 is shown in FIG. 3 in a first open configuration where the first panel 2000 is translated relative to the second panel 3000 and the frame 1000 to a fully opened position, thereby defining an opening 1004 that is larger than the partial frame opening 1002.

Figure 4:
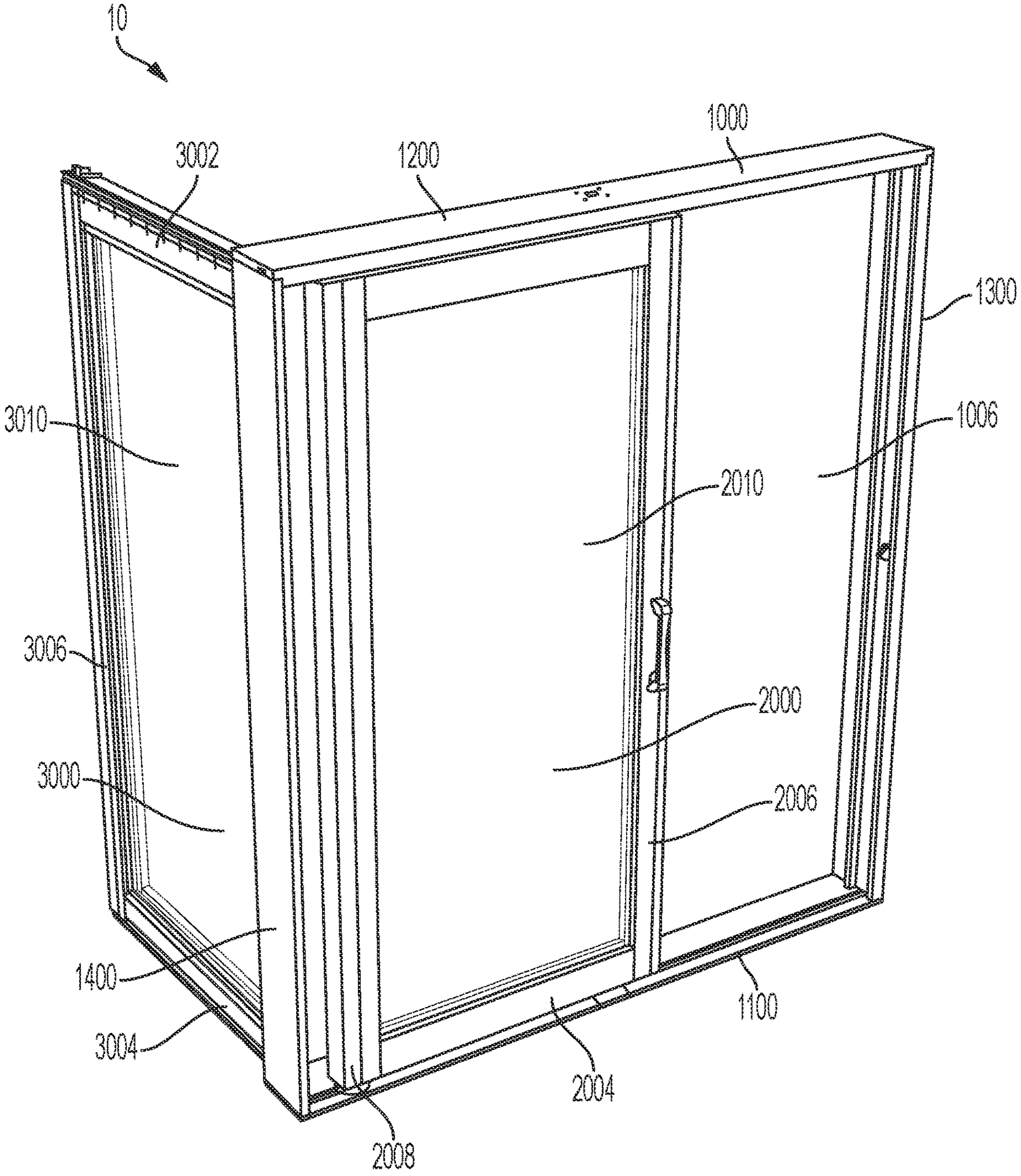
FIG. 4 shows the fenestration unit of FIG. 1 with the second panel pivoted open and the first panel in the pivot ready position, according to some examples.

The fenestration unit 10 is shown in FIG. 4 in a pivot-ready configuration where the first panel 2000 is in a pivot-ready position such that it can be pivoted relative to the frame 1000, thereby defining an opening 1006. In some examples, the opening 1006 is larger than each of the openings 1004 and 1002, as transitioning the first panel 2000 from the fully opened position to the pivot-ready position includes further translating the first panel 2000 relative to one or more of the frame 1000 and the second panel 3000. As shown in FIG. 4, the second panel 3000 is pivoted to an open position relative to the frame 1000. In some examples, the second panel 3000 is operable to be pivoted open at any point in the opening sequence. For instance, in some examples, the second panel 3000 may be pivoted open with the first panel 2000 in the closed position, with the first panel 2000 in the pivot-ready position, or with the first panel 2000 at any position therebetween (e.g., the partially open position and the fully opened position). In some other examples, the second panel 3000 may only be opened at one or more discrete points during the opening sequence, such as when the first panel is in the fully opened position shown in FIG. 3.

The fenestration unit 10 shown in FIG. 5 in a second open configuration defining the full frame opening 1008, which is larger than each of the openings 1002, 1004, and 1006. As shown, each of the first and second panels 2000 and 3000 are pivoted open relative to the frame 1000.

Figure 6:
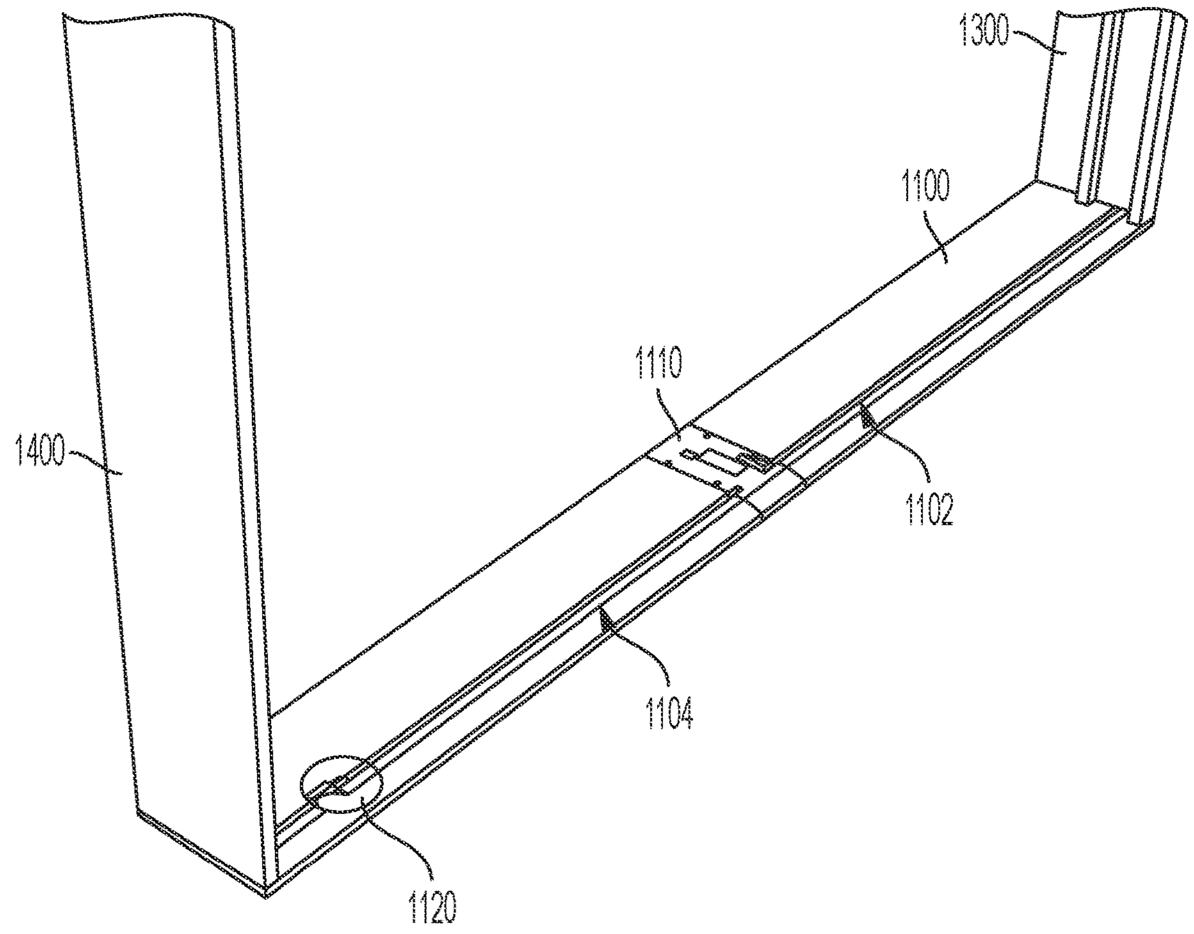
FIG. 6 shows a sill of a frame of a fenestration unit, according to some examples.

FIG. 6 shows a detailed view of the sill 1100 of the frame 1000 with the first and second panels 2000 and 3000 removed. As shown, the sill 1100 includes one or more tracks, such as tracks 1102 and 1104, a strike plate 1110, and a pivot assembly 1120. Tracks 1102 and 1104 are configured to facilitate lateral translation of the first panel 2000 along the sill 1100 relative to the frame 1000. As such, the tracks 1102 and 1104 are configured to receive one or more components of the first panel 2000, such as one or more wheels, pins, bolts, or roller bearings (e.g., unidirectional, multidirectional, and/or omnidirectional). In some examples, the tracks 1102 and 1104 are formed as grooves in the sill 1100. In some examples, the tracks 1102 and/or 1104 are formed as concave grooves configured to accommodate convex riders (e.g., such as convex wheels and/or rollers). Alternatively, the tracks 1102 and/or 1104 may be formed as convex protrusions configured complementary to concave riders (e.g., such as concave wheels).

In some examples, the one or more of the tracks 1102 and 1104 extend the entire width of the sill 1100, such as from the first jamb 1300 to the second jamb 1400. In some examples, the one or more of the tracks 1102 and 1104 extend along only a portion of less than all of the sill 1100, for example, each extending substantially half of the width of the sill 1100, or more than 30%, 40%, or 48% of the length of the sill. In some examples, the tracks 1102 and 1104 are straight and the first panel 2000 is configured to slide linearly along the tracks 1102 and 1104 and to be retained in the tracks 1102 and 1104.

Figure 7:
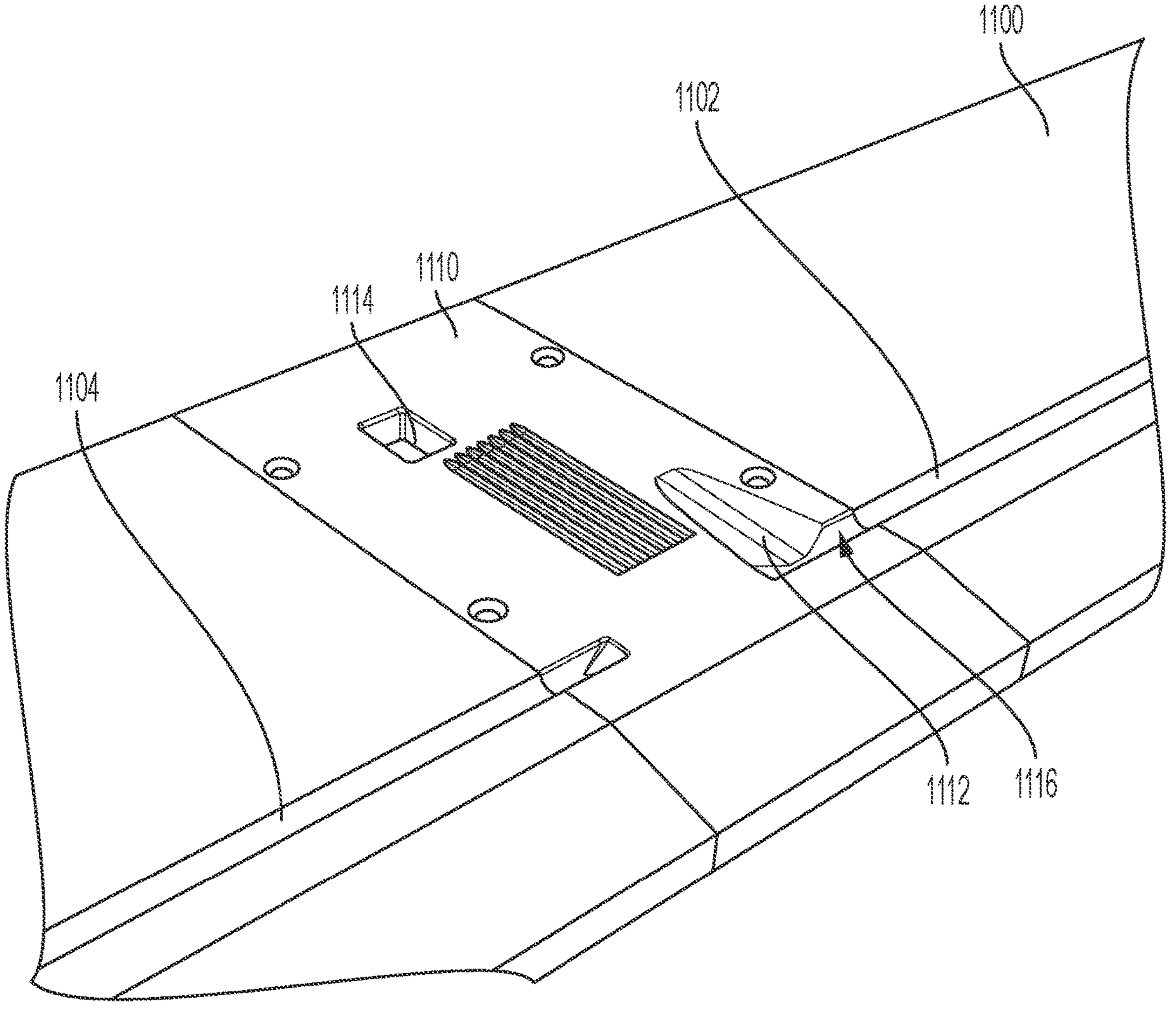
FIG. 7 is an enlarged view showing a strike plate of the sill shown in FIG. 6, according to some examples.

As shown in FIG. 6, the strike plate 1110 is situated near the center of the sill 1100. FIG. 7 is a close up view of the strike plate 1110 of the sill 1100, according to some examples. As shown, the strike plate 1110 includes a rider release channel 1112 and a panel bolt receptacle 1114. In some embodiments, the strike plate 1110, and the rider release channel 1112 includes a linking section 1116 that defines a transition between the track 1102 and the rider release channel 1112, such that a rider traveling within track 1102 can transition into the rider release channel 1112 of the strike plate 1110 via the linking section 1116. Operation of the fenestration unit 10 and the rider release channel 1112 is described in greater detail below. In certain embodiments, track 1104 optionally extends from the strike plate 1110.

The bolt receptacle 1114 of the strike plate is a feature that operates to constrain actuation (e.g., pivoting) of the second panel 3000 relative to the frame 1000, as discussed in greater detail below. As shown, the bolt receptacle is substantially rectangular and is shown as a through hole in the sill 1100, but other alternatives are also contemplated.

Figure 8:
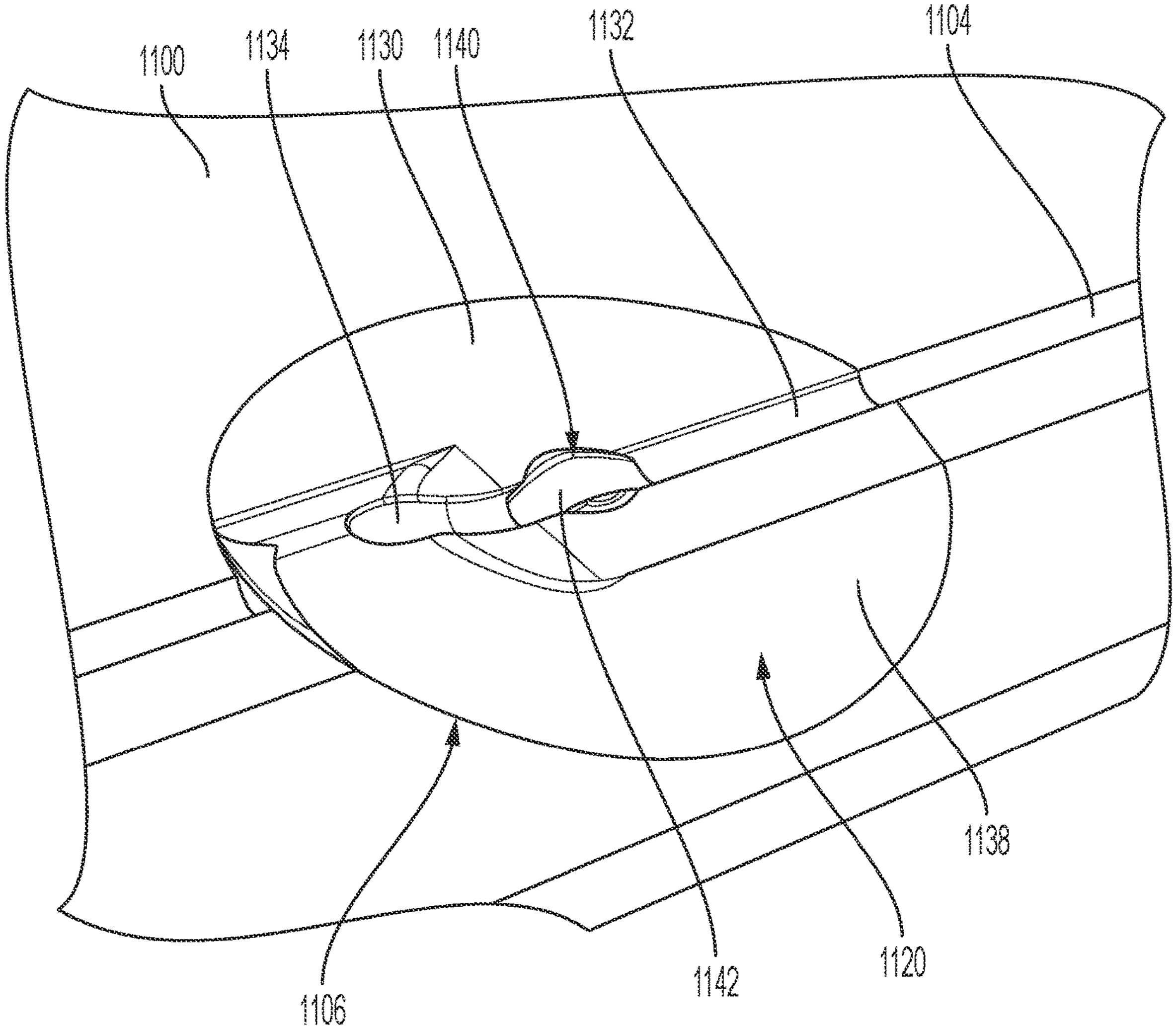
FIG. 8 is an enlarged view showing a pivot assembly of the sill shown in FIG. 6, according to some examples.
Figure 9:
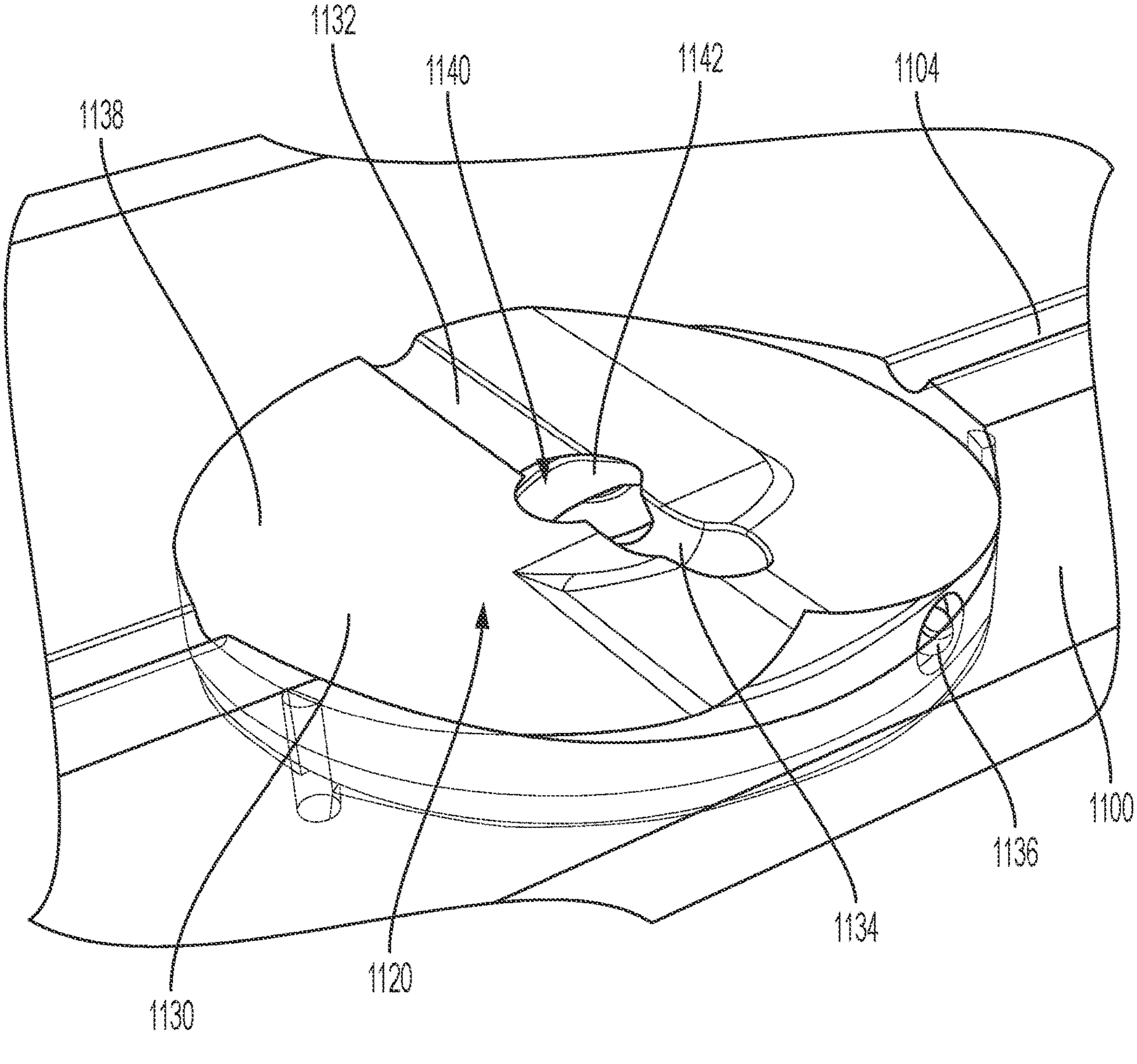
FIG. 9 shows the pivot assembly of FIG. 8 in a rotated configuration, according to some examples.
Figure 10:
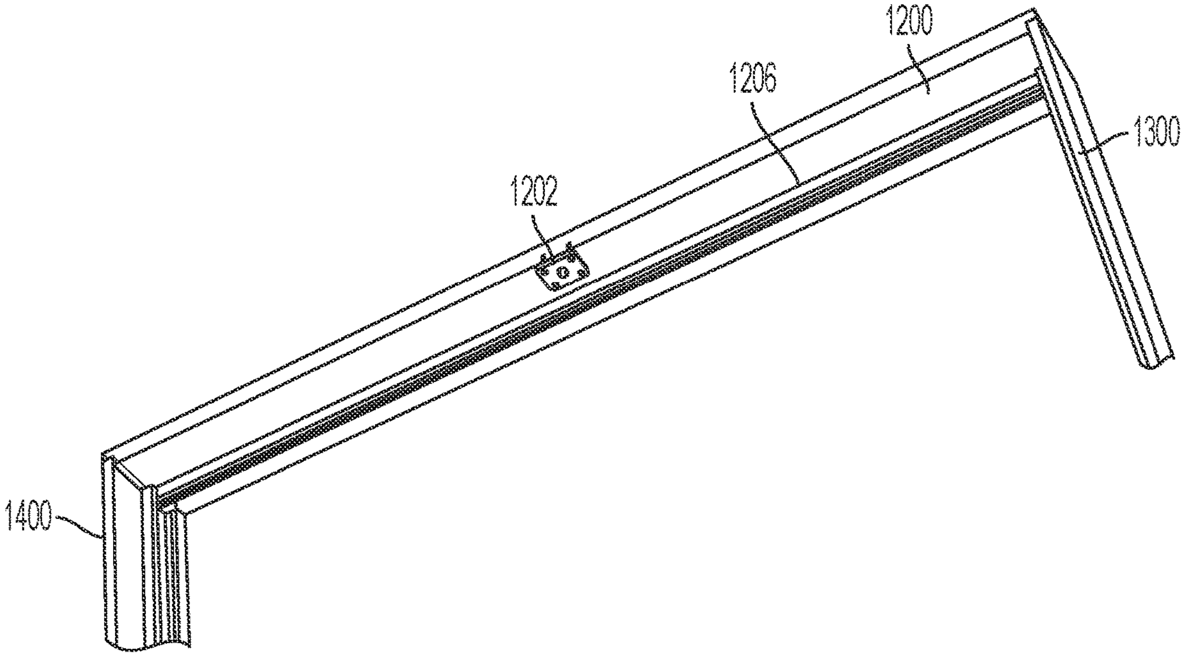
FIG. 10 shows a head of a frame of a fenestration unit, according to some examples.
Figure 11:
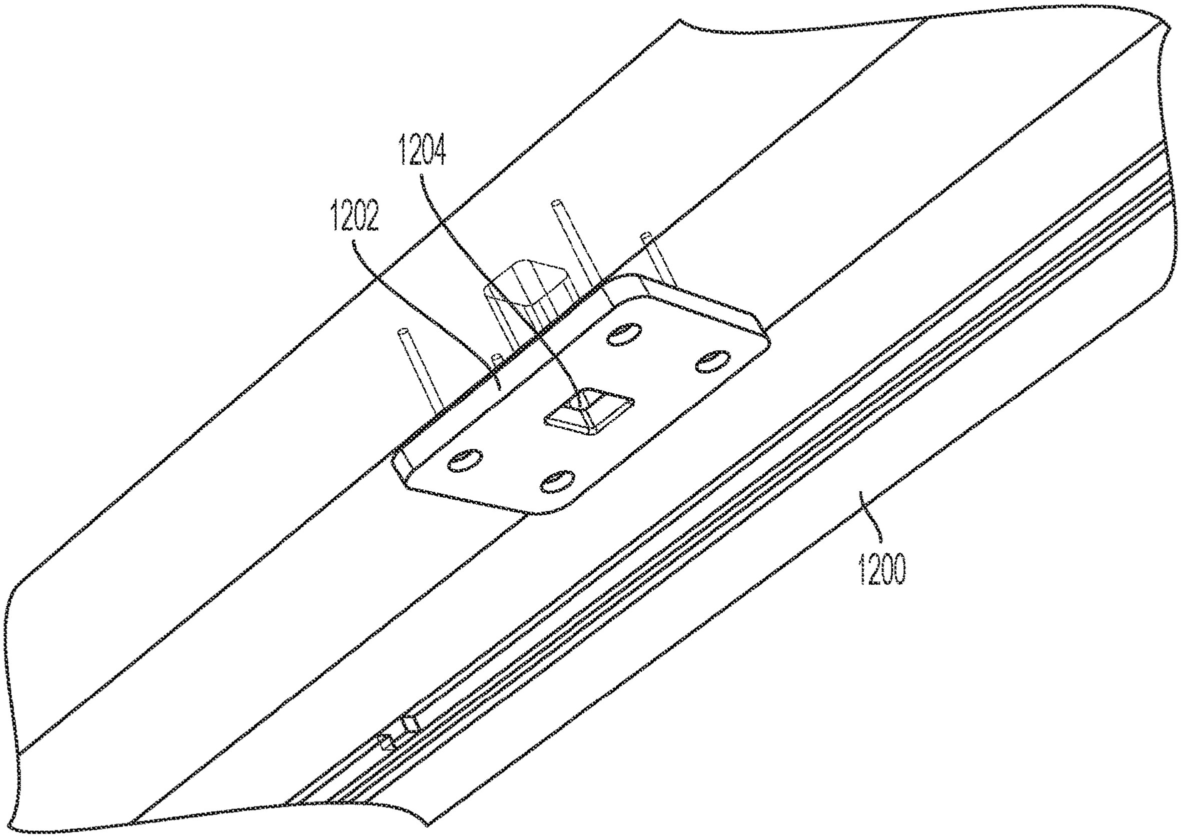
FIG. 11 shows a strike plate of the head shown in FIG. 10, according to some examples.

FIGS. 8 and 9 show the pivot assembly 1120 of the sill 1100, according to some examples. FIG. 8 shows the pivot assembly 1120 in an inactive position, while FIG. 9 shows the pivot assembly 1120 in an active position where the turntable has been rotated relative to the sill 1100. As shown, the pivot assembly 1120 includes a turntable 1130 and a hub 1140. The turntable 1130 is a component of the fenestration unit 10 that helps facilitate hinging of the first panel 2000 such that the first panel 2000 can slide relative to the frame 1000 and pivot or hinge open relative to the frame 1000. In various examples, the turntable is received within a relief 1106 of the sill 1100 that is complementary to the turntable 1130. As shown in FIGS. 8 and 9, the turntable 1130 has a generally disk-shaped appearance. Thus, it will be appreciated that the relief 1106 of the sill 1100 is similarly shaped such that the turntable 1130 can be accommodated within the relief.

The turntable 1130 defines an entry channel 1132 and a rider chock 1134. The entry channel 1132 includes a groove in the turntable 1130 consistent with the groove formed in the sill 1100 defining track 1104 such that a rider of the first panel 2000 can transition from track 1104 to the entry channel 1132 when the turntable 1130 is in the inactive position as shown in FIG. 8 and the first panel 2000 is slid open. The rider chock 1134 defines a termination point of the entry channel 1132 along the turntable such that a rider of the first panel 2000 traversing the entry channel 1132 will be stopped from further translation by rider chock 1134.

The hub 1140 is a component of the pivot assembly 1120 that helps secure the rider of the first panel 2000 as the first panel is hinged relative to the frame 1000, as discussed further below. The hub 1140 defines a hub channel 1142. The hub 1140 is positioned within the entry channel 1132 of the turntable 1130, as shown, such that a rider of the first panel 2000 traverses the hub channel 1142 prior to encountering the rider chock 1134. In some examples, the hub 1140 is configured such that a base of the groove of the hub channel 1142 (e.g., the bottom of the groove furthest from the top surface of the sill 1100) is elevated relative to the base of the grove of the entry channel 1132. In some examples, the base of the groove of the hub channel 1142 has a first elevation at the transitions between the hub channel 1142 and the entry channel 1132, and a second different elevation therebetween. As such, the hub channel 1142 functions as both a channel for the rider of the first panel 2000 as well as a rider chock 1134 to help resist translation of the rider of the first panel 2000 across the hub channel 1142. For example, such a configuration provides that the hub channel 1142 operates to resist translation of the rider of the first panel 2000 from translating across the hub channel 1142 towards a closed position once the rider of the first panel 2000 is situated between the hub channel 1142 and the rider chock 1134 (e.g., such as when the first panel 2000 is in the pivot-ready position shown in FIG. 4).

Figure 28:
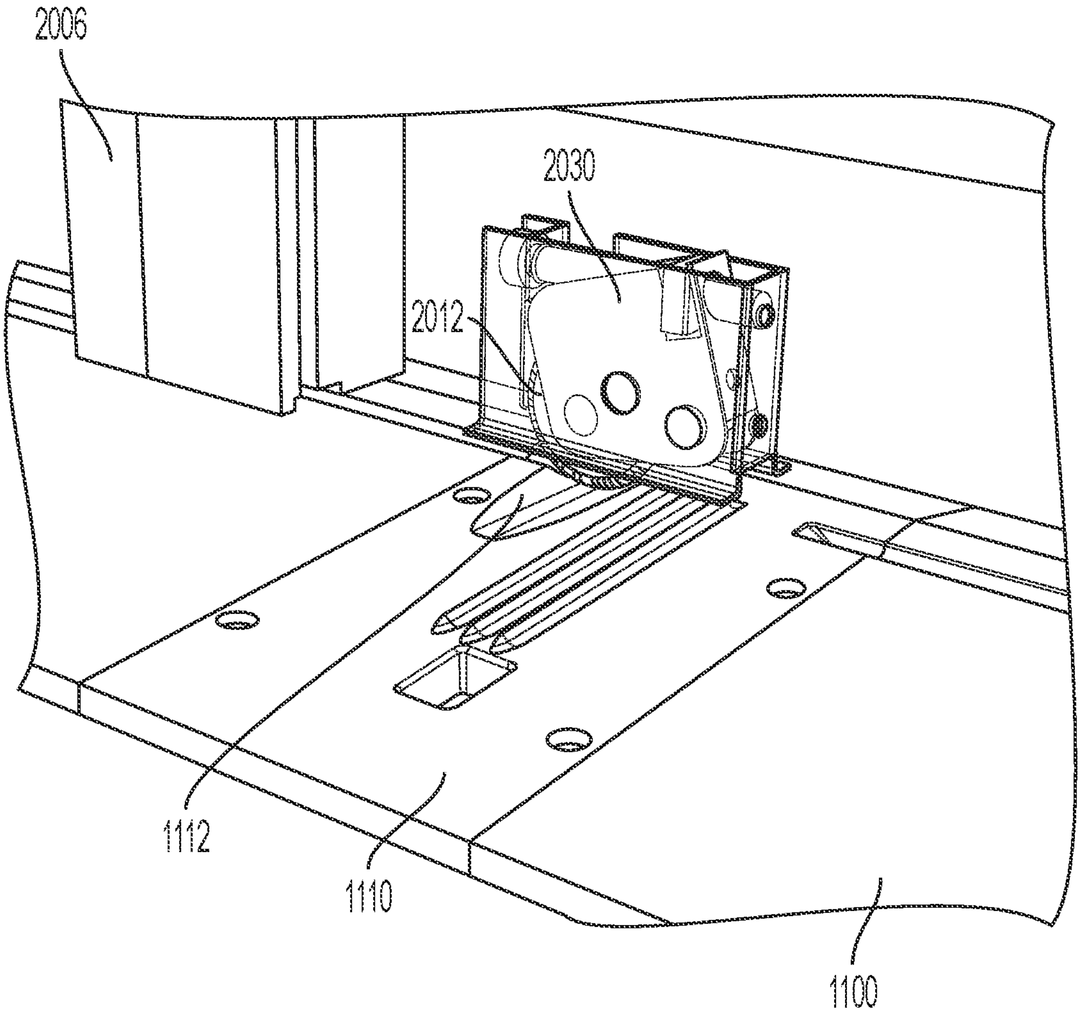
FIG. 28 shows the sill of the fenestration unit with various components removed for ease of visualizing a position of the first roller aligned with a release channel of the strike plate of the sill when the fenestration unit is in the pivot-ready position, according to some examples.

In various examples, the turntable 1130 is rotatably received and/or secured by the sill 1100 whereas the hub 1140 is fixedly coupled to the sill 1100. Accordingly, in various examples, the turntable 1130 is configured to rotate relative to each of the sill 1100 and the hub 1140, as discussed in greater detail below. In some examples, the pivot assembly 1120 includes one or more turntable bearings 1136, as shown in FIG. 28. The turntable bearings 1136 may be situated along the turntable 1130 such that the turntable bearings 1136 are situated between the turntable 1130 and the sill 1100. While the configuration illustrated in FIG. 9 shows the turntable bearings 1136 situated along a circumferential wall of a disk-shaped turntable 1130, it is to be appreciated that one or more turntable bearings 1136 may additionally or alternatively be situated between the turntable 1130 and sill 1100 at one or more other locations, such as between the sill 1100 and a bottom surface of the turntable 1130 (obscured from view in FIGS. 8 and 9), which is opposite the top surface 1138 of the turntable 1130. The one or more turntable bearings 1136 aid in rotation of the turntable 1130 relative to the sill 1100 and the hub 1140, as those of skill will appreciate.

FIG. 8 shows the turntable 1130 in a first position (e.g., an inactive or non-rotated position), while FIG. 9 shows the turntable 1130 in a second position (e.g., an active or rotated position. In various embodiments, when the turntable 1130 is in the inactive position (e.g., as in FIG. 9), the track 1104, the entry channel 1132, the hub channel 1142, and the rider chock 1134 are aligned (e.g., collinear). In various examples, when the turntable 1130 is in the active position (e.g., as in FIG. 9), the hub channel 1142 remains aligned (e.g., collinear) with the track 1104, while the entry channel 1132 and the rider chock 1134 are misaligned with each of the hub channel 1142 and the track 1104 of the sill 1100. In some examples, the turntable 1130 is rotated relative to the sill 1100 and the hub 1140 such that the entry channel 1132 and the rider chock 1134 are substantially perpendicular to (e.g., 90 degrees±20 degrees) the hub channel 1142 and/or the track 1104 of the sill 1100. Accordingly, in some embodiments, the hub channel 1142 of the hub 1140 forms a traversable transition between the entry channel 1132 and the rider chock 1134 when the turntable is in the inactive position, and forms a nontraversable obstruction dividing the rider chock 1134 from the entry channel 1132 when the turntable is in the active position. For instance, in some examples, a rider of the first panel 2000 can traverse the hub 1140 via the hub channel 1142 when the turntable 1130 is in the inactive position, while the first panel 2000 is prevented from traversing the hub 1140 when the turntable 1130 is in the active position because the hub channel 1142 is misaligned with rider chock 1134 and the entry channel 1132.

Figure 12:
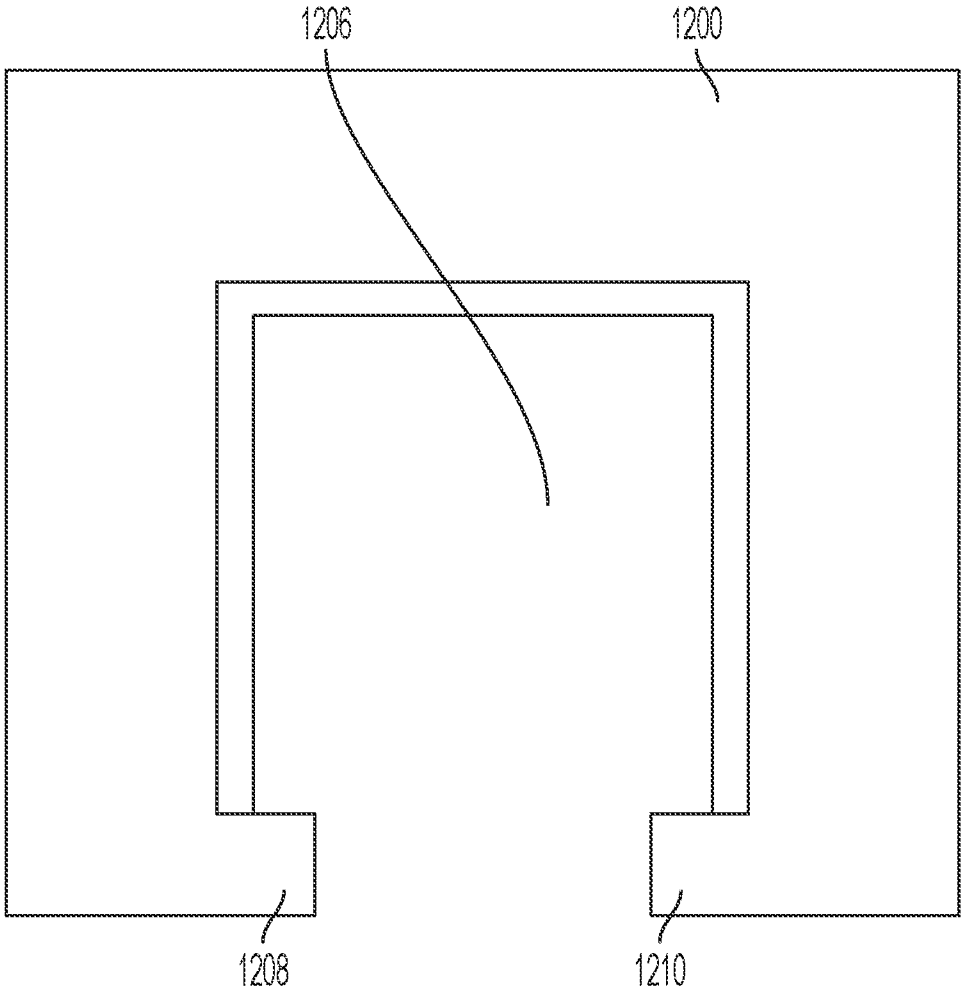
FIG. 12 is a cross-sectional view of the head shown in FIG. 10, according to some examples.
Figure 13:
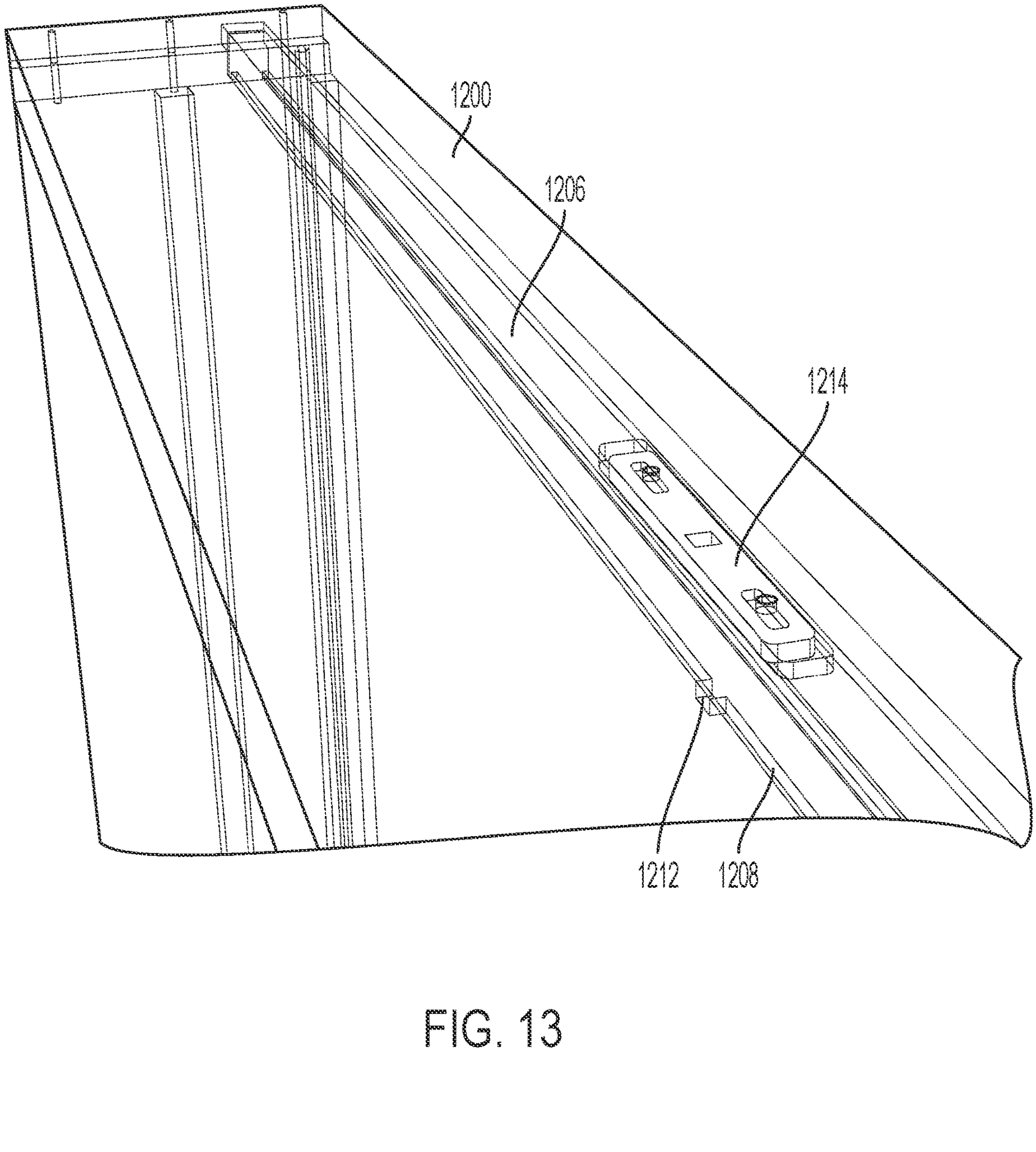
FIG. 13 shows a slider bar catch component of the head shown in FIG. 10, according to some examples.

FIGS. 10-13 show the head 1200 of the fenestration unit 10, according to some examples. As shown, the head 1200 includes a strike plate 1202 defining a panel bolt receptacle 1204 (see FIG. 11) and defines one or more tracks 1206. The strike plate 1202 is configured to help secure (e.g., releasably) the second panel 3000 to the head (see, e.g., FIG. 23). The one or more tracks 1206 are configured to receive the first panel 2000 such that the first panel 2000 is operable to be translated across the head 1200 from the closed position (e.g., FIG. 1) to the pivot-ready position (e.g., FIG. 4). In various embodiments, the one or more tracks 1206 extend the entire width of the head 1200. For example, the one or more tracks 1206 extend from the first jamb 1300 to the second jamb 1400. In some examples, the one or more tracks 1206 are substantially linear and/or parallel to the head 1200. In various embodiments, the one or more tracks 1206 form a slider track that includes a first flange 1208 and a second flange 1210, as shown in FIG. 12. In some examples, the slider track 1206 is further defined to have a release cutout 1212 along the first flange 1208, as shown in FIG. 13, which is configured to allow a retractable bolt 2016 of the first panel 2000 to be retracted such that the first panel 2000 can be hinged relative to the frame 1000, as discussed further below. In certain examples, the head 1200 includes a slider bar catch 1214 positioned along the slider track 1206. As discussed further below, the slider bar catch 1214 interfaces with a slider bar 1500.

As shown in FIG. 1, the first panel 2000 includes a top rail 2002, a bottom rail 2004, a first stile 2006, and a second stile 2008. In various examples, the top rail 2002, bottom rail 2004, first stile 2006, and second stile 2008, collectively, define a frame of the first panel 2000. In various examples, an insert 2010, such as a glass insert is housed by the frame of the first panel 2000. The second panel 3000 likewise includes a top rail 3002, a bottom rail 3004, a first stile 3006, and a second stile 3008, that collectively define a frame of the second panel 3000, as shown in FIG. 3. In various examples, an insert 3010, such as a glass insert is housed by the frame of the second panel 3000. It will be appreciated that inserts other than glass inserts, such as wood, plastic, or metal may be housed by the frames of the first and second panels 2000 and 3000.

In various examples, the fenestration unit 10 may include one or more bump stops 1600 coupled to the second panel 3000 and configured to engage with the first panel 2000 when the fenestration unit 10 is in the first open position (see FIG. 44). For example, the one or more bump stops 1600 includes a first bump stop 1600 coupled to a bottom rail 3004 and near or at the second stile 3008 of the second panel 3000.

Figure 14:
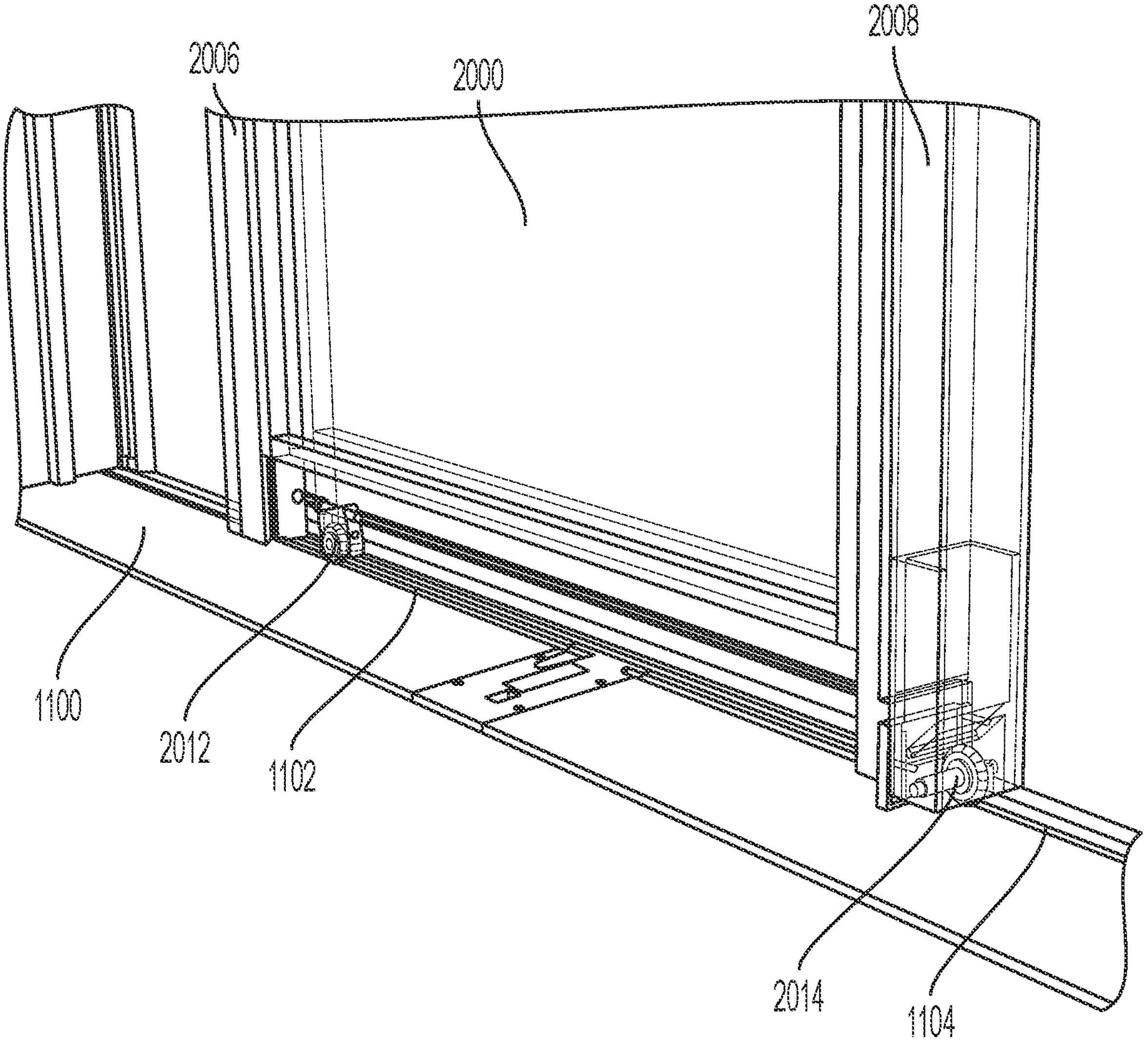
FIG. 14 shows a sill of a fenestration unit, according to some examples.

FIG. 14 shows the bottom rail 2004 of the first panel 2000, according to some examples. In various embodiments, the first panel 2000 includes a plurality of riders, including a first rider 2012 and a second rider 2014. The first and second riders 2012 and 2014 may be coupled to the bottom rail 2004, the first stile 2006, the second stile 2008, or a combination thereof. As shown in FIG. 14, the first rider 2012 is housed within a cavity of the bottom rail (which has been removed from FIG. 14 for clarity) near or at the first stile 2006. The second rider 2014 is shown housed within and coupled to the first stile 2006 near or at the bottom rail 2004.

In various examples, the first rider 2012 and the second rider 2014 are configured to travel along the sill 1100 in the one or more tracks 1102 and 1104. The first and second riders 2012 and 2014 operate to support, guide and/or enable translation of the first panel 2000 relative to the frame 1000. For example, the first and second riders 2012 and 2014 help facilitate translation of the first panel 2000 across the sill 1100, as illustrated in FIG. 14.

Figure 26:
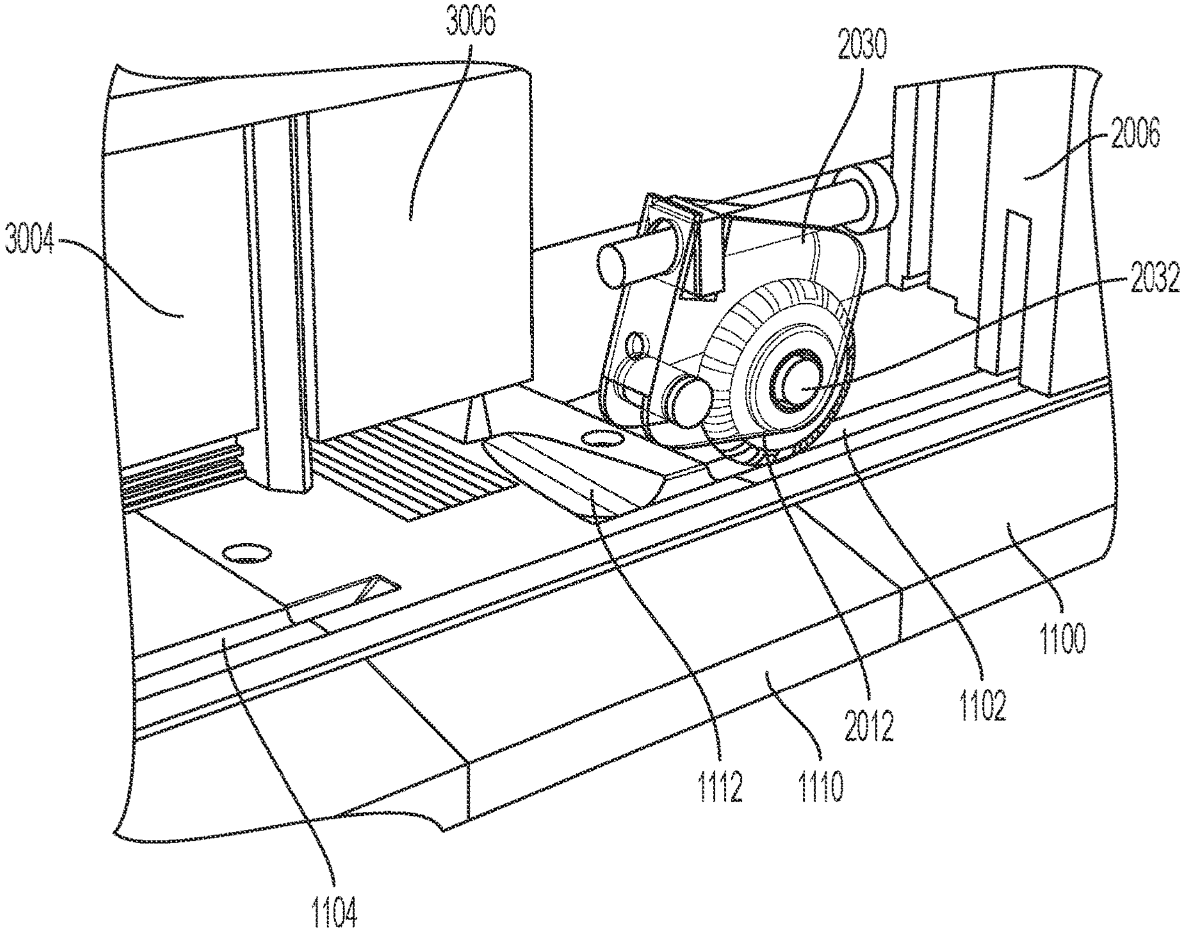
FIG. 26 shows a sill of a fenestration unit with various components removed for ease of visualizing a position of a first roller of the first panel when the fenestration unit is in the first open position, according to some examples.

An example of the first rider 2012 is illustrated in FIG. 26. As shown, the first rider 2012 includes a wheel. However, the first rider 2012 may alternatively include a bearing, a pin, a bolt, a unidirectional roller bearing, a multi-directional roller bearing, and/or an omnidirectional roller bearing, without limitation. The first rider 2012 is situated, at least partially, within a first rider housing 2030, as shown. The first rider housing 2030 is shown in FIG. 26 with the bottom rail 2004 of the first panel 2000 removed for clarity. As such, it is to be appreciated that one or more of the first rider 2012 and the first rider housing 2030 may be situated within a cavity of the bottom rail 2004. In some examples, the first rider 2012 and/or first rider housing 2030 may be additionally or alternatively situated within the first stile 2006, or optionally within another portion of the first panel 2000 provided the first rider 2012 is operable to travel within the track 1102 and to interact with the strike plate 1110, as described herein. The first rider 2012 has a rolling axis 2032, and is situated within the first rider housing 2030 such that the first rider 2012 can be translated to a stowed configuration within the first rider housing 2030, where the first rider 2012 is deflected or retracted into the first rider housing 2030 relative to the sill 1100. In some examples, deflection of the first rider 2012 relative to the sill 1100 may additionally include deflection of the first rider 2012 relative to the bottom rail 2004 of the first panel 2000. Accordingly, it will be appreciated that the first rider 2012 can be transitioned between the deployed configuration (e.g., first rider 2012 projecting at least partially from the bottom rail 2004) and the stowed configuration (e.g., first rider 2012 retracted at least partially within the first rider housing 2030 relative to the deployed configuration).

Upon moving the first rider 2012 from the deployed to the stowed configuration, the first rider 2012 can be deflected or translated out of the track 1102 such that the first panel 2000 can be pivoted relative to the frame 1000. In various examples, the first panel 2000 is configured such that the first rider is biased to adopt the deployed configuration. Such a bias may be achieved according to any known method or mechanism. In some examples, one or more biasing members, such as one or more coil springs, may be coupled with the first rider 2012 such that the first rider 2012 is biased toward the deployed configuration. The one or more biasing members may be situated between the first rider 2012 and one or more of the first rider housing 2030, the first stile 2006, and the bottom rail 2004, or optionally some other portion of the first panel 2000.

Deflection of the first rider 2012 may include deflection of the first rider housing 2030, deflection of the first rider 2012 relative to the first rider housing 2030, or some combination thereof. Accordingly, the examples illustrated in the accompanying figures are not intended to be limiting, as a variety of alternative mechanisms may be implemented to provide the first rider 2012 with a sufficient number of degrees of freedom to translate within the track 1102 such that the first panel 2000 can be translated relative to the frame 1000, as well as be deflectable from the track 1102 such that the first panel 2000 can be pivoted relative to the frame 1000.

Figure 27:
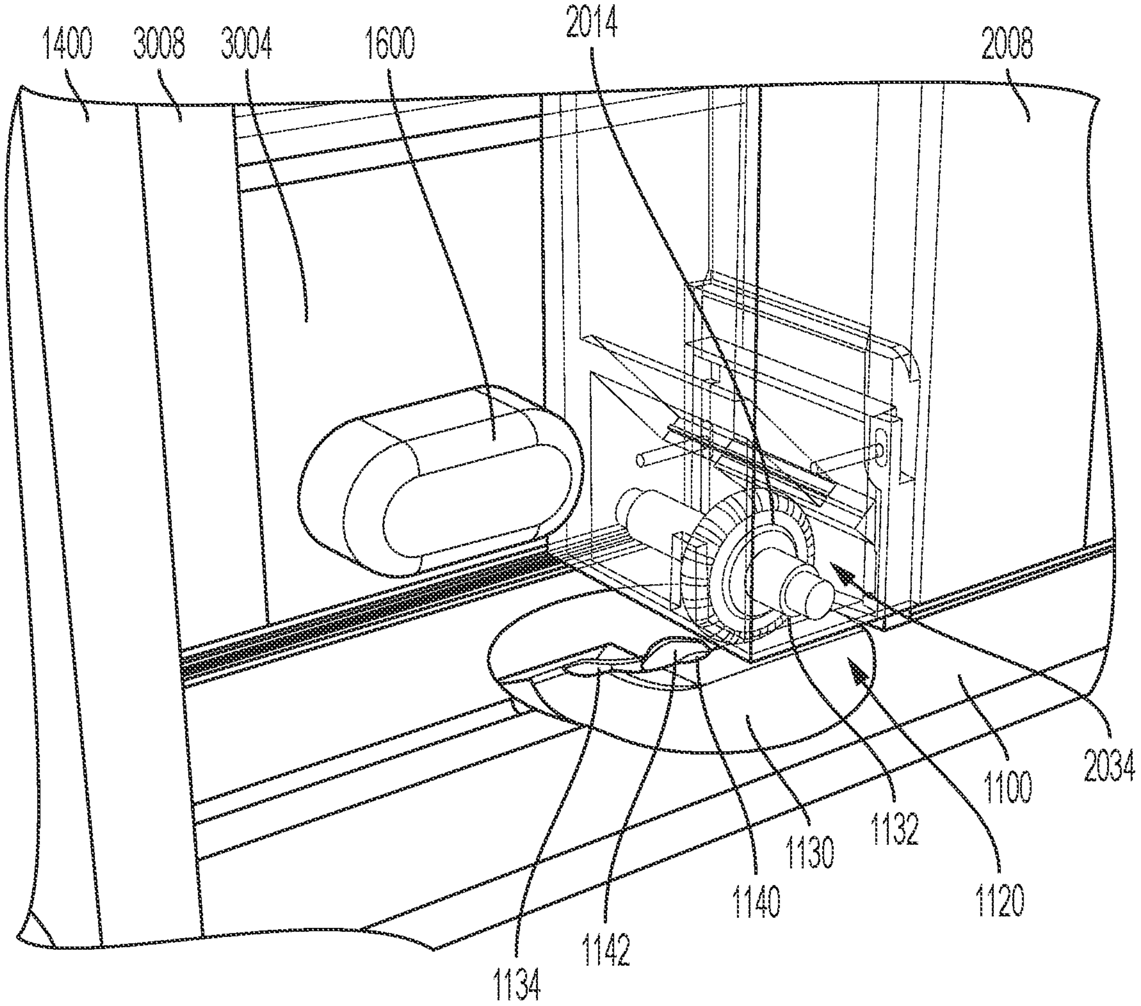
FIG. 27 shows a sill of the fenestration unit of FIG. 26 with various components removed for ease of visualizing a position of a second roller of the first panel when the fenestration unit is in the first open position, according to some examples.

An example of the second rider 2014 is illustrated in FIG. 27. As shown, the second rider 2014 includes a wheel. However, the second rider 2014 may alternatively include a bearing, a pin, a bolt, a unidirectional roller bearing, a multi-directional roller bearing, and/or an omnidirectional roller bearing, without limitation. The second rider 2014 is situated at least partially within a second rider housing 2034, as shown. The second rider housing 2034 may be an integral part of the second stile 2008, such as a cavity within the second stile 2008 as shown in FIG. 27, or may alternatively be a separate component situated within the second stile 2008. In some examples, the second rider 2014 and/or second rider housing 2034 may be additionally or alternatively situated within the bottom rail 2004, or optionally within another portion of the first panel 2000 provided the second rider 2014 is operable to travel within the track 1104 and to interact with the pivot assembly 1120 as described herein.

Figure 15:
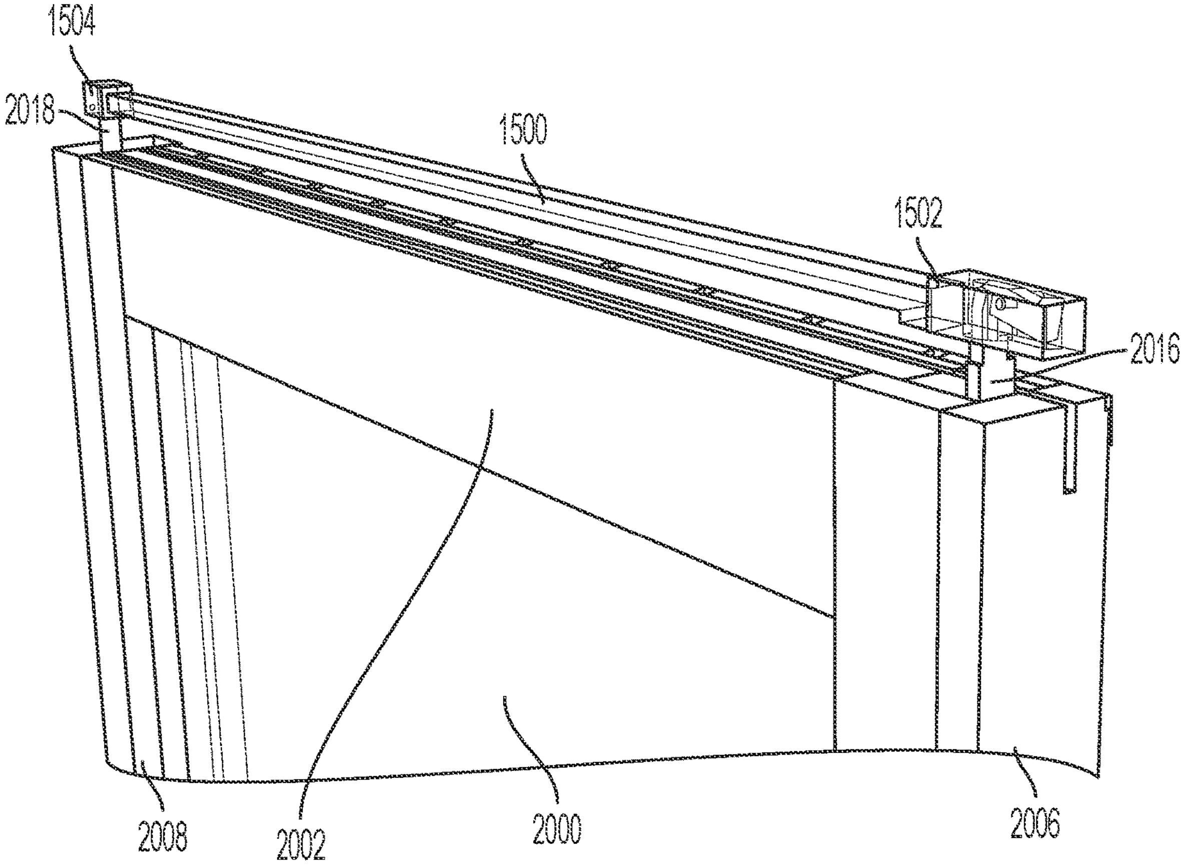
FIG. 15 shows a top rail of a first panel and a slider bar of a fenestration unit, according to some examples.

FIGS. 15-19 show the top rail 2002 of the first panel 2000 and the slider bar 1500, according to some examples. As shown in FIG. 15, the slider bar 1500 extends above and along the top rail 2002. The slider bar 1500 may extend across the entire width or a portion of less than all of the width of the top rail 2002. For instance, in various examples, the slider bar 1500 extends substantially (e.g., more than 70%, 80%, or 90%) of a width of the first panel 2000. The slider bar 1500 generally includes a first end region 1502 and a second end region 1504 opposite the first end region 1502 along the slider bar 1500. As shown, the slider bar 1500 is couplable with the first panel 2000 such that the first end region 1502 is situated near or proximate the first stile 2006, while the second end region 1504 is situated near or proximate the second stile 2008. In various examples, the first panel 2000 is couplable with the slider bar 1500 at each of the first and second stiles 2006 and 2008. In some examples, one of the first and second stiles 2006 and 2008 is pivotally coupled with the slider bar 1500 while the other of the first and second stiles 2006 and 2008 is releasably coupled with the slider bar 1500, as described further below.

As shown in FIG. 15, a retractable bolt 2016 forms a first coupling between the slider bar 1500 and the first panel 2000 at or proximate the first stile 2006 and the first end region 1502, while a pivot bolt 2018 forms a second coupling between the slider bar 1500 and the first panel 2000 at or proximate the second stile 2008 and the second end region 1504. In various examples, the retractable bolt 2016 is operable to be retracted relative to the slider bar 1500, while the pivot bolt 2018 is operable to pivot or rotate relative to the slider bar 1500, as discussed further below. That is, in various examples, the pivot bolt 2018 is operable to maintain a pivotal coupling between the first panel 2000 and the slider bar 1500 while the retractable bolt 2016 is retracted from the slider bar 1500 such that the first panel 2000 can rotate relative to the slider bar 1500.

In various embodiments, slider bar 1500 is configured to be received and/or secured (e.g., slideably) by the head 1200, such as by the slider track 1206. For example, the slider bar 1500 is configured to be received by the slider track 1206 such that the first and second flanges 1208 and 1210 support the first end region 1502 and the second end region 1504 of the slider bar 1500. In some embodiments, the slider bar 1500 and/or the slider track 1206 comprises a low-friction interface such that the slider bar 1500 is operable to slide within the slider track 1206. In various examples, the slider bar 1500 slides within the slider track 1206 as the first panel 2000 is translated relative to the frame 1000. As such, in various examples, the slider bar 1500 operates as a bearing between the first panel 2000 and the head 1200 of the frame 1000.

In various examples, the retractable bolt 2016 is operable to form a releasable coupling between the first panel 2000 and the slider bar 1500 at or proximate the first stile 2006, as shown in FIG. 15. For example, the retractable bolt 2016 is configured to transition from an extended or first position to a retracted or second position. The retractable bolt 2016 is shown in the extended or first position in FIGS. 16 and 17.

In the extended or first position, the retractable bolt 2016 extends from the first panel 2000 into a portion of the slider bar 1500. As shown in FIG. 15, the retractable bolt 2016 extends into a housing or cavity of the first end region 1502 to form a couple between the first panel 2000 and the slider bar 1500. In the retracted or second position, the retractable bolt 2016 is retracted from the slider bar 1500 such that a clearance is defined between the retractable bolt 2016 and the slider bar 1500. As such, retracting the retractable bolt 2016 to the retracted or second position operates to at least partially decouple the first panel 2000 from the slider bar 1500 (e.g., by decoupling the first stile 2006 from the slider bar 1500). In some examples, therefore, retracting the retractable bolt 2016 to the retracted or second position operates to decouple the first stile 2006 from the slider bar 1500. In some examples, the retractable bolt 2016 is operable to be retracted such that an end of the retractable bolt 2016 is positioned below the top of the frame of the first panel 2000 (e.g., between the top and bottom of the frame of the first panel 2000).

Figure 16:
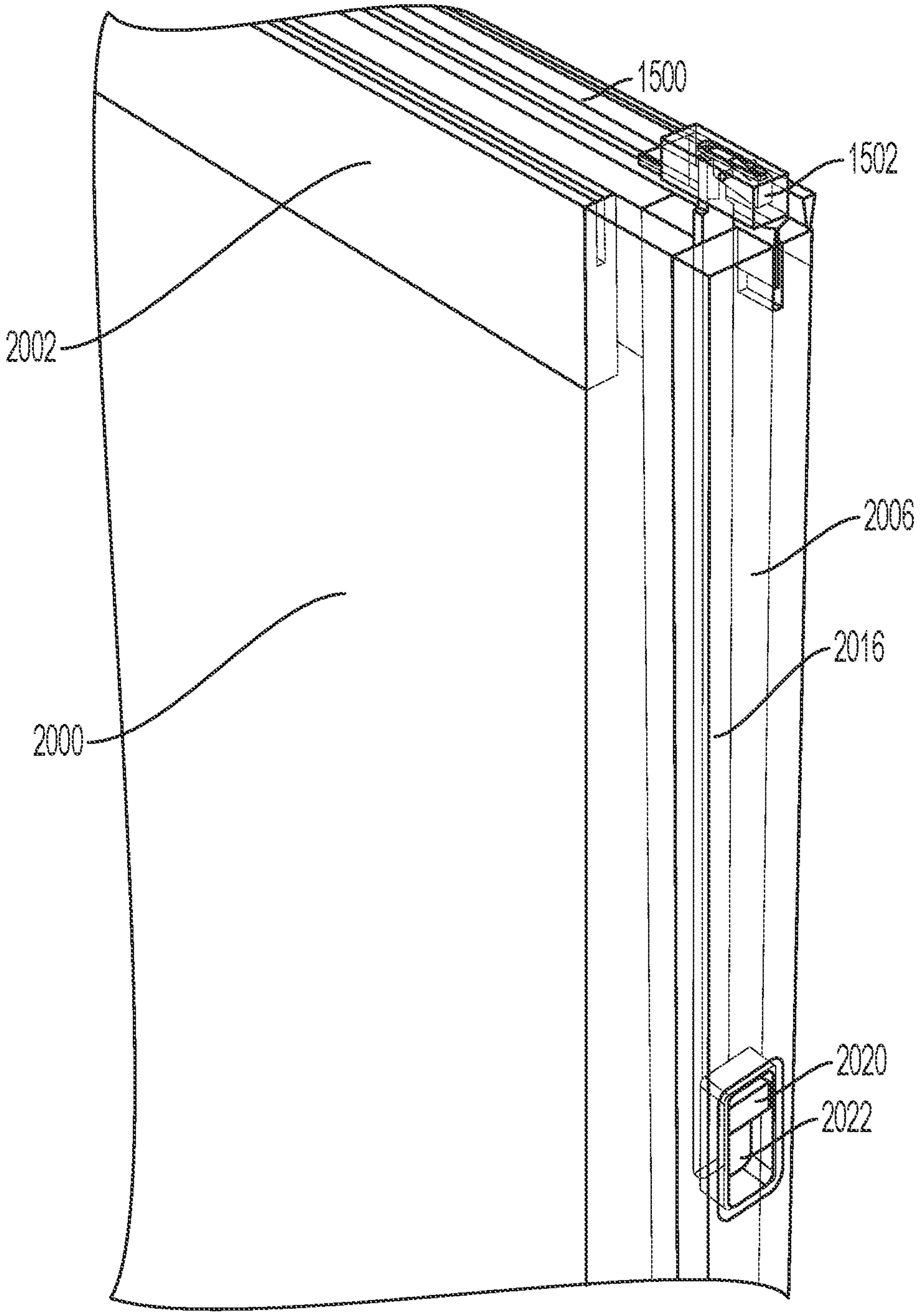
FIG. 16 shows a retractable bolt of the first panel, according to some examples.

Turning now to FIG. 16, in some examples, the retractable bolt 2016 is operatively coupled to a bolt control member 2020 received in a bolt control cutout 2022 defined by the first stile 2006 of the first panel 2000. The retractable bolt 2016 is slideable relative to each of the first panel 2000 and the slider bar 1500, such that the bolt control member 2020 can be actuated to cause a resulting translation of the retractable bolt 2016. In some examples, actuation of the bolt control member 2020 is constrained based on a position of the first panel 2000 within the frame 1000 of the fenestration unit 10. For instance, the fenestration unit 10 may be configured such that the bolt control member 2020 can be actuated within the bolt control cutout 2022 when the first panel 2000 is in a designated position, such as the pivot-ready position. In some examples, the fenestration unit 10 may be configured such that the bolt control member 2020 is prevented from being actuated unless the first panel 2000 is in the pivot-ready position. For instance, the bolt control member 2020 may prevented from being actuated when the first panel 2000 is in one or more of the closed position, the partially opened position, or the fully opened position.

Figure 17:
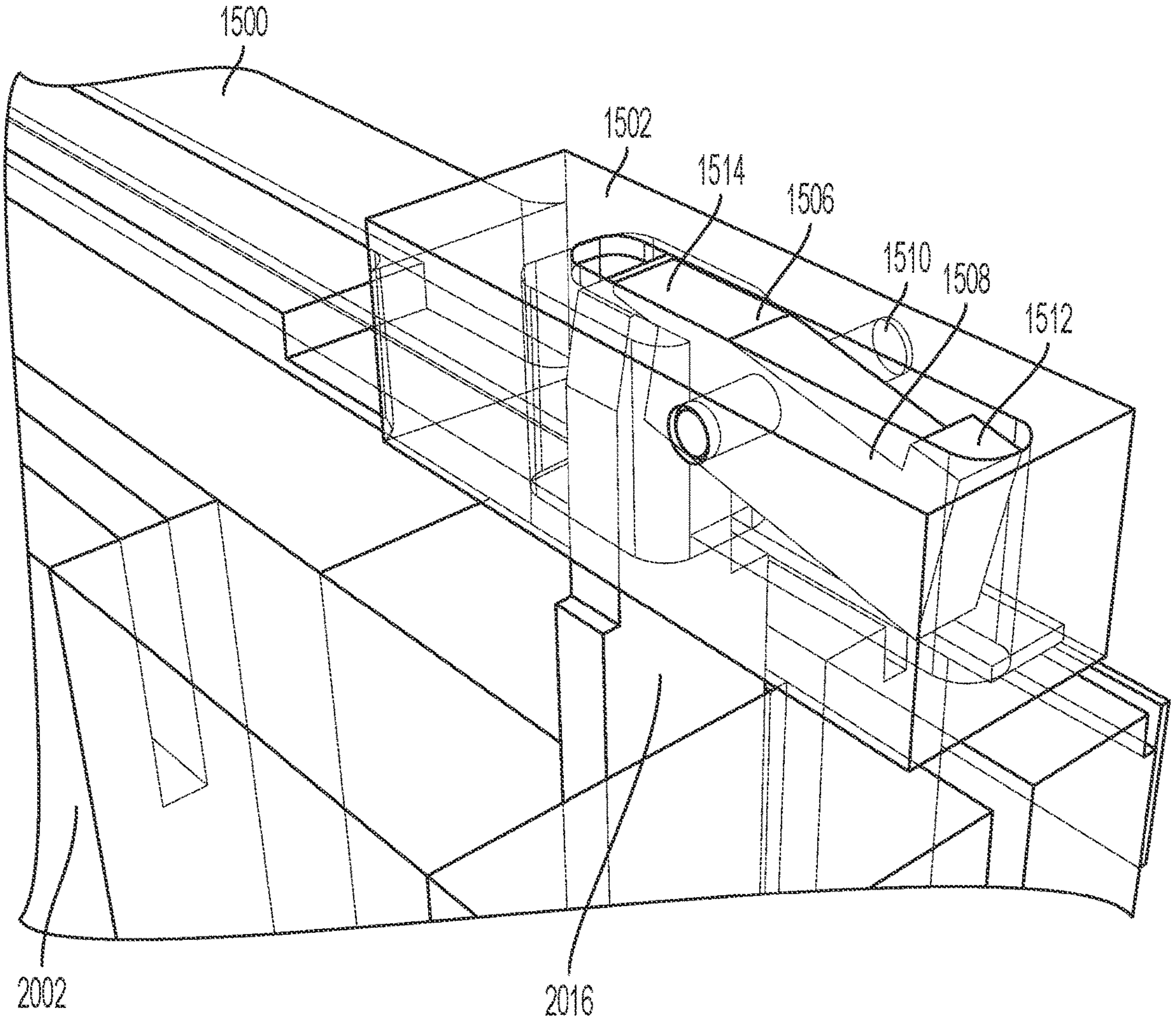
FIG. 17 shows a slider bar strike of the slider bar engaged with the retractable bolt of FIG. 16, according to some examples.

In some examples, the slider bar 1500 further includes a slider bar strike 1506. In some examples, the slider bar strike 1506 is situated within a housing of the first end region 1502, as shown in FIG. 17. The slider bar strike 1506 is configured to be engaged by the retractable bolt 2016 when the retractable bolt 2016 is in the extended or first position. In certain embodiments, the slider bar strike 1506 includes a strike body 1508 rotatably coupled to the first end region 1502, such as via a strike pivot 1510. As illustrated, the strike body 1508 includes a strike bumper 1512 and a strike lever 1514 positioned at opposite sides of the strike pivot 1510 to form an associated pivot relationship with one another about the strike pivot 1510 (e.g., seesaw-like). Such a configuration provides that when the retractable bolt 2016 is extended or in the first position, the strike lever 1514 is engaged by the retractable bolt 2016 (e.g., such as by an end of the retractable bolt 2016) and/or urged upward or away from the first panel 2000. Such an urging of the strike lever 1514 away from the first panel 2000 causes the strike bumper 1512 to be urged in an opposing direction (e.g., lowered or retracted toward the first panel 2000). In some examples, the strike bumper 1512 is lowered into the housing or cavity of the first end region 1502 of the slider bar 1500 within which the slider bar strike 1506 is housed.

Figure 18:
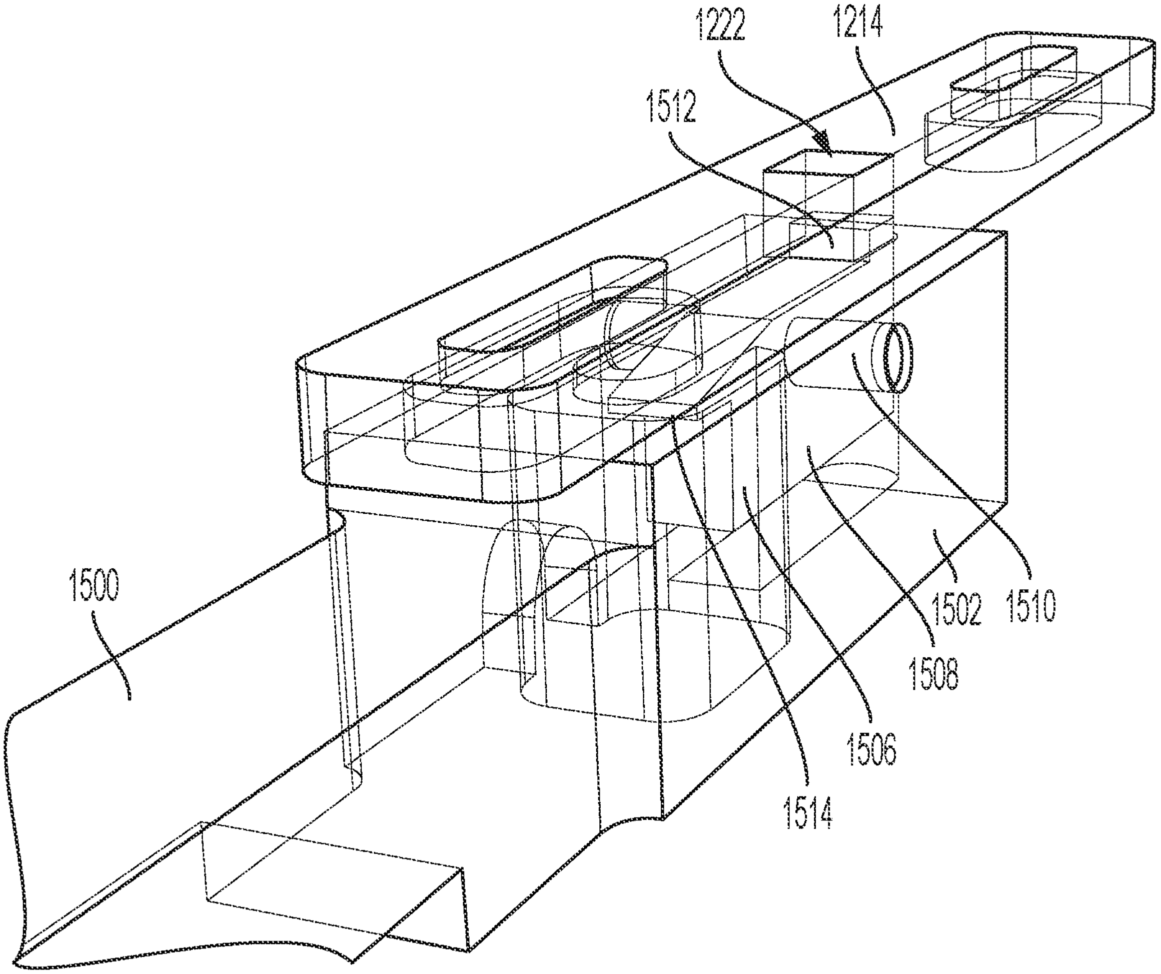
FIG. 18 shows the slider bar strike of FIG. 17 engaged with the slider bar, according to some examples.

In various embodiments, the slider bar strike 1506 is configured such that the strike bumper 1512 is urged or otherwise biased upward away from the first panel 2000 when the retractable bolt 2016 is retracted or in the second position and not engaged with the slider bar strike 1506. In various examples, when urged upward away from the first panel 2000, the strike bumper 1512 extends out of the slider bar 1500, such as out of a top of the slider bar 1500 toward the head 1200 of the frame 1000. When the strike bumper 1512 is extended or raised (e.g., the retractable bolt 2016 is retracted), and when the first panel 2000 is properly positioned relative to the frame 1000 and the slider bar catch 1214, the strike bumper 1512 is receivable and/or securable within a receptacle 2024 of the slider bar catch 1214, as shown in FIG. 18. In certain examples, when the strike bumper 1512 is secured by the slider bar catch 1214, the slider bar 1500 is secured to the slider track 1206 such that the slider bar 1500 and the frame 1000 are constrained against movement relative to one another. As mentioned above, the first panel 2000 is coupled to the slider bar 1500 via the pivot bolt 2018 and the retractable bolt 2016. Accordingly, with the retractable bolt 2016 retracted, the first panel 2000 is decoupled from the slider bar 1500, but for the pivot bolt 2018. As such, with the retractable bolt 2016 retracted, the first panel 2000 is pivotally coupled with the slider bar 1500.

Figure 19:
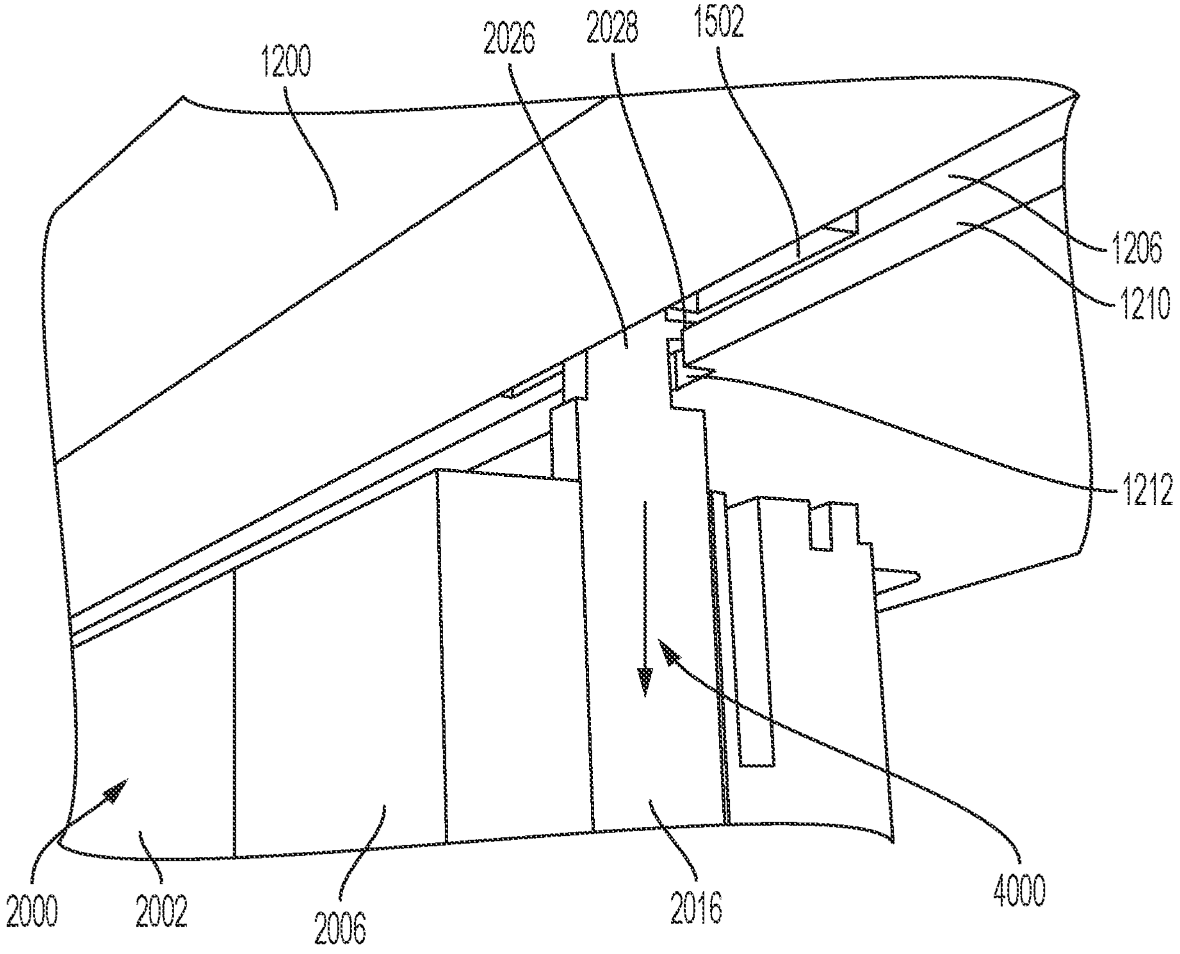
FIG. 19 shows the retractable bolt aligned with a portion of the head, according to some examples.

In certain examples, the retractable bolt 2016 is configured to be retractable or releasable from the slider bar 1500 when the slider bar 1500 is positioned in one or more release locations along the longitudinal length of the slider track 1206. For example, the retractable bolt 2016 is configured to be releasable from the first end region 1502 when the retractable bolt 2016 is aligned with a release cutout 1212 of the head 1200, as shown in FIG. 19. That is, when the retractable bolt is aligned with the release cutout 1212 as shown in FIG. 19, the retractable bolt 2016 can be actuated relative to the slider bar 1500 (e.g., moved upwards or downwards relative to the slider bar 1500). The release cutout 1212 is a relief in one or more of the first and second flanges 1208 and 1210.

In some examples, when the retractable bolt 2016 is misaligned with, or not aligned with, the release cutout 1212, the retractable bolt 2016 cannot be actuated relative to the slider bar 1500. As shown in FIG. 19, in some examples, an end 2026 of the retractable bolt 2016 includes a tab 2028 that operates to prevent retraction of the retractable bolt 2016 when the retractable bolt 2016 is not aligned with the release cutout 1212. For instance, the tab 2028 overhangs one or the other of the first and second flanges 1208 and 1210 when the retractable bolt 2016 is not aligned with the release cutout 1212. However, when properly aligned with the release cutout 1212, the first and second flanges 1208 and 1210 do not obstruct the tab 2028 (e.g., the tab 2028 can pass through the release cutout 1212) such that the retractable bolt 2016 can be retracted consistent with the discussion above. When retracted, the retractable bolt 2016 is retracted in the direction of arrow 4000. While the release cutout 1212 is shown as being formed in the first flange 1208, it will be appreciated that the release cutout 1212 may additionally or alternatively be formed in the second flange 1210.

Figure 20:
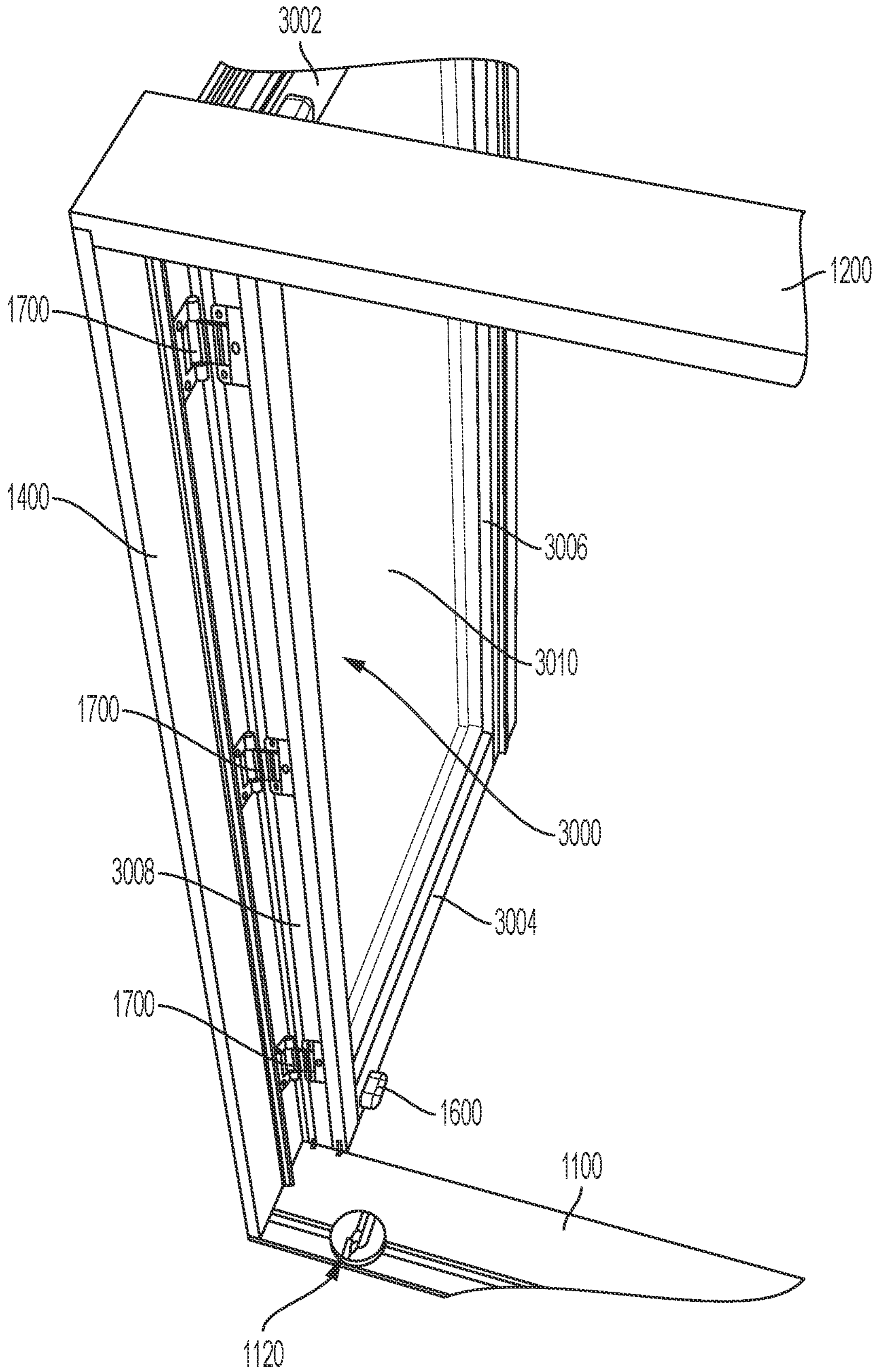
FIG. 20 shows the second panel in a pivoted configuration relative to the frame, according to some examples.

FIG. 20 shows the second panel 3000 of the fenestration unit 10, in a hinged open configuration, according to some examples. The first panel 2000 has been removed from FIG. 20 for clarity. As mentioned above, the second panel 3000 includes a top rail 3002, a bottom rail 3004, a first stile 3006, a second stile 3008, and an insert 3010. In various embodiments, the second stile 3008 is rotatably or hingedly coupled to the second jamb 1400. For example, the fenestration unit 10 includes one or more pivot assemblies, such as one or more hinges 1700, which are coupled with the second stile 3008 and configured to pivotally couple the second panel 3000 to the second jamb 1400 of the frame 1000. In the illustrated example, the one or more hinges 1700 are positioned along the height of the second panel 3000 from the sill 1100 to the head 1200. While the pivot assemblies are shown in FIG. 20 as hinges, it will be appreciated that any of a variety of actuation mechanisms, including pivot bolts, may be utilized to facilitate actuation of the second panel 3000 relative to the frame 1000. As shown in FIG. 20, the second panel 3000 is hinged open approximately 90 degrees relative to the frame 1000. In various examples, the second panel 3000 may be pivoted greater than 90 degrees, such as between 90 degrees and 180 degrees relative to the frame 1000, and thus may be hinged open greater than 90 degrees relative to the frame 1000.

FIGS. 21-24 show a lock assembly 3100 of the second panel 3000, according to some examples. The lock assembly 3100 is coupled with the second panel 3000, and is generally configured to interface with each of the strike plate 1110 of the sill 1100 and the strike plate 1202 of the head 1200 such that the second panel 3000 can be selectively transitioned between a fully constrained configuration and a partially constrained configuration. In various examples, in the fully constrained configuration, the second panel 3000 is coupled with the frame 1000 such that the second panel 3000 is constrained against translation and rotation relative to the frame 1000. In the partially constrained configuration, the second panel 3000 is operable to be pivoted relative to the frame 1000. The lock assembly 3100 is therefore configured to provide users with the ability to selectively decouple a portion of the second panel 3000 from the frame 1000 such that the second panel 3000 can be pivoted open relative to the frame 1000. In some examples, as discussed further below, the second panel 3000 can be selectively decoupled from the frame 1000 at or proximate the first stile 3006 such that the second panel 3000 is free to pivot relative to the frame 1000, such as about the hinges 1700.

In various embodiments, the lock assembly 3100 includes a first lock bolt 3102, a second lock bolt 3104, and an actuator 3106 operably coupled with the first and second lock bolts 3102 and 3104 to cause actuation of the same. In various examples, the first and second lock bolts 3102 and 3104 are operable to be actuated between engaged and disengaged positions. In the engaged position, the first and second lock bolts 3102 and 3104 engage the frame 1000 such that the second panel 3000 is fully constrained by the frame 1000, as discussed further below. In the disengaged position, the first and second lock bolts 3102 and 3104 are disengaged from the frame 1000 such that the second panel 3000 is operable to be pivoted relative to the frame 1000, as discussed further below.

The actuator 3106 may be any suitable component operable to drive or otherwise cause actuation (e.g., linear actuation) of the first and second lock bolts 3102 and 3104 relative to one or more of the second panel 3000, the sill 1100, and the head 1200. In some examples, the actuator 3106 includes a locking feature that can selectively lock one or more of the first and second lock bolts 3102 and 3104 in an engaged or disengaged position. In some embodiments, the lock assembly 3100 additionally includes a plurality of linkages coupling the actuator 3106 with the first and second lock bolts 3102 and 3104. For example, as shown in FIG. 21, a first connector bar 3108 operatively couples the first lock bolt 3102 to the actuator 3106, and a second connector bar 3110 operatively couples the second lock bolt 3104 to the actuator 3106.

While the lock assembly 3100 is shown as being coupled with the first stile 3006 of the second panel 3000, it is to be appreciated that the lock assembly 3100 may alternatively be coupled with the frame 1000 such that the first and second lock bolts 3102 and 3104 are housed by one or more portions of the frame 1000 and selectively actuated to engage and disengage the second panel 3000.

Figure 21:
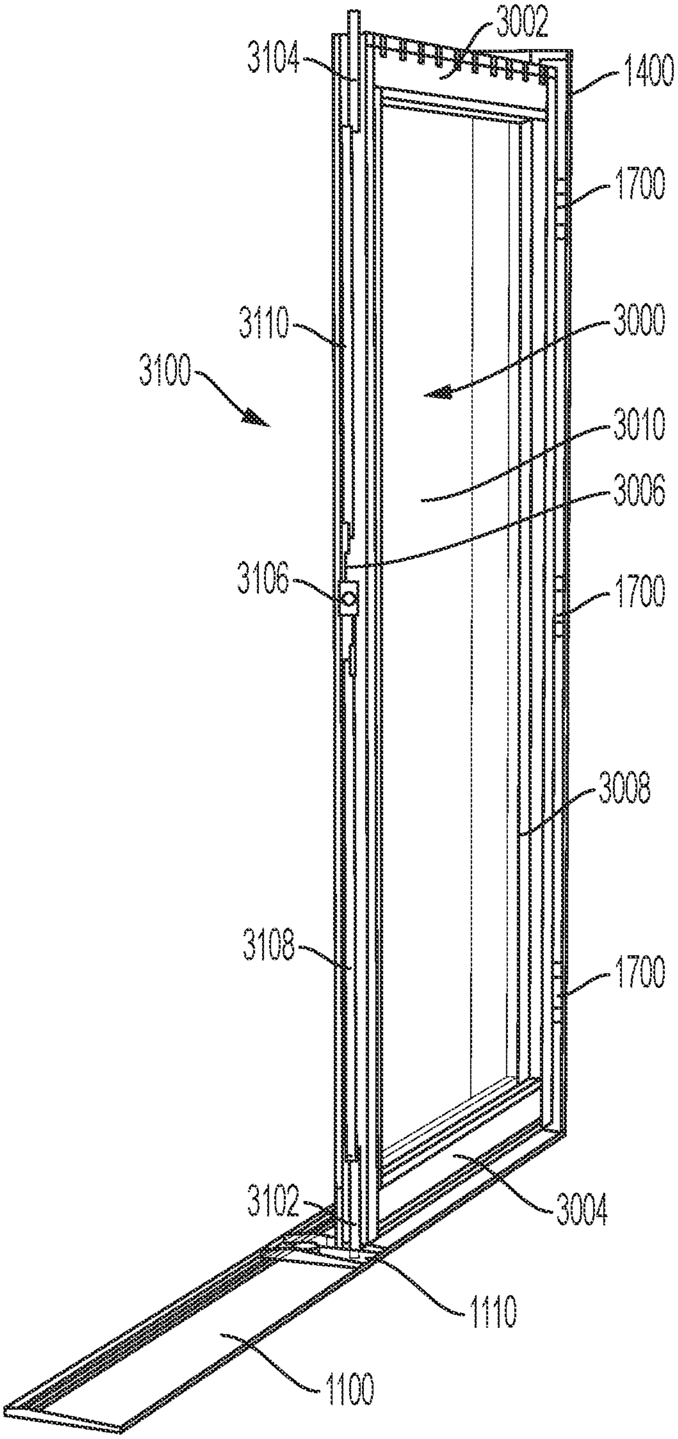
FIG. 21 shows a lock assembly of the second panel, according to some examples.
Figure 22:
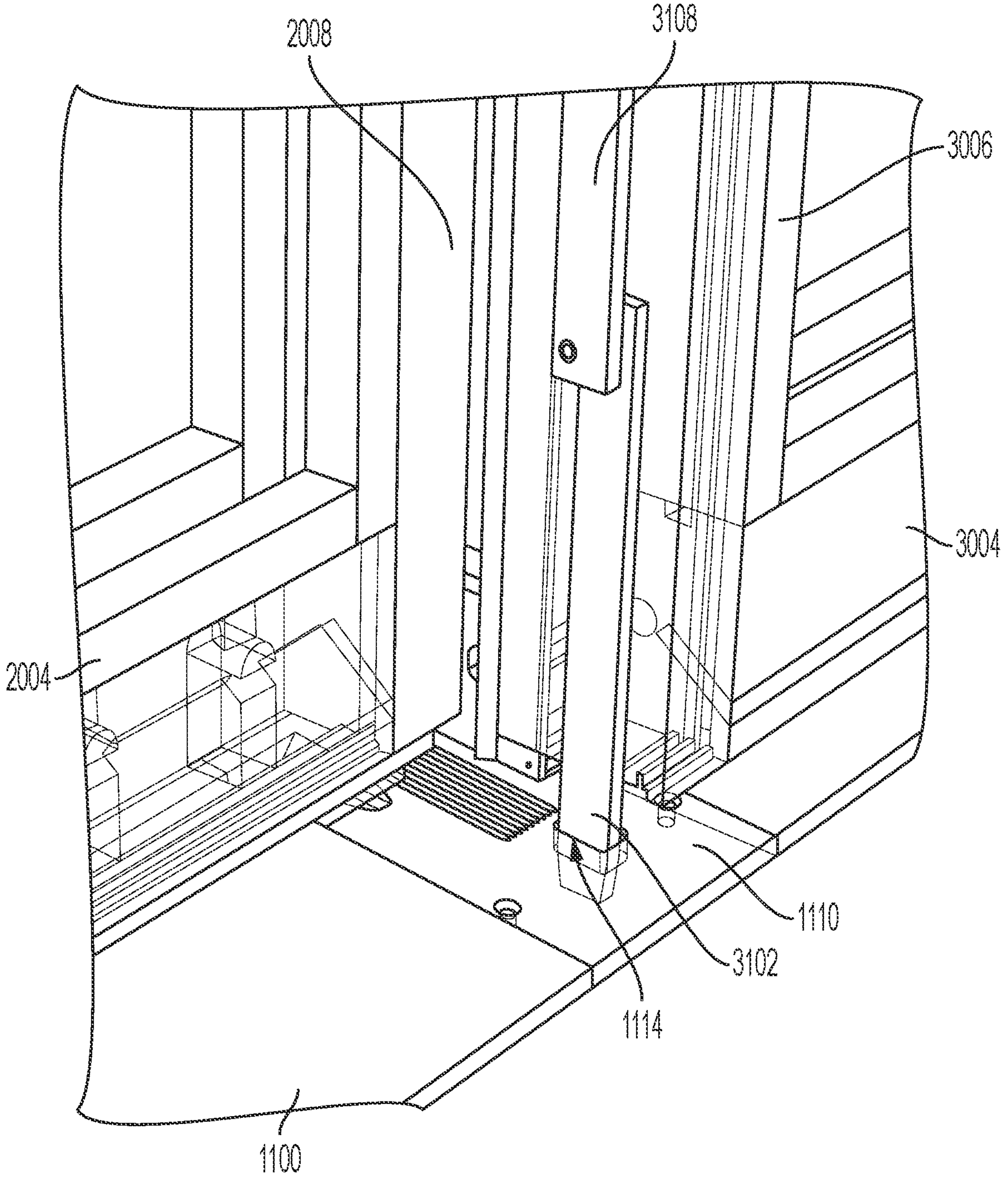
FIG. 22 shows a lock bolt of the lock assembly of FIG. 21 engaged with a sill strike plate, according to some examples.
Figure 23:
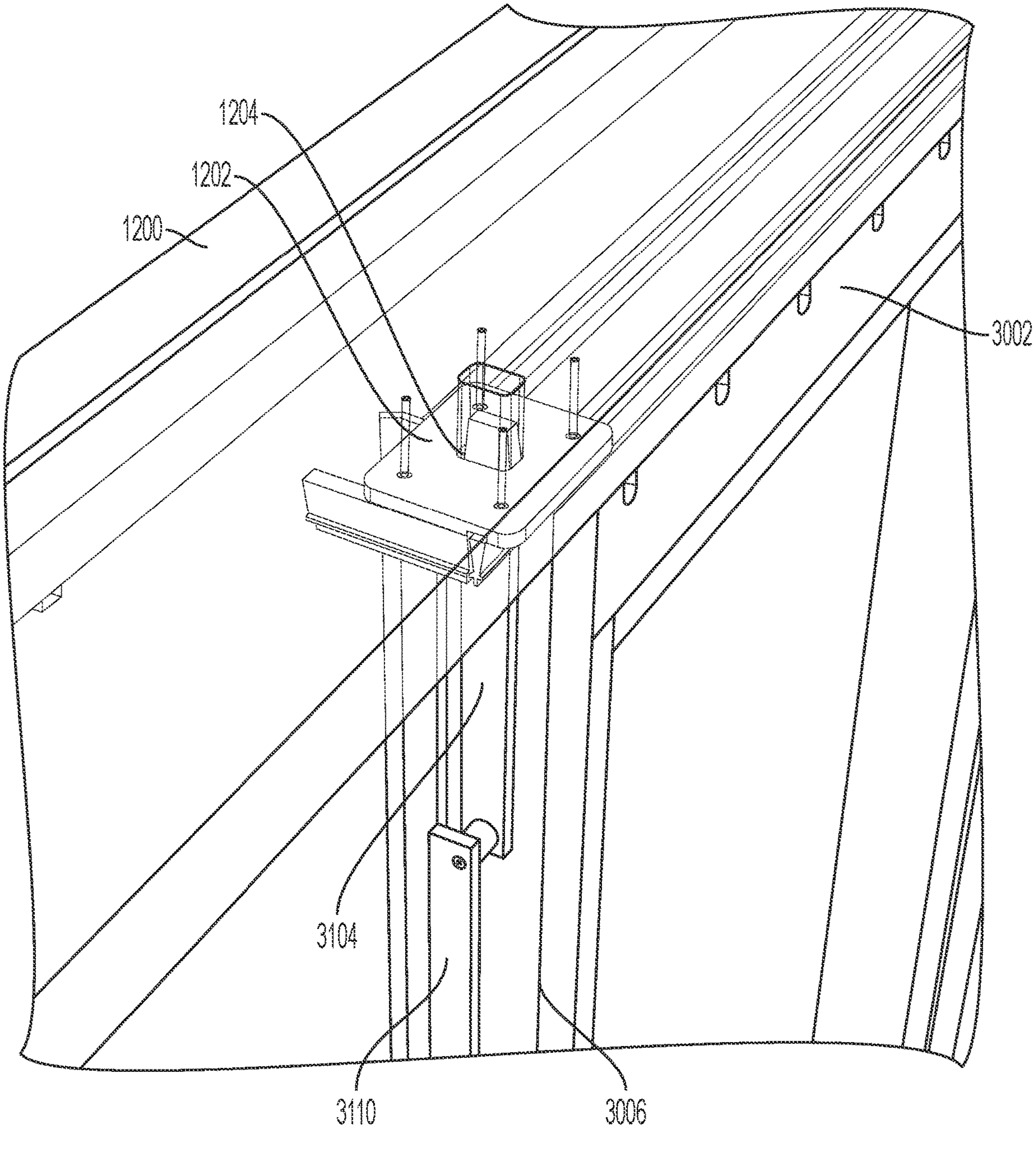
FIG. 23 shows a lock bolt of the lock assembly of FIG. 21 engaged with a head strike plate, according to some examples.

With continued reference to FIGS. 21-23, the lock assembly 3100 is configured to releasably couple the first stile 3006 of the second panel 3000 with the sill 1100 and the head 1200 of the frame 1000. As shown, the first lock bolt 3102 is configured to be received and/or secured by the bolt receptacle 1114 of the strike plate 1110 when extended. Engagement between the first lock bolt 3102 and the bolt receptacle 1114 operates to secure the second panel 3000 to the sill 1100 at least at or proximate to the first stile 3006 of the second panel 3000, as shown in FIG. 22. Conversely, as illustrated in FIG. 23, the second lock bolt 3104 is configured to be received and/or secured by the bolt receptacle 1204 of the strike plate 1202 of the head 1200 when extended. Engagement between the first lock bolt 3102 and the bolt receptacle 1114 operates to secure the second panel 3000 to the head 1200 at or proximate to the first stile 3006 of the second panel 3000, as shown in FIG. 23.

Figure 24:
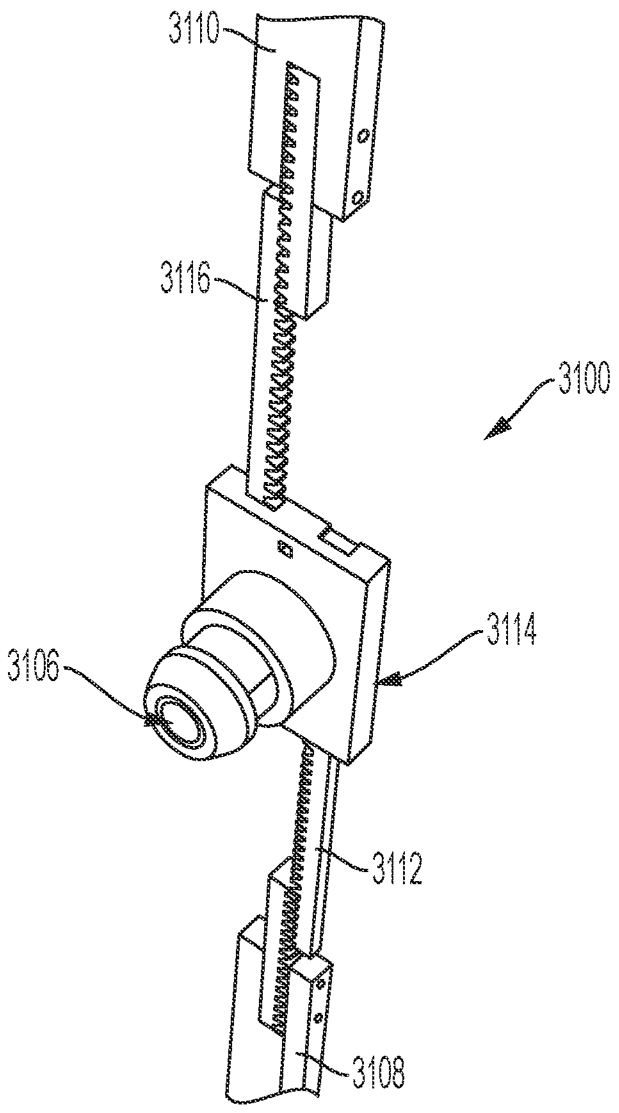
FIG. 24 shows the lock assembly of FIG. 21, according to some examples.

In some examples, the first connector bar 3108 and the second connector bar 3110 are operatively coupled to the actuator 3106, as mentioned above. In some examples, the actuator 3106 has a rack and pinion relationship with each of the first and second connector bars 3108 and 3110, as shown in FIG. 24, although other couplings are contemplated. In the example configuration illustrated in FIG. 24, the lock assembly 3100 includes the first and second connector bars 3108 and 3110, where a first rack 3112 extends from the first connector bar 3108 into the actuator housing 3114. Similarly, a second rack 3116 extends from the second connector bar 3110 into the actuator housing 3114. Contained within the actuator housing 3114 is a pinion that can be driven to cause actuation of the first and second racks 3112 and 3116 relative to the actuator housing 3114, thereby causing actuation of the first and second connector bars 3108 and 3110 and the first and second lock bolts 3102 and 3104.

Figure 25:
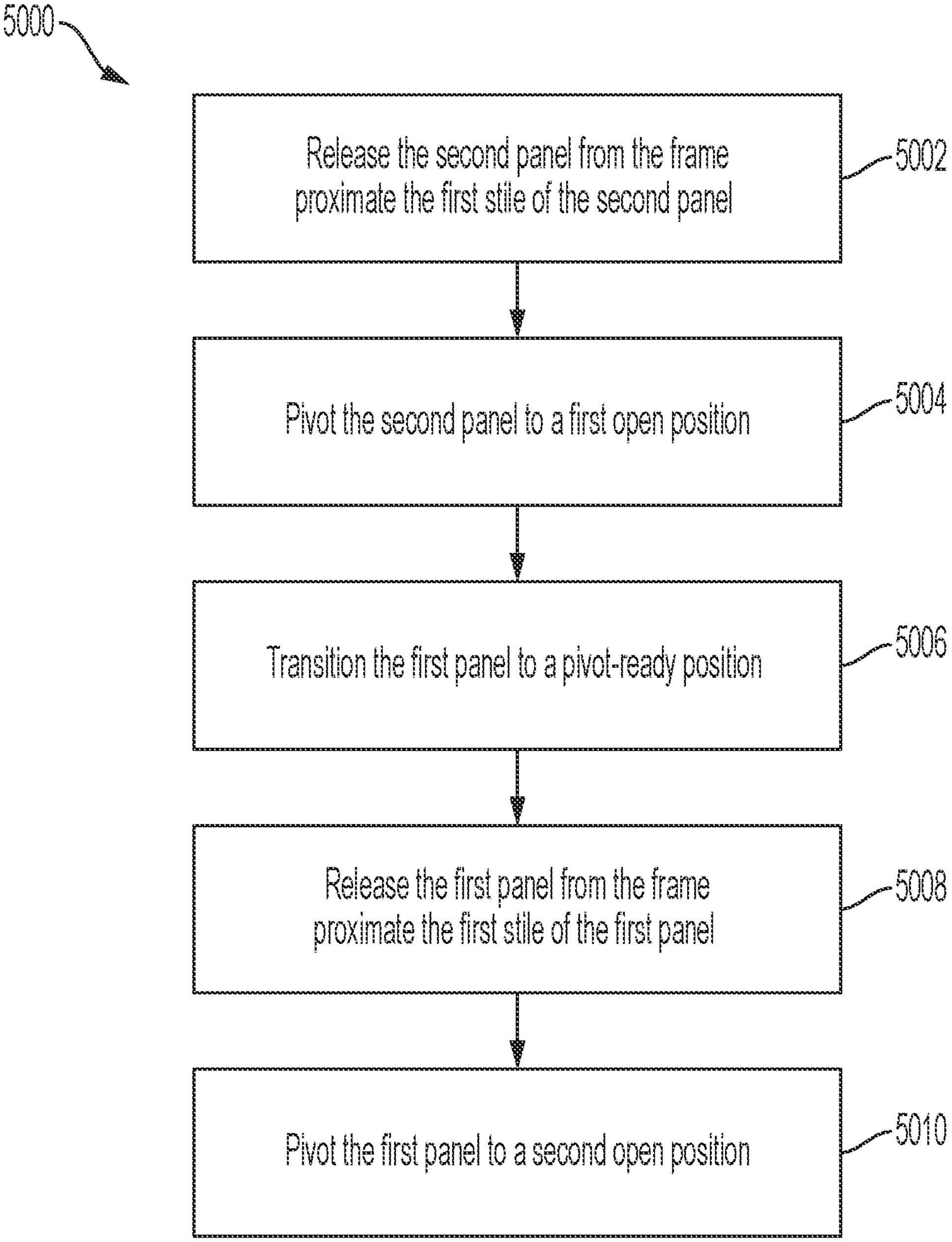
FIG. 25 shows a method for operating a fenestration unit, according to some examples.

FIG. 25 depicts an illustrative method 5000 for operating a fenestration unit, such as fenestration unit 10, according to some examples. The method 5000 includes step 5002, which includes releasing the second panel 3000 from the frame 1000 proximate the first stile 3006. In various examples, step 5002 may be performed with the first panel 2000 in any of the closed position (FIG. 1), the partially opened position (FIG. 2), and the fully opened position (FIG. 3). That is, in various examples, the second panel 3000 can be released or otherwise decoupled from the frame 1000 proximate the first stile 3006 independent of the position of the first panel 2000 within the frame 1000.

Turning back now to FIGS. 21-24, in some examples, releasing the second panel 3000 from the frame 1000 includes actuating the lock assembly 3100 to cause the lock bolts (e.g., first and second lock bolts 3102 and 3104) to decouple from the frame 1000, consistent with the discussion above. While the fenestration unit 10 is shown in FIG. 21 as including a first lock bolt 3102 and a second lock bolt 3104, the fenestration unit 10 may optionally include only one lock bolt (e.g., such as the first lock bolt 3102 or the second lock bolt 3104). In various examples, actuation of the lock assembly 3100 causes the first lock bolt 3102 to be retracted from the panel bolt receptacle 1114 of the strike plate 1110, thereby decoupling the second panel 3000 from the sill 1100 of the frame 1000 proximate the first stile 3006. Similarly, actuation of the lock assembly 3100 causes the second lock bolt 3104 to be retracted from the bolt receptacle 1204 of the strike plate 1202, thereby decoupling the second panel 3000 from the head 1200 of the frame 1000 proximate the first stile 3006.

In various examples, after releasing the second panel 3000 from the frame 1000 proximate the first stile 3006, the second panel 3000 is operable to be pivoted to an open position (e.g., step 5004). In various examples, pivoting the second panel 3000 to the open position includes pivoting the second panel 3000 relative to the frame 1000. In some examples, the second panel 3000 is pivoted relative to the frame 1000 about the second stile 3008. For instance, the fenestration unit 10 includes one or more hinges 1700 that couple the second stile 3008 of the second panel 3000 to the second jamb 1400 of the frame 1000. In some such examples, the second panel 3000 is pivoted about the hinges 1700. The second panel 3000 is shown pivoted to the open position in FIGS. 4, 5 and 20.

As shown in FIG. 4, the method 5000 further includes step 5006, which includes positioning the first panel 2000 in the pivot-ready position. The pivot-ready position corresponds to an open position of the first panel 2000.

Figure 29:
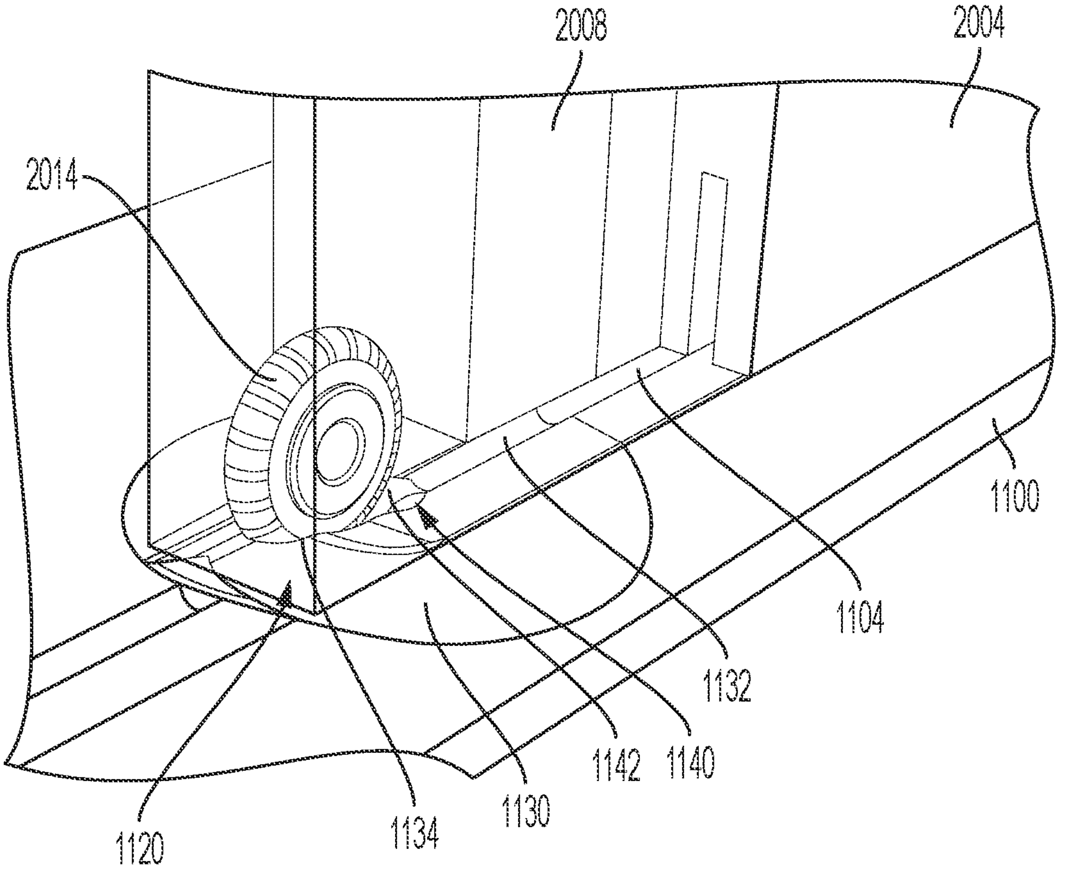
FIG. 29 shows the sill of the fenestration unit with various components removed for ease of visualizing the second roller engaged with a rider chock of the pivot assembly when the fenestration unit is in the pivot-ready position, according to some examples.

When the first panel 2000 is in the pivot-ready position (FIG. 4), the first rider 2012 is aligned with the rider release channel 1112 of the strike plate 1110 of the sill 1100, and the second rider 2014 is positioned adjacent the rider chock 1134 such that the hub 1140 is situated between the first rider 2012 and the second rider 2014. The position of the first rider 2012 relative to the rider release channel 1112 when the first panel 2000 is in the pivot-ready position is shown in FIG. 28, and the position of the second rider 2014 relative to the hub 1140 when the first panel 2000 is in the pivot-ready position is shown in FIG. 29. In FIG. 28, the bottom rail 2004 of the first panel 2000 has been removed for ease of visualization of other components. In FIG. 29 a portion of the second stile 2008 and various components associated with the second rider 2014 have been removed for ease of visualizing other components.

When the first panel 2000 is in the fully opened position (FIG. 3), the first rider 2012 is misaligned with the rider release channel 1112 of the strike plate 1110 of the sill 1100, and the second rider 2014 is positioned such that the hub 1140 is situated between the rider chock 1134 of the turntable 1130 and the second rider 2014. The position of the first rider 2012 relative to the rider release channel 1112 when the first panel 2000 is in the fully opened position is shown in FIG. 26, and the position of the second rider 2014 relative to the hub 1140 when the first panel 2000 is in the fully opened position is shown in FIG. 27.

As shown in FIGS. 3 and 4, when the first panel 2000 is in the pivot-ready position, the first panel 2000 is more proximate the second jamb 1400 than when the first panel 2000 is in the fully opened position. Thus, in various examples, the first panel 2000 is translated relative to the frame 1000 and toward the second jamb 1400 when transitioned from the fully opened position to the pivot-ready position.

In various examples, the first panel 2000 is transitioned to the pivot-ready position after the second panel 3000 is pivoted open relative to the frame 1000 (e.g., to the pivoted open position shown in FIG. 4, although in some examples, the first panel 2000 may be transitioned to the pivot-ready position prior to pivoting the second panel 3000 open. In some examples, the fenestration unit 10 includes one or more features that operate to prevent the first panel 2000 from being transitioned to the pivot-ready position until the second panel 3000 is pivoted open relative to the frame 1000. For instance, as discussed above, in various examples, one or more bump stops 1600 may be positioned along the fenestration unit 10 (e.g., such as along the first panel 2000), that constrain the second panel 3000 against transitioning to the pivot-ready position until a designated condition is satisfied (i.e., the bump stops 1600 cease to interfere with the transition of the first panel 2000 to the pivot-ready position). As shown in FIG. 3, the bump stops 1600 are positioned along the second panel 3000 such that the first panel 2000 is operable to be transitioned to the fully opened position while the second panel 3000 is in a closed position and coupled with the frame 1000. With the second panel 3000 is in a closed position and coupled with the frame 1000, however, the bump stops obstruct the first panel 2000 from transitioning to the pivot-ready position. As shown in FIG. 4, when the second panel 3000 is hinged/pivoted open relative to the frame 1000, the bump stops 1600 no longer interfere with the first panel 2000. As such, the first panel 2000 can be transitioned to the pivot-ready position.

With the first panel 2000 in the pivot-ready position, the first panel 2000 can be released from the frame 1000 at step 5008, such that the first panel 2000 can be pivoted relative to the frame 1000 from the pivot-ready position to form the second open configuration. Thus, in various embodiments, when the first panel 2000 is in the pivot-ready position, the first panel 2000 can be either pivoted relative to the frame 1000, or can alternatively be translated relative to the frame 1000. Conversely, in some such examples, when the first panel 2000 is in a configuration other than the pivot-ready position, the first panel 2000 is operable to be translated relative to the frame 1000 but is not operable to be pivoted relative to the frame 1000.

In various examples, releasing the first panel 2000 from the frame 1000 includes decoupling the first panel 2000 from the frame 1000 proximate the first stile 2006.

In various examples, step 5008 may be performed with the first panel 2000 in the pivot-ready position (FIG. 4). In some examples, releasing the first panel 2000 from the frame 1000 includes decoupling the first panel 2000 from the frame 1000 proximate the first stile 2006. In some examples, as mentioned above, a retractable bolt 2016 extends from the first panel 2000 (e.g., extends from the first stile 2006 of the first panel 2000) into the frame 1000 (e.g., extends into the slider bar 1500 situated within the slider track 1206 of the head 1200).

In certain examples, decoupling the first panel 2000 includes actuating the bolt control member 2020 to cause the retractable bolt 2016 to be retracted from the slider bar 1500. As a result, the retractable bolt 2016 is withdrawn from the slider bar 1500 and from contact with the slider bar strike 1506 consistent with the discussion above. In some examples, as mentioned above, removal of the retractable bolt 2016 from the slider bar 1500 causes the slider bar 1500 to become translationally fixed relative to the frame 1000. In particular, as mentioned above, removal of the retractable bolt 2016 from the slider bar 1500 causes the slider bar strike 1506 to pivot such that the strike bumper 1512 engages the slider bar catch 1214 (e.g., received within the strike bumper receptacle 1222) to lock the slider bar 1500 to the frame 1000. By locking the slider bar 1500 to the frame 1000 while the first panel 2000 is pivoted relative to the frame 1000 ensures that first panel 2000 can be easily recoupled with the slider bar 1500 upon being pivoted closed relative to the frame 1000. Such a configuration minimizes any need to realign the slider bar 1500 along the frame 1000 such that the retractable bolt 2016 can be advanced into the slider bar 1500 to couple to the first panel 2000 to the slider bar 1500 and the frame 1000. In various examples, with the retractable bolt 2016 withdrawn from the slider bar 1500, and with the first panel 2000 in the pivot-ready position, the first panel 2000 can be pivoted open to the second open position relative to the frame 1000 at step 5010. In various examples, pivoting the first panel 2000 to the second open position includes rotating the first panel 2000 relative to the frame 1000 about the second stile 2008. In some examples, the first panel 2000 is operable to be pivoted from an orientation that is substantially parallel to the frame 1000 (e.g., substantially parallel to the tracks 1102 and 1104) to being substantially perpendicular to the frame 1000.

Figure 30:
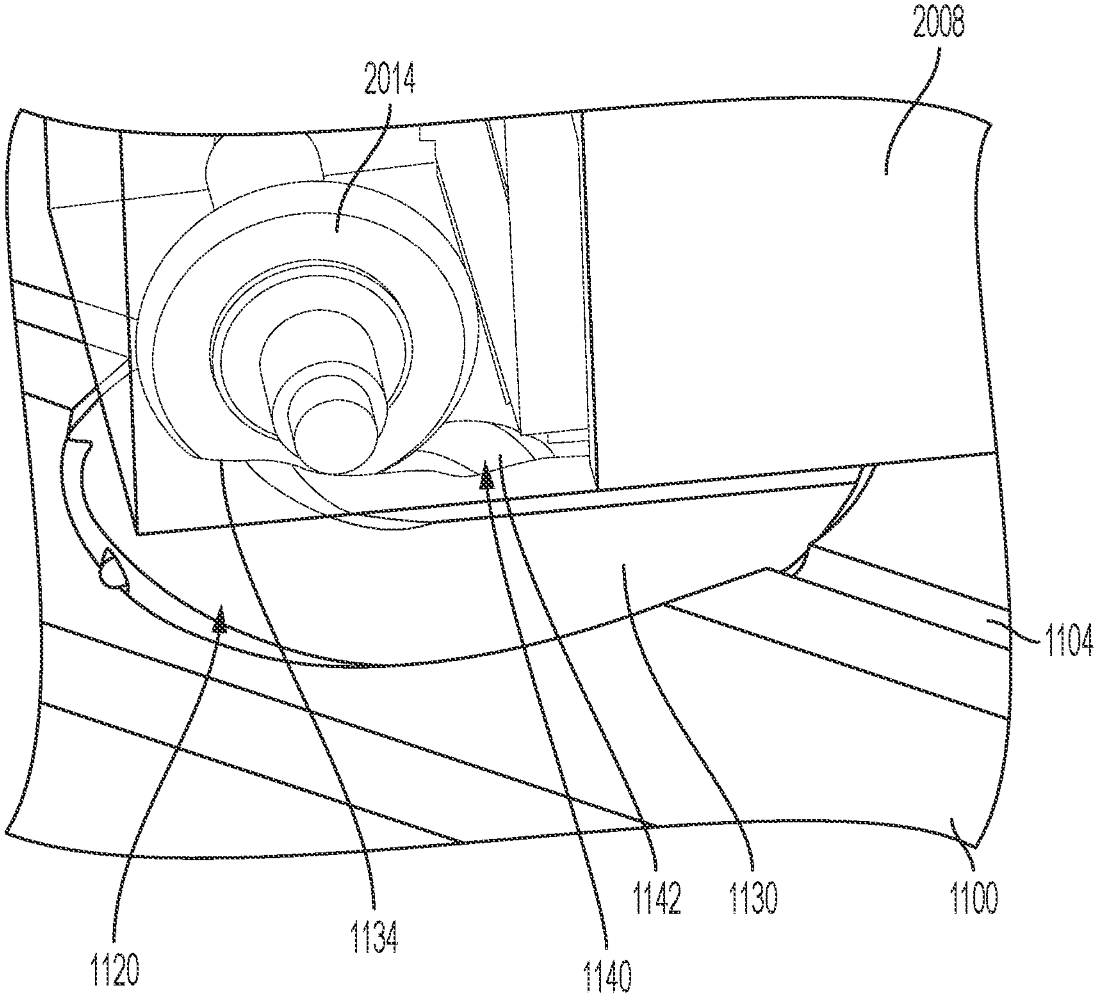
FIG. 30 shows the pivot assembly with the turntable rotate to an intermediate position, according to some examples.
Figure 31:
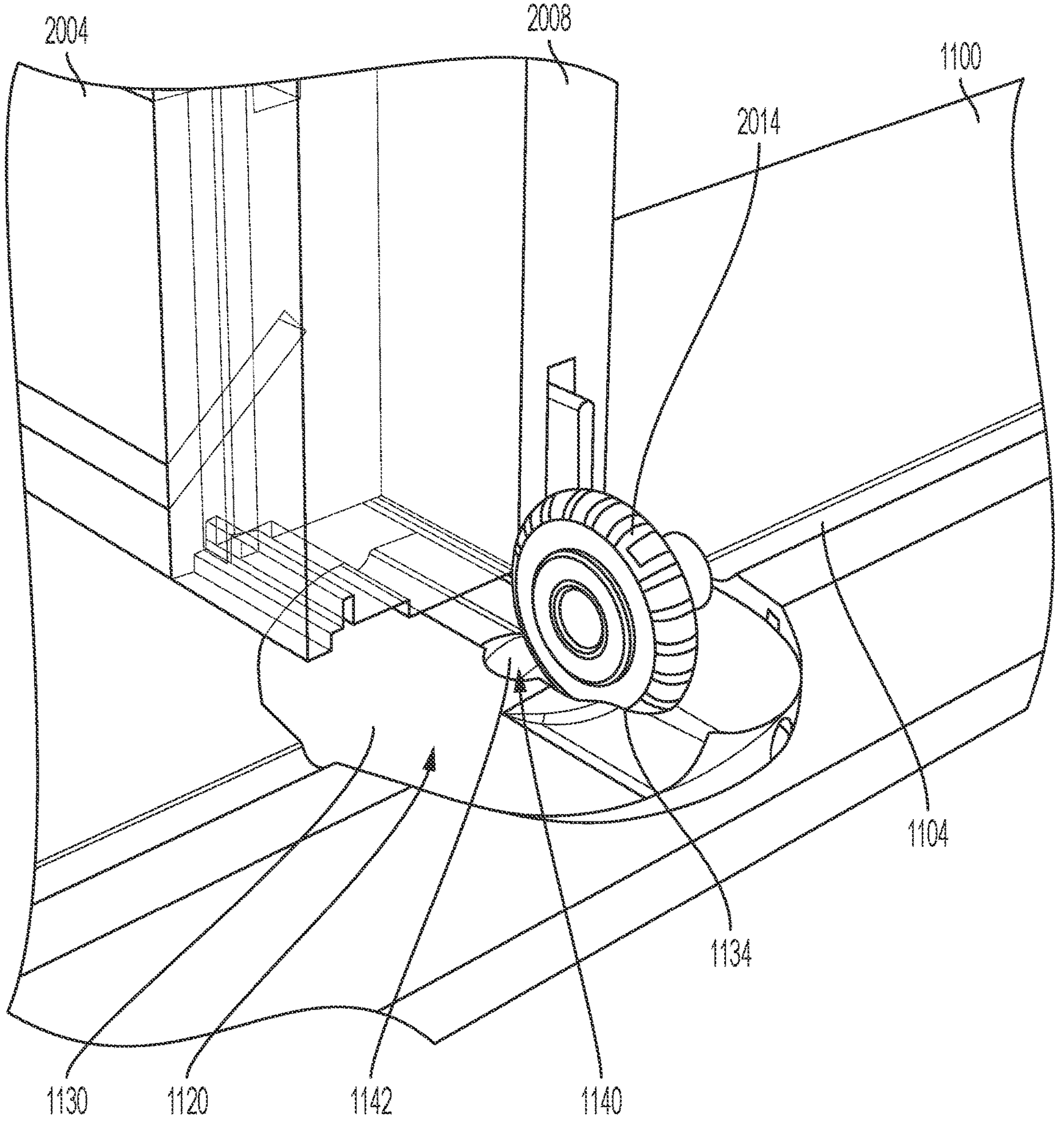
FIG. 31 shows an orientation of the turntable of the pivot assembly when the fenestration unit is in the second position, according to some examples.

In various examples, the turntable 1130 facilitates the pivoting of the first panel 2000 to the second open position. FIGS. 29-31 provide an example sequence of the turntable 1130 rotating in conjunction with the first panel 2000 transitioning from the pivot-ready position to the second open position. As mentioned above, FIG. 29 shows the orientation of the turntable 1130 relative to the frame 1000 and the first panel 2000, with the first panel 2000 in the pivot-ready position (e.g., the turntable 1130 is in an initial position). FIG. 31 shows the orientation of the turntable 1130 relative to the frame 1000 and the first panel 2000, with the first panel 2000 pivoted open relative to the frame 1000 to the second opened position (e.g., the turntable 1130 rotated approximately 90 degrees away from the initial position). FIG. 30 shows the orientation of the turntable 1130 relative to the frame 1000 and the first panel 2000, with the first panel 2000 pivoted to a position between the pivot-ready position and the second opened position (e.g., the turntable 1130 is rotated approximately 30 degrees away from the initial position).

As shown in FIG. 29, in the pivot-ready position, the second rider 2014 is situated between the rider chock 1134 and the hub 1140, with the turntable 1130 oriented such that the entry channel 1132 of the turntable 1130 is aligned with each of the hub channel 1142 and track 1104. With the entry channel 1132 to the turntable 1130 aligned with each of the hub channel 1142 and track 1104, the second rider 2014 can translate through each of the entry channel 1132, the hub channel 1142, and track 1104 freely. As shown in FIG. 30, the turntable 1130 is rotated relative to each of the hub 1140 and the sill 1100 of the frame 1000 as the first panel 2000 is pivoted relative to the frame 1000. As shown, when the turntable 1130 is rotated away from the position shown in FIG. 29 (e.g., when the first panel 2000 is pivoted away from the pivot-ready position) the entry channel 1132 of the turntable 1130 becomes misaligned with each of the hub channel 1142 and track 1104. As shown in FIGS. 30 and 31, the turntable 1130 rotates in conjunction with a pivoting of the first panel 2000 from the pivot-ready position to the second opened position.

Additionally, in some examples, as the first panel 2000 is pivoted open relative to the frame 1000, the first rider 2012 becomes dislodged from the track 1102. As mentioned above, in some examples, dislodgment of the first rider 2012 from the track 1102 occurs as a result of the first rider 2012 transitioning into the rider release channel 1112 from the track 1102. The inclined configuration of the rider release channel 1112 is such that the rider release channel 1112 causes the first rider 2012 to deflect (e.g., translate toward the bottom rail 2004, away from the sill 1100. In various examples, with the first rider 2012 dislodged from the track 1102, the first panel 2000 is decoupled from the sill 1100 of the frame 1000 proximate the first stile 2006.

As shown in FIGS. 30 and 31, the second rider 2014 is maintained in a position between the hub 1140 and the rider chock 1134 as the turntable 1130 is rotated. In some examples, the hub 1140 operates to block or otherwise obstruct the second rider 2014 from exiting the rider chock 1134 when the turntable 1130 is rotated away from the configuration shown in FIG. 29. Maintaining the second rider 2014 in a position between the hub and the rider chock 1134 as the turntable 1130 is rotated operates to secure the first panel 2000 against becoming dislodged from the turntable 1130. Such a configuration also operates to secure the first panel 2000 against translation when the first panel 2000 is rotated.

It is to be appreciated that the first panel 2000 is operable to be returned to the pivot-ready position from the second opened position by pivoting the first panel 2000 relative to the frame 1000 until the first panel 2000 is realigned with the frame 1000. In some examples, when realigned with the frame 1000, the first rider 2012 is situated in the track 1102, and the entry channel 1132 of the turntable 1130 is aligned with each of the hub channel 1142 and track 1104, such that the first panel 2000 can be translated relative to the frame 1000 from the pivot-ready position to the fully opened position and/or the closed position, referred to above. In various examples, the first panel 2000 is recoupled with the frame 1000 proximate the first stile 2006, such as by reengaging the slider bar 1500 with the retractable bolt 2016, consistent with the discussion above.

In the pivot-ready position, the second rider 2014 is situated between the rider chock 1134 and the hub 1140, with the turntable 1130 oriented such that the entry channel 1132 to the turntable 1130 is aligned with each of the hub channel 1142 and track 1104. With the entry channel 1132 to the turntable 1130 aligned with each of the hub channel 1142 and track 1104 the second rider 2014 can translate freely through each of the entry channel 1132, the hub channel 1142, and track 1104.

FIGS. 32-41 shown an alternative configuration of a fenestration unit 20. The fenestration unit 20 is similar to the fenestration unit 10 described above with the exception of the features and configurations described below. The fenestration unit 20 includes a frame 6000, a first panel 7000, and a second panel 8000. Like the first panel 2000 described above, the first panel 7000 is configured to slide and pivot relative to the frame 6000. Moreover, like the second panel 3000 described above, the second panel 8000 is configured to pivot relative to the frame 6000. As such, the fenestration unit 20 is similar to the fenestration unit 10 in certain ways. However, unlike the fenestration unit 10, described above, the fenestration unit 20 does not require a pivot assembly to facilitate rotation of the first panel 7000 relative to the frame 6000. Instead, as described in greater detail below, the first panel 7000 is configured to pivot about one or more riders of the first panel 7000. In some examples, the fenestration unit 20 includes one or more rider catch assemblies that operate to capture the first panel 7000 such that the first panel 7000 can be pivoted relative to the frame 6000 about the one or more riders of the first panel 7000. In some examples, the one or more rider catch assemblies operate to constrain the first panel 7000 against translation relative to the frame 6000 with the first panel 7000 is pivoted relative to the frame 6000.

Figure 32:
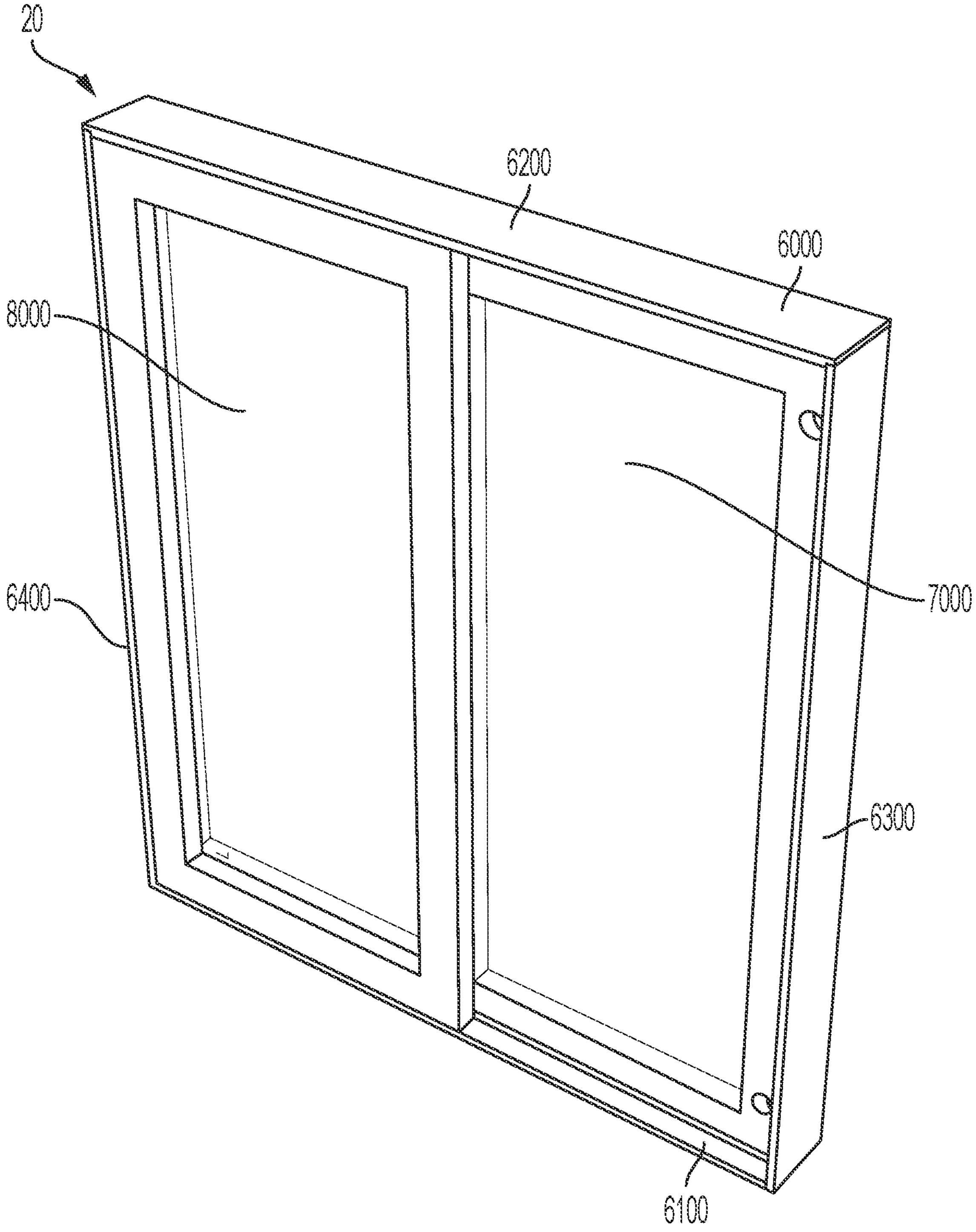
FIG. 32 shows another fenestration unit in a closed state, according to some examples.
Figure 33:
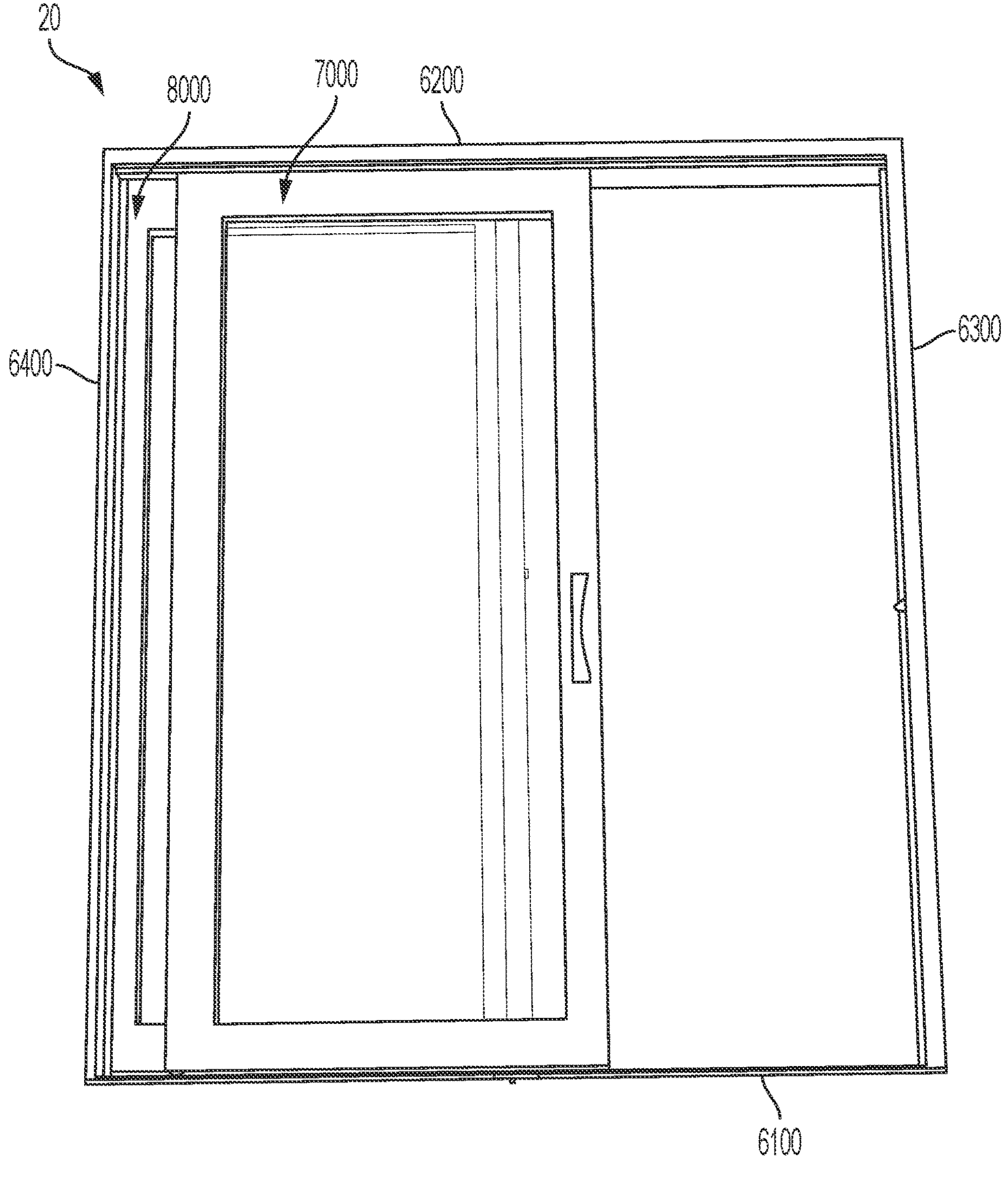
FIG. 33 shows the fenestration unit of FIG. 32 in a pivot-ready position, according to some examples.
Figure 34:
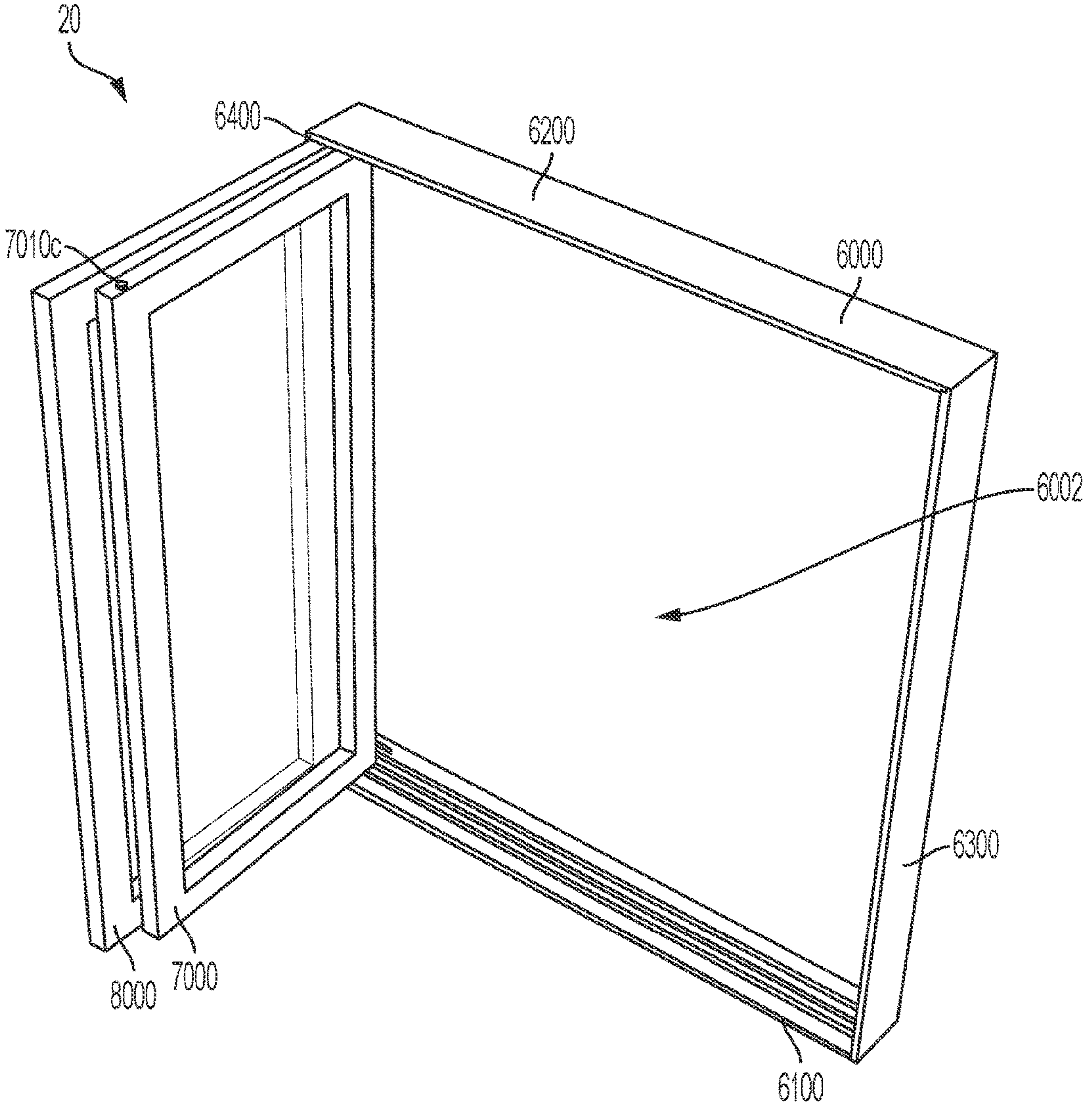
FIG. 34 shows the fenestration unit of FIG. 32 in an open position, according to some examples.
Figure 35:
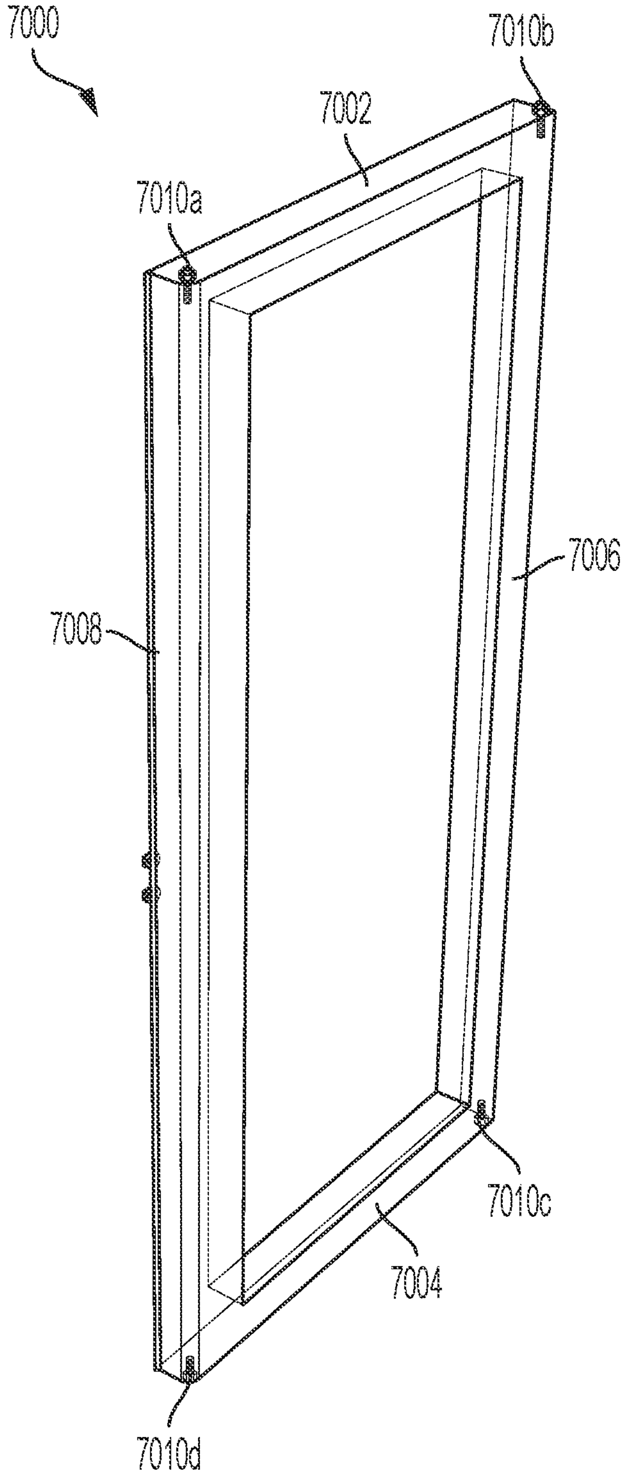
FIG. 35 shows a first panel of the fenestration unit of FIG. 32, according to some examples.

The fenestration unit 20 is shown in a closed configuration in FIG. 32, in a pivot-ready configuration in FIG. 33, and is an open configuration in FIG. 34. In the closed configuration, the first and second panels 7000 and 8000 are substantially parallel (e.g., differ by less than 10 degrees) to each other and/or to the frame 6000, such as to the sill 6100 and the head 6200. The first panel 7000 and the second panel 8000 may be offset relative to one another, as mentioned above, such that the first panel 7000 is closer to the interior space than to the exterior space compared to the second panel 8000. Alternatively, the first panel 7000 and the second panel 8000 may be offset relative to one another such that the first panel 7000 is closer to the exterior space than to the interior space compared to the second panel 8000.

In some examples, when the fenestration unit 20 is in the closed configuration, the frame opening, which is the region defined between the sill 6100, the head 6200, and the first and second jambs 6300 and 6400, is at least substantially blocked or otherwise obstructed by the first and second panels 7000 and 8000, as those of skill will appreciated. As such, when in the closed configuration, the fenestration unit 20 operates to separate the exterior space and the interior space. It is to be appreciated that while the fenestration units described herein are referred to in conjunction with an interior and an exterior space, the fenestration units may be configured to separate first and second rooms of a structure.

When the fenestration unit 20 is in the closed configuration, the first stile 7006 of the first panel 7000 is proximate (e.g., in or close to actual contact with) the first jamb 6300 of the frame 6000. Additionally, the second stile 8008 of the second panel 8000 is proximate (e.g., in or close to actual contact with) the second jamb 6400. Additionally, as shown, second stile 7008 of the first panel 7000 is proximate (e.g., in or close to actual contact with) the first stile 8006 of the second panel 8000. In some examples, when the fenestration unit 20 is in the closed configuration, the first and second panels 7000 and 8000 may partially overlap one another such that the second stile 7008 of the first panel 7000 and the first stile 8006 of the second panel 8000 partially overlap one another, as shown in FIG. 32.

In some embodiments, such a parallel relationship between the first panel 7000, second panel 8000, and the frame 6000 is maintained in the closed position (e.g., as in FIG. 32) and in the pivot-ready position (e.g., as in FIG. 33). When the fenestration unit 20 is in the pivot-ready position, the first panel 7000 is transitioned to substantially (e.g., more than 80%) overlap with the second panel 8000 such that an opening is defined between the sill 6100, the head 6200, the first jamb 6300 and the first stile 7006 of the first panel 7000, where the opening is approximately half (e.g., 40% to 60%) of the frame opening defined between the sill 6100, the head 6200, and the first and second jambs 6300 and 6400.

As shown in FIG. 34, in the open configuration, and like the fenestration unit 10, the first and second panels 7000 and 8000 are pivoted open to define an opening 6002, which is larger than the opening defined in the pivot-ready configuration and smaller than the opening defined by the frame 6000. In some examples, the opening 6002 is approximately 70% or more of the opening defined by the frame 6000. As similarly discussed above for the fenestration unit 10, the opening 6002 is larger than an opening resulting from the first panel 7000 being translated to a pivot-ready position, but not pivoted open. In the open position, the first and second panels 7000 and 8000 are positioned (e.g., rotatably or pivotally) to extend outward or otherwise away from the frame 6000. In some examples, one or more of the first and second panels 7000 and 8000 may extend away from the frame 6000 in the open configuration at an of 90 degrees plus-or-minus (±) 45 degrees. As shown in FIG. 34, for example, the first and second panels 7000 and 8000 each extend substantially perpendicular (e.g., 90 degrees plus-or-minus 10 degrees) to the frame 6000.

In the illustrated example of FIG. 34, in the open configuration, the first panel 7000 and the second panel 8000 are positioned proximate the second jamb 6400 in a substantially side-by-side arrangement. Alternative arrangements of the first and second panels 7000 and 8000 in the open configuration, however, are also acceptable. For instance, in some examples, the first and second panels 7000 and 8000 may be positioned apart from each other, such as a first one of the first and second panels 7000 and 8000 positioned proximate the first jamb 6300 and the other of the first and second panels 7000 and 8000 positioned proximate the second jamb 6400. In some embodiments, the first and second panels 7000 and 8000 may face or otherwise extend away from the frame 6000 in the open configuration in different or opposing directions (e.g., inwardly toward an interior and outwardly toward an exterior).

The second panel 8000 is similar to the second panel 3000, discussed above. As shown in FIG. 34, the first panel 7000 includes a top rail 7002, a bottom rail 7004, a first stile 7006, and a second stile 7008, the combination of which define a frame of the first panel 7000. In various examples, the first panel 7000 is therefore similar to the first panel 2000, discussed above, but with some exceptions. For instance, the first panel 7000 includes a plurality of riders, such as riders 7010*a*, 7010*b*, 7010*c*, and 7010*d*. As shown, riders 7010*a* and 7010*b* are situated opposite one another along a top of the first panel 7000. The rider 7010*a*, for example, may be situated at a top of the second stile 7008 or may be situated along the top rail 7002 proximate the second stile 7008. Similarly, the rider 7010*b*, for example, may be situated at a top of the first stile 7006 or may be situated along the top rail 7002 proximate the first stile 7006. Likewise, as shown, riders 7010*c* and 7010*d* are situated opposite one another along a bottom of the first panel 7000. The rider 7010*c*, for example, may be situated at a bottom of the first stile 7006 or may be situated along the bottom rail 7004 proximate the first stile 7006. Similarly, the rider 7010*d*, for example, may be situated at a bottom of the second stile 7008 or may be situated along the bottom rail 7004 proximate the second stile 7008.

In some examples, as discussed further below, the plurality of riders 7010*a-d* are operable to translate within the plurality of tracks of the frame 6000, and thus operate to facilitate translation of the first panel 7000 within the frame 6000. In some examples, one or more of the plurality of riders 7010*a-d* are configured such that they can be actuated between retracted and extended positions. As explained further below, such a configuration provides that one or more of the plurality of riders 7010*a-d* can be retracted such that the first panel 7000 can be decoupled from the tracks of the frame 6000 such that the first panel 7000 can be pivoted relative to the frame 6000.

As shown in FIGS. 32 to 34, the frame 6000 includes a sill 6100, a head 6200, a first jamb 6300, and a second jamb 6400. The frame 6000 is therefore similar to the frame 1000 described above with the exception of those features described in greater detail below.

Figure 36:
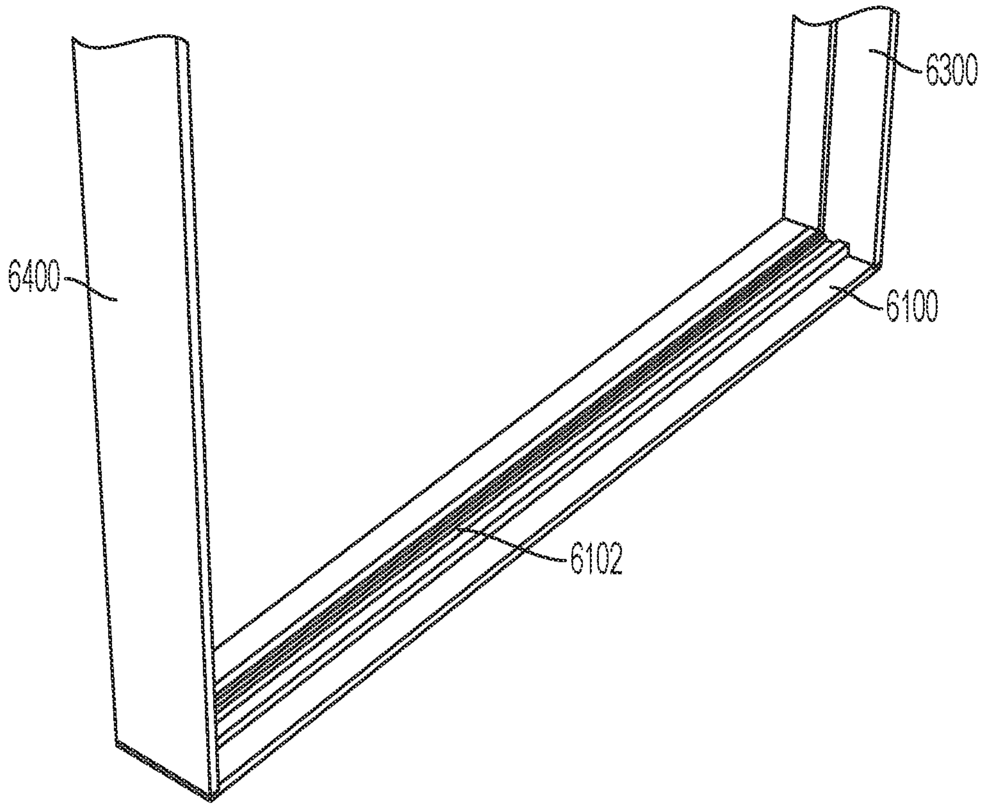
FIG. 36 shows a sill of a frame of the fenestration unit of FIG. 32, according to some examples.

As shown in FIG. 36, the sill 6100 defines one or more tracks 6102 configured to receive the first panel 7000 (e.g., such as riders 7010*c* and 7010*d* of the first panel 7000) such that the first panel 7000 is operable to translate or be translated across the frame 6000 between the first and second jambs 6300 and 6400, such as between closed and pivot-ready configurations. The one or more tracks 6102 may extend a portion of the width, or alternatively the entire width, of the sill 6100. For instance, in some examples, the one or more tracks 6102 extend from the first jamb 6300 to the second jamb 6400. The one or more tracks 6102 may be substantially linear and/or parallel to the sill 6100.

Figure 37:
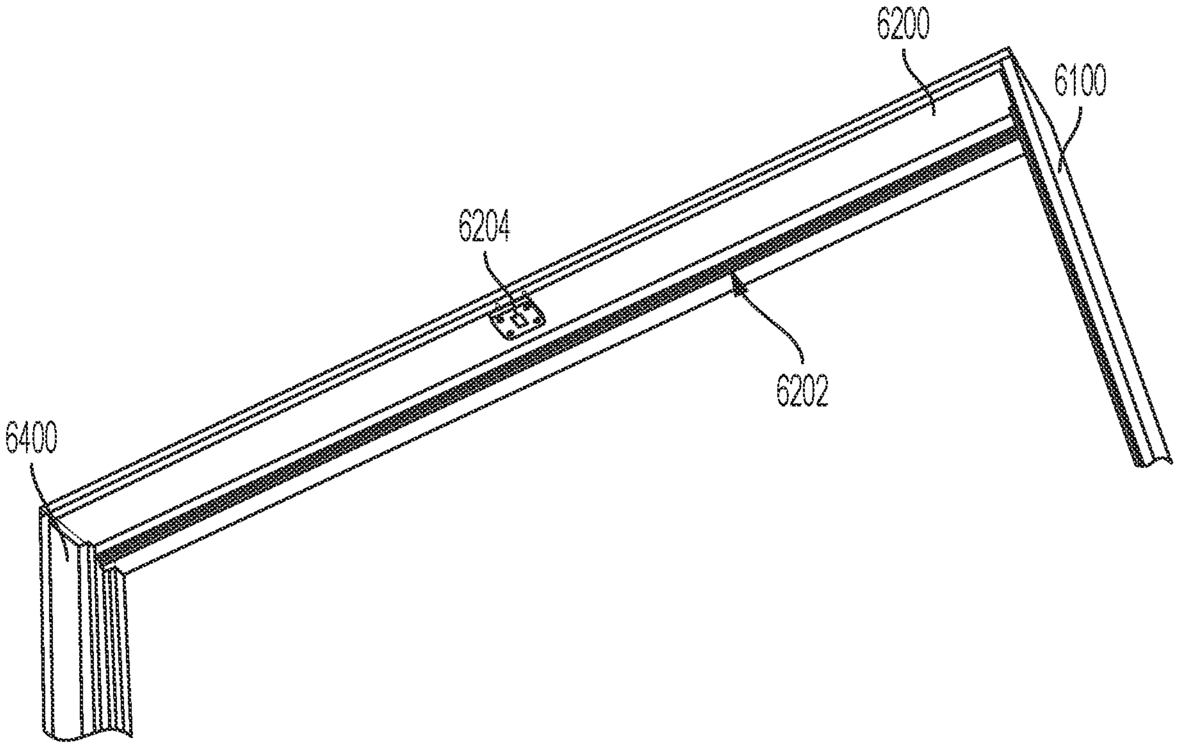
FIG. 37 shows a head of the frame of the fenestration unit of FIG. 32, including a head, according to some examples.

As shown in FIG. 37, the head 6200 defines one or more tracks 6202 configured to receive the first panel 7000 (e.g., such as rides 7010*a* and 7010*b* of the first panel 7000) such that the first panel 7000 is operable to translate or be translated across the frame 6000 between the first and second jambs 6300 and 6400, such as between closed and pivot-ready configurations. The one or more tracks 6202 may extend a portion of the width, or alternatively the entire width, of the head 6200. For instance, in some examples, the one or more tracks 6202 extend from the first jamb 6300 to the second jamb 6400. The one or more tracks 6202 may be substantially linear and/or parallel to the head 6200. In some embodiments, as similarly described above with regard to head 1200, the head 6200 may include a strike plate 6204 configured to releasably secure the second panel 8000 to the head 6200, such that the second panel 8000 can be released from the strike plate 6204 of the head 6200 to pivot relative to the frame 6000 (e.g., as similarly described and illustrated above with respect to the strike plate 1202 and the second panel 3000).

Figure 38:
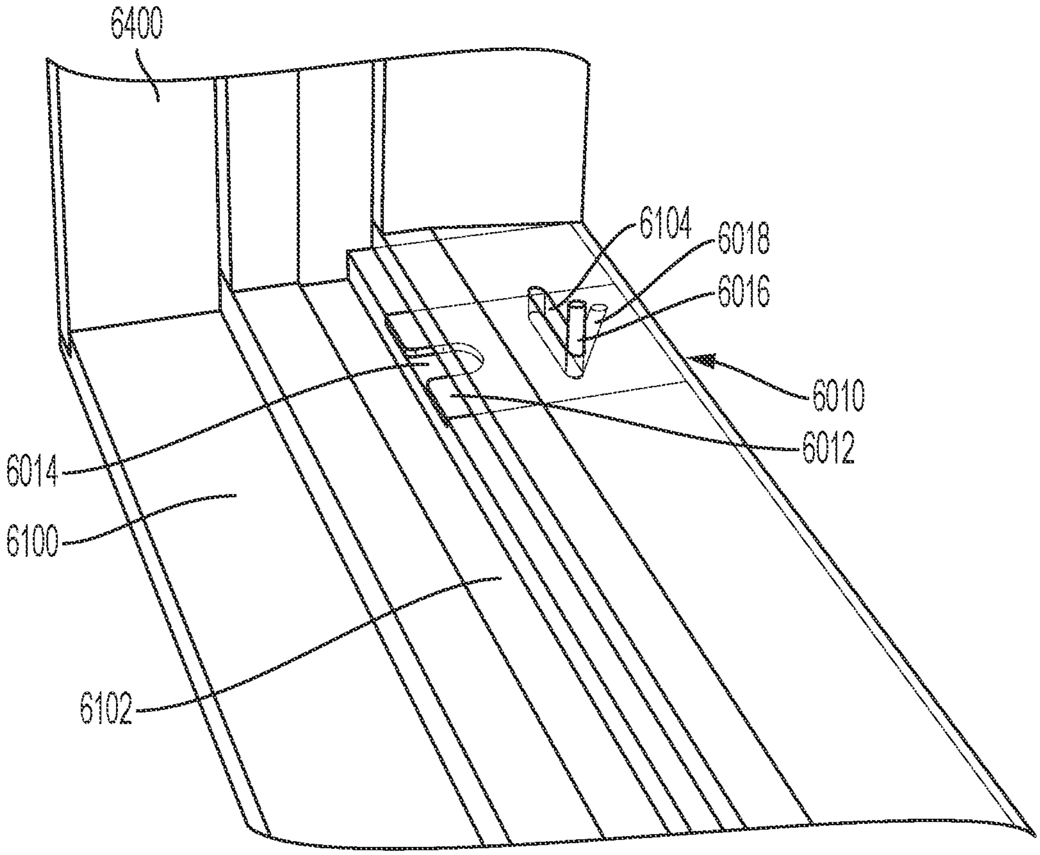
FIG. 38 shows a detailed view of the sill of the frame with various components removed or shown transparently to illustrate a rider catch assembly of the fenestration unit of FIG. 32 in a retracted position, according to some examples.

In various examples, the frame 6000 includes one or more rider catch assemblies, which are elements of the fenestration unit 20 that are operable to selectively capture the first panel 7000 against translation relative to the frame 6000. The rider catch assemblies may be situated in one or more of the sill 6100 and the head 6200. For example, as shown in FIG. 38, the sill 6100 includes a first rider catch assembly 6010. The first rider catch assembly 6010 is an element of the fenestration unit 20 that is operable to selectively capture the first panel 7000 against translation relative to the sill 6100 of the frame 6000. As shown in FIG. 38, the first rider catch assembly 6010 is situated along the sill 6100 proximate the second jamb 6400 of the frame 6000. In some examples, the first rider catch assembly 6010 is offset from the second jamb 6400 to accommodate the second panel 8000, such that the first and second panels 7000 and 8000 can be pivoted open proximate to one another, as shown in FIG. 34.

In various examples, the first rider catch assembly 6010 includes a rider catch 6012, which is a component of the first rider catch assembly 6010 that is configured to interface (e.g., engage, receive, keep, and/or secure) with the first panel 7000. In some examples, the rider catch 6012 is configured to interface with a rider (e.g., rider 7010*d*) of the first panel 7000. In some examples, the rider catch 6012 includes a rider receptacle 6014 that is configured to accommodate the rider of the first panel 7000. As shown in FIG. 38, the rider receptacle 6014 is a complimentary shape to that of the rider 7010*d*.

Figure 39:
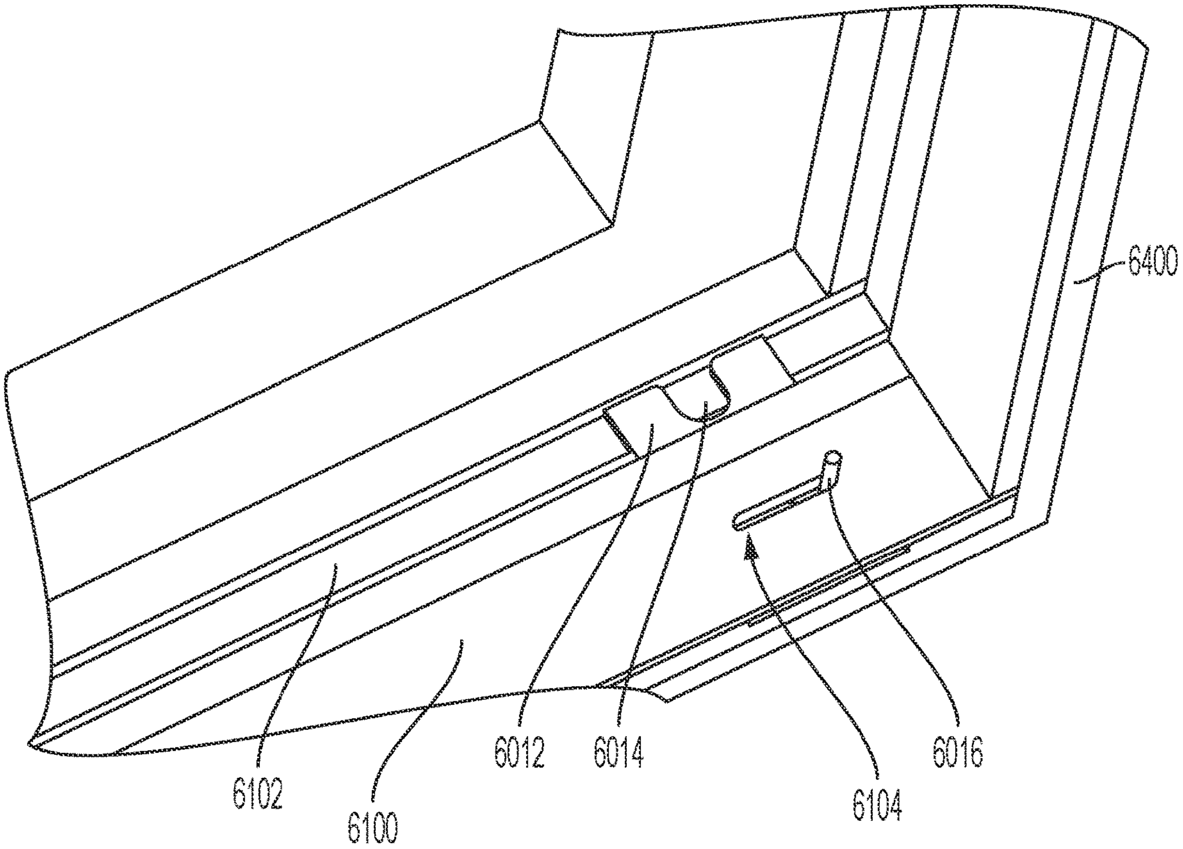
FIG. 39 shows the rider catch assembly of FIG. 38 in an extended position, according to some examples.

In various examples, the first rider catch assembly 6010 is configured such that the rider catch 6012 can be actuated relative to the frame 6000 and the first panel 7000, such as between a retracted or first position and an extended or second position. Such a configuration provides that the rider catch 6012 can be selectively extended and retracted to selectively capture and release the first panel 7000. The rider catch 6012 is shown in FIG. 38 in the retracted position such that the rider catch 6012 does not interfere with any rider of the first panel 7000 such that the first panel 7000 can freely translate within the track 6202. Conversely, the rider catch 6012 is shown in FIG. 39 in the extended position such that the rider catch 6012 obstructs the track 6202. It is to be appreciated that, the first and second panels 7000 and 8000 are removed from FIG. 39. As such, when the rider catch 6012 is extended as shown in FIG. 39 with the first panel 7000 in the pivot ready position, the rider 7010*d* of the first panel 7000 is captured within the rider receptacle 6014. When the rider 7010*d* is captured within the rider receptacle 6014 the first panel 7000 is secured against translation relative to the frame 6000.

In various examples, the rider catch 6012 is configured to be actuated via manipulation of a rider catch control member 6016 (also referred to herein as a rider catch control mechanism 6016). In the illustrated example shown in FIG. 38, the rider catch control member 6016 extends through a rider catch cutout 6018 of the rider catch 6012. As such, the rider catch control member 6016 is operable to slide relative to the rider catch cutout 6018. In various examples, the rider catch control member 6016 extends through a rider catch cutout 6104 of the sill 6100. In some embodiments, the rider catch cutout 6104 is defined by the sill 6100 near the second jamb 6400. The rider catch cutouts 6018 and 6104 in the illustrated example are linear and angled in respect to each other, but alternative shapes, including the opposite configuration as well as nonlinear arrangements, are also contemplated. Additionally, any of a variety of actuation mechanisms is contemplated, including remote or automated actuation mechanisms, including buttons, mechanical switches, magnetic switches, electrical switches, or other elements for achieving actuation of the rider catch 6012.

In operation, those of skill will be appreciate that as the rider catch control mechanism 6016, as shown in FIG. 38, is actuated toward the second jamb 6400, the rider catch control mechanism 6016 engages the rider catch cutout 6018 of the rider catch 6012, thereby applying a force to the rider catch 6012 directed toward the track 6102. This applied force causes the rider catch 6012 to translate toward the track 6102 and the extended configuration shown in FIG. 39. Conversely, for the configuration shown in FIGS. 38 and 39 and when the rider catch 6012 is in the extended configuration, actuating the rider catch control mechanism 6016 away from the second jamb 6400 causes the rider catch control mechanism 6016 to engage the rider catch cutout 6018 to cause the rider catch 6012 to translate away from the track 6102 toward the retracted configuration shown in FIG. 38.

Figure 40:
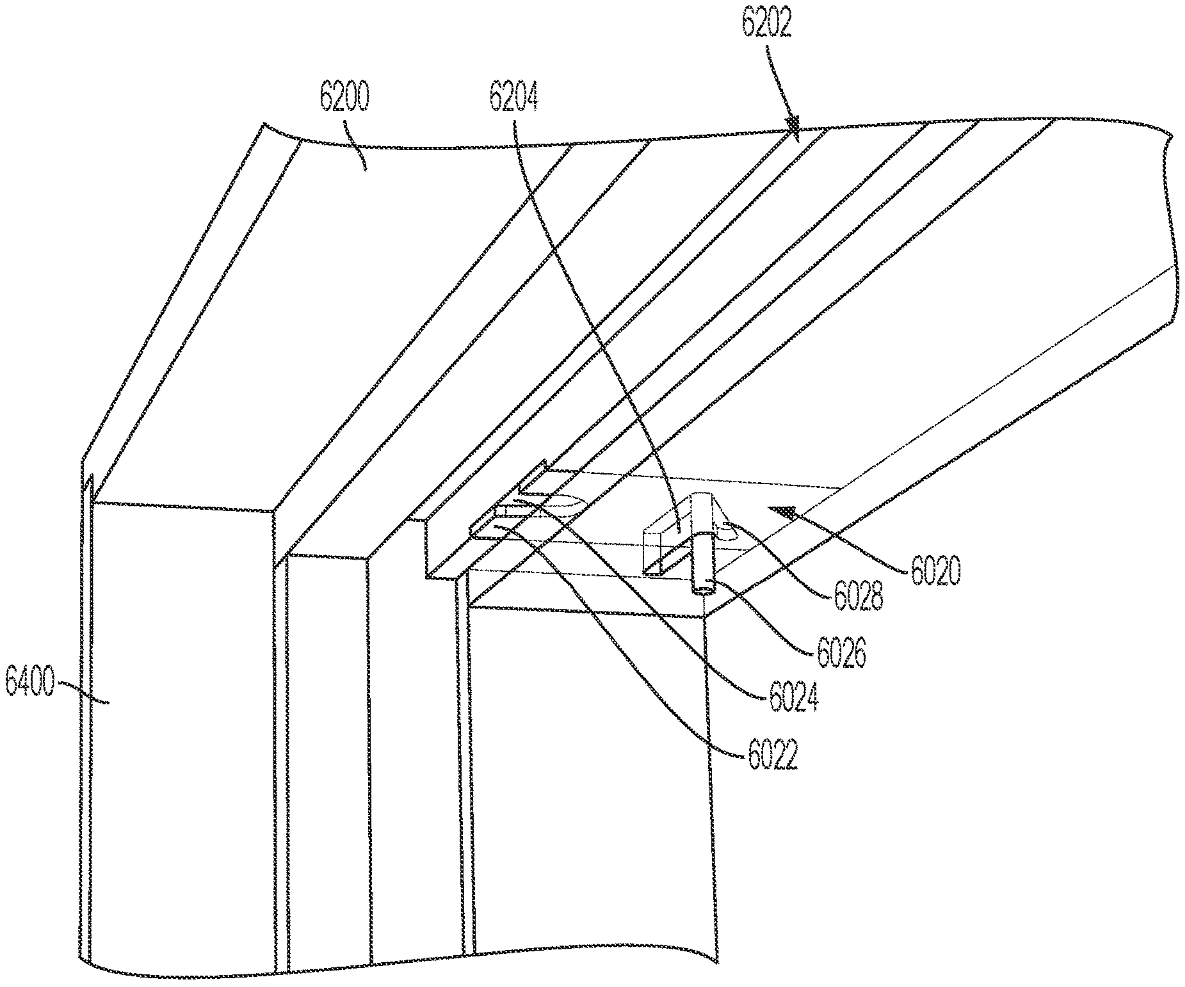
FIG. 40 shows a detailed view of the head of the frame with various components removed or shown transparently to illustrate a rider catch assembly of the fenestration unit of FIG. 32 in a retracted position, according to some examples.

FIG. 40 shows a second rider catch assembly 6020 of the fenestration unit 20, according to some examples. The second rider catch assembly 6020 is an element of the fenestration unit 20 that is operable to selectively capture the first panel 7000 against translation relative to the head 6200 of the frame 6000. As shown, the second rider catch assembly 6020 is situated within the head 6200. The second rider catch assembly 6020 is the same as the first rider catch assembly 6010, and thus includes a rider catch 6022, a rider receptacle 6024, a rider catch control mechanism 6026, and a rider catch cutout 6028. The rider catch 6022 of the second rider catch assembly 6020 is thus actuatable as similarly discussed above with respect to the first rider catch assembly 6010. As shown in FIG. 40, the second rider catch assembly 6020 is situated along the head 6200 proximate the second jamb 6400 of the frame 6000. In some examples, the second rider catch assembly 6020 is offset from the second jamb 6400 the commensurate with the first rider catch assembly 6010 such that the first and second rider catch assemblies 6010 and 6020 are aligned.

Figure 41:
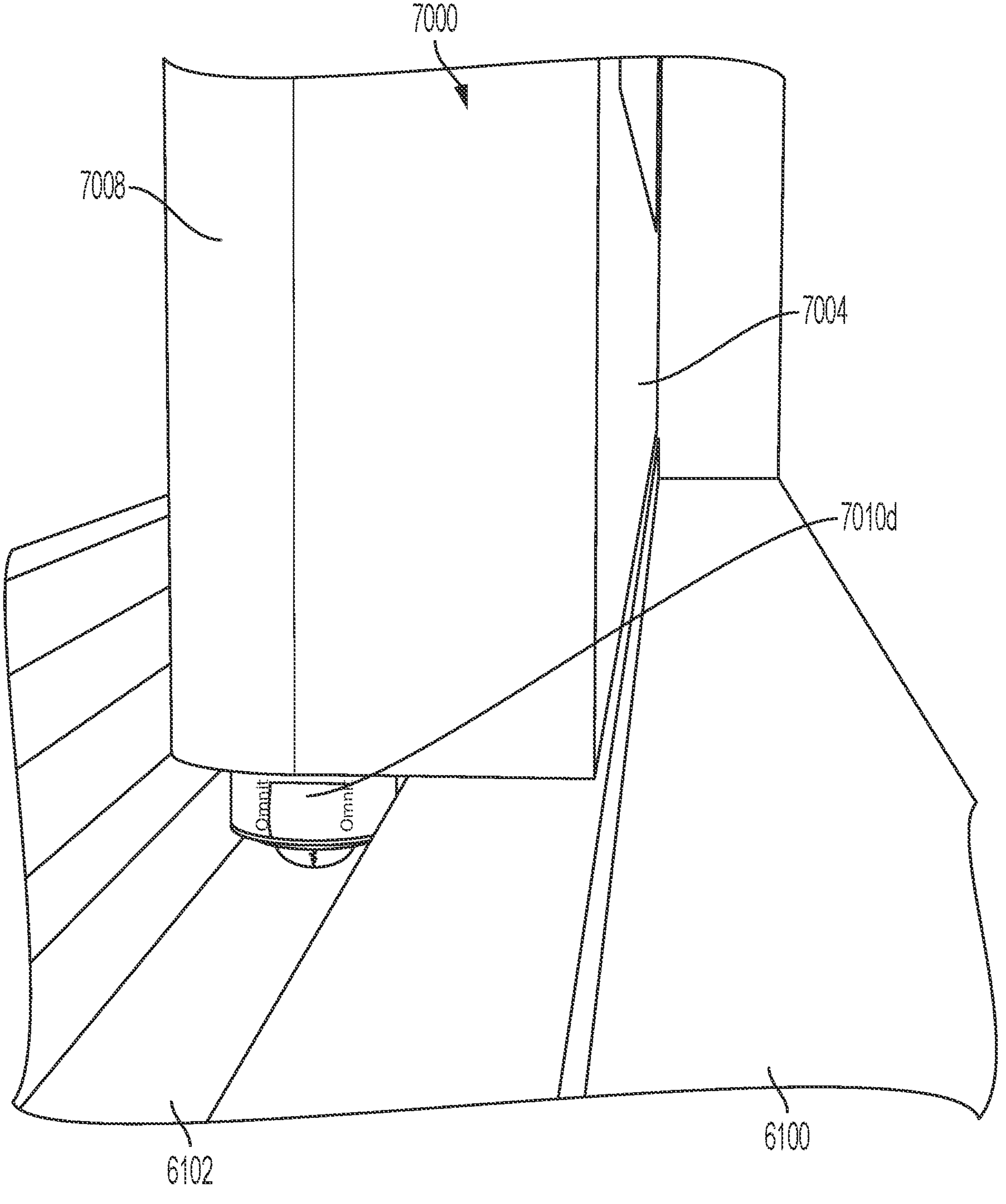
FIG. 41 shows a rider of the first panel received by the sill of the fenestration unit of FIG. 32, according to some examples.

As mentioned above, in various examples, the plurality of riders 7010*a-d* are configured to be received by one or more tracks of the frame 6000. FIG. 41 shows the sill 6100 of the fenestration unit 20 with the rider 7010*d* of the first panel 7000 received within the track 6102 of the sill 6100. Each of the plurality of riders 7010*a-d* is optionally similar, or may differ as desired. In various embodiments, one or more of the plurality of riders 7101*a-d* include a bearing, a wheel, a pin, a bolt, a unidirectional roller bearing, a multi-directional roller bearing, and/or an omnidirectional roller bearing.

Figure 42:
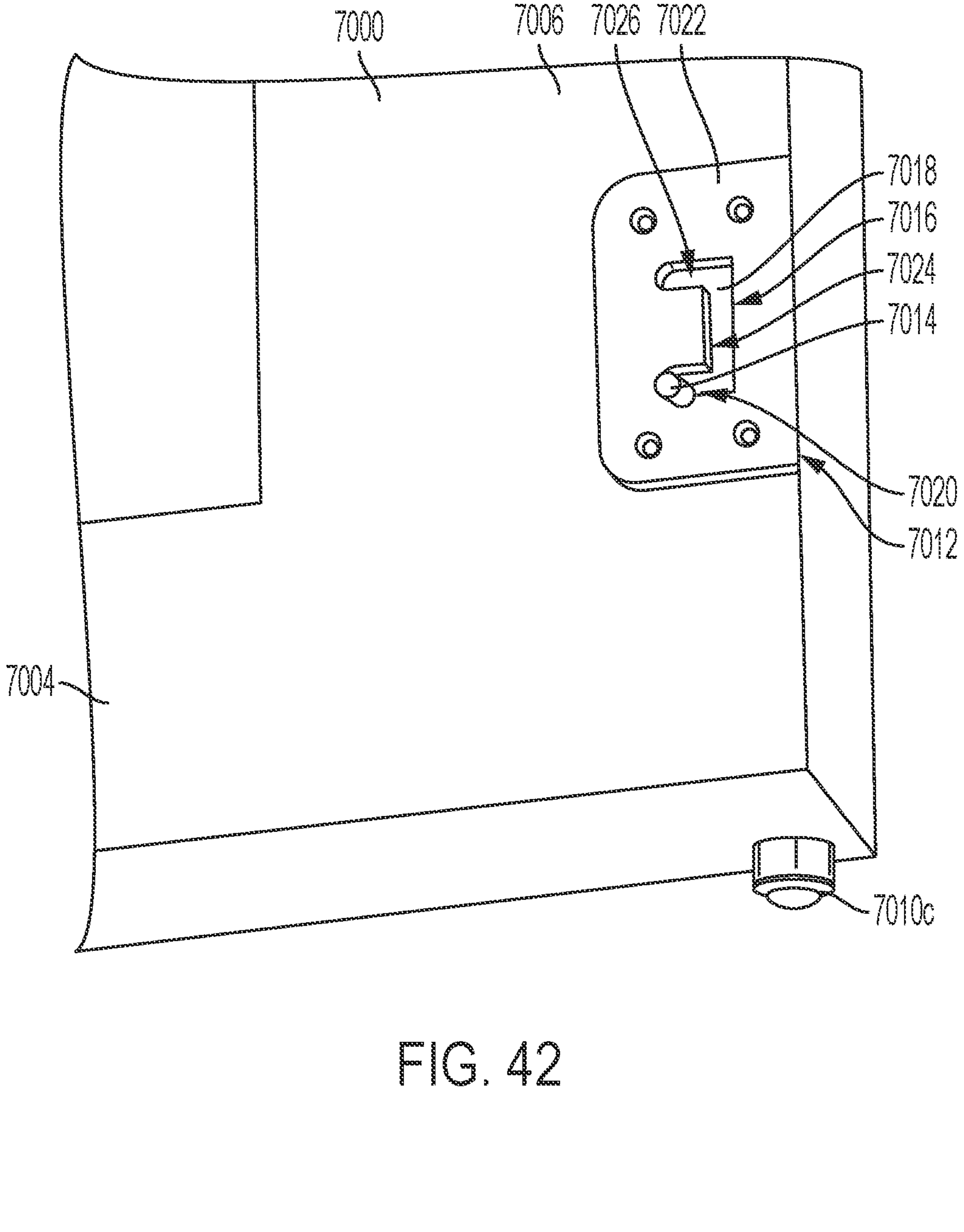
FIG. 42 shows a rider of the first panel coupled to a retraction assembly, according to some examples.

In various embodiments, riders 7010*b* and 7010*c* are substantially similar and thus are described collectively with regard to rider 7010*b*. In particular, riders 7010*b* and 7010*c* are configured such that they are retractable relative to the frame of the first panel 7000. As such, riders 7010*b* and 7010*c* can be retracted to decouple the first panel 7000 from the frame 6000 such that the first panel 7000 can be pivoted relative to the frame 6000. FIG. 42 shows rider 7010*c* extending from the frame 6000, where the frame 6000 includes a first retraction assembly 7012 that operably coupled to the rider 7010*c* such that the rider 7010*c* can be extended and retracted relative to the frame 6000, according to some examples. In some embodiments, a second retraction assembly (not shown) is substantially similar to the first retraction assembly 7012, and is coupled to rider 7010*b* in a substantially similar manner to how the first retraction assembly 7012 is coupled to rider 7010*b*.

As shown in FIG. 42, the first retraction assembly 7012 includes a rider control member 7014, which is operably coupled to rider 7010*b* such that the rider control member 7014 can be actuated (e.g., by a user) to cause the rider 7010*b* to transition between an extended or first position (e.g., as shown in FIG. 42) and a retracted or second position. Rider 7010*c* is shown in the retracted or second position in FIG. 34, and it is to be appreciated that rider

7010*c* is similarly configured when transitioned to the retracted or second position. In various embodiments, the rider control member 7014 is slideably received in a rider control cutout 7016. The rider control cutout 7016 defines a path 7018 that is traversable by the rider control member 7014. The path 7018 of the rider control cutout 7016 is shown in FIG. 42 as being a reverse "C" shape, although other paths are contemplated. Accordingly, the illustrated example shown in FIG. 42 is not intended to be limiting, but may include any suitable path operable to be traversed by the rider control member 7014 to cause the rider 7010*c* to be transitioned between the expanded and retracted positions. In some examples, the path 7018 includes a first portion 7020 associated with the rider 7010*c* being in the extended position, and a second portion 7022 associated with the rider 7010*c* being in the retracted position. In the illustrated example shown in FIG. 42, the path 7018 includes a transition portion 7026 linking the first and second portions 7020 and 7022. As shown, the first and second portions 7020 and 7022 are angled relative to the transition portion 7026. It is to be appreciated that while the first and second portions 7020 and 7022 extend substantially perpendicular to the transition portion 7026, the first and second portions 7020 and 7022 may not be angled relative to the transition portion, or may alternatively be angled relative to the transition portion at any suitable angle, provided that the rider 7010*c* is selectively securable at each of the extended and retracted positions. The rider control cutout 7016 may be formed directly in the first panel 7000 (e.g., such as in the first stile 7006), or may alternatively be formed in a separate housing 7028 that is received by and/or secured to the first panel 7000.

In various embodiments, rider 7010*c* is configured to slidably couple the first panel 7000 to the sill 6100 proximate the first stile 7006 when the rider 7010*c* is in the extended position. Conversely, when the rider 7010*c* is in the retracted position, the rider 7010*c* is decoupled from the sill 6100 such that the first panel 7000 is decoupled from the sill 6100 proximate the first stile 7006. Similarly, rider 7010*b* is configured to slidably couple the first panel 7000 to the head 6200 proximate the first stile 7006 when the rider 7010*b* is in the extended position. Conversely, when the rider 7010*b* is in the retracted position, the rider 7010*b* is decoupled from the head 6200 such that the first panel 7000 is decoupled from the head 6200 proximate the first stile 7006.

With the riders 7010*b* and 7010*c* in the retracted position, the first panel 7000 is decoupled from the frame 6000 (e.g., the sill 6100 and the head 6200) proximate the first stile 7006 such that the first panel 7000 can be pivoted relative to the frame 6000. FIG. 34 shows the first panel 7000 in a pivoted-open position as a result of the first panel 7000 being decoupled from the frame 6000 proximate the first stile 7006. As shown, the first panel 7000 is pivoted about the second stile 7008. In various examples, the first panel 7000 is pivoted about the riders 7010*a* and 7010*d*, which are configured to remain coupled with the frame 6000 (e.g., the sill 6100 and the head 6200) while the riders 7010*b* and 7010*c* are decoupled from the frame 6000.

Figure 43:
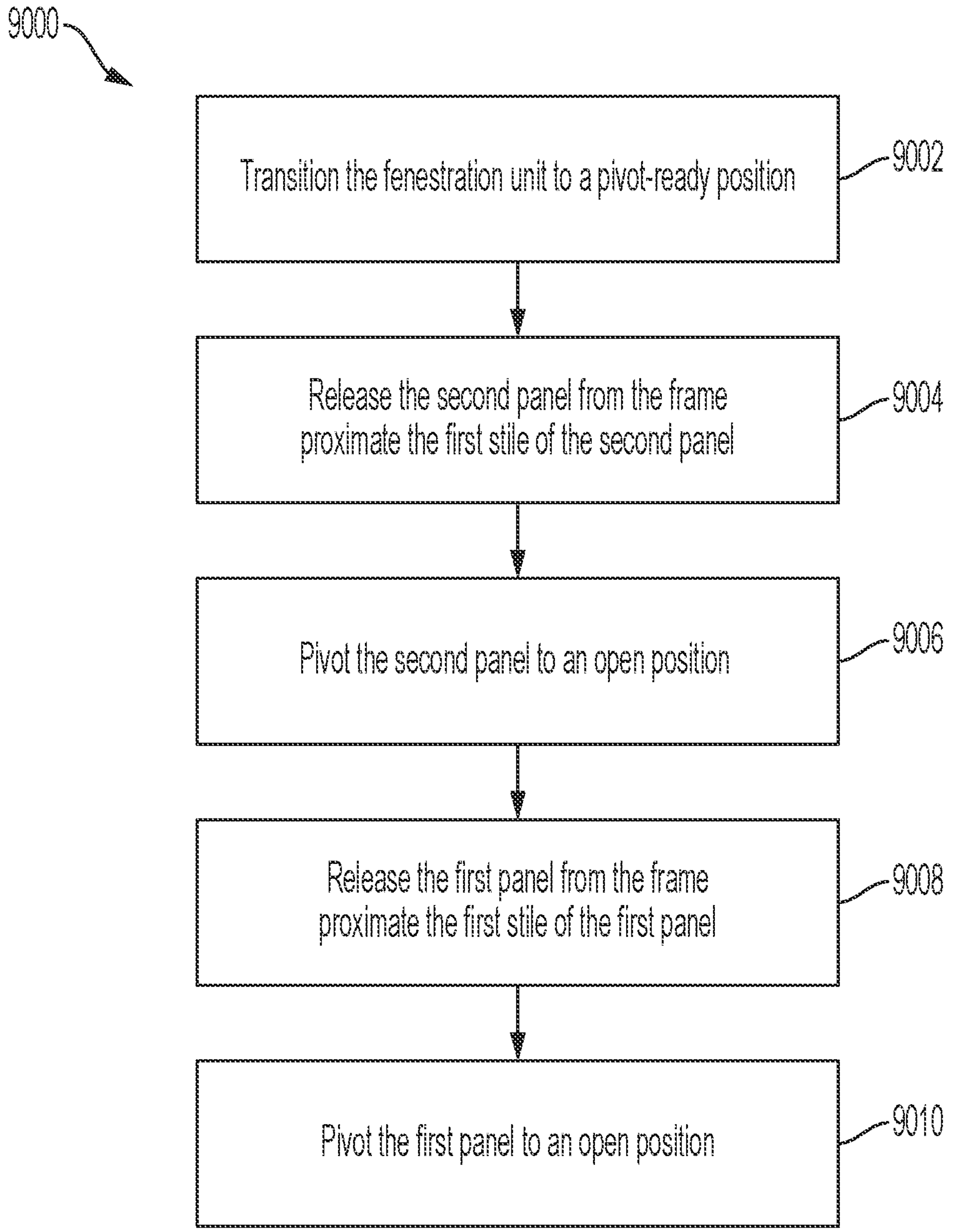
FIG. 43 shows an illustrative method for operating a fenestration unit, according to some examples.

FIG. 43 depicts an illustrative method 9000 for operating a fenestration unit, such as fenestration unit 20, according to some examples. The method 9000 includes step 9002, which includes transitioning the fenestration unit to a pivot-ready position. In various examples, the fenestration unit may be transitioned to the pivot-ready position (e.g., FIG. 33) from a closed position (e.g., FIG. 32), or some position between the pivot-ready position (e.g., FIG. 33) and closed position (e.g., FIG. 32), or from the open position (e.g., FIG. 34), or from some position between the pivot-ready (e.g., FIG. 33) position and the open position (e.g., FIG. 34). In various embodiments, when the fenestration unit 20 is in the pivot-ready position, the second stiles 7008 and 8008 of the first and second panels 7000 and 8000 proximate the second jamb 6400. In various examples, the second stile 7008 of the first panel 7000 is more proximate the second jamb 6400 when the first panel 7000 is in the pivot-ready position than when the first panel 7000 is in the closed position. In various embodiments, when the first panel 7000 is in the pivot-ready position, the first panel 7000 can be either pivoted relative to the frame 6000 toward the open configuration, or can alternatively be translated relative to the frame 6000 toward the closed configuration.

The method 9000 further includes step 9004, which includes releasing the second panel 8000 from the frame 6000 proximate the first stile 8006 of the second panel 8000. Releasing the second panel 8000 from the frame 6000 is accomplished in accordance with the discussion above for releasing the second panel 3000 from the frame 1000 at step 5002 of method 5000 (e.g., FIG. 25). At step 9006, the second panel 8000 is pivoted to an open position. Pivoting the second panel 8000 to an open position is accomplished in accordance with the discussion above for pivoting the second panel 3000 to an open position at step 5004 of method 5000 (e.g., FIG. 25).

In various examples, the method 9000 further includes releasing the first panel 7000 from the frame 6000 proximate the first stile 7006 at step 9008. Releasing the first panel 7000 from the frame 6000 includes decoupling the first panel 7000 from the frame 6000 proximate the first stile 7006. In some examples, one or more rider control members are actuated to cause one or more of the riders (e.g., 7010*a-d*) to be retracted from the tracks 6102 and 6202 of the sill 6100 and the head 6200. For instance, in one example, the riders 7010*b* and 7010*c* are retracted from tracks 6102 and 6202 such that the first panel 7000 is decoupled from the sill 6100 and the head 6200 proximate the first stile 7006 of the first panel 7000.

In various examples, with the first panel 7000 decoupled from the frame 6000 proximate the first stile 7006, the first panel 7000, at step 9010, is operable to be pivoted open relative to the frame 6000 to transition the fenestration unit 20 to the open position (e.g., FIG. 34). In some embodiments, pivoting the first panel 7000 to the open position includes rotating the first panel 7000 about the second stile 7008 of the first panel 7000. In some examples, pivoting the first panel 7000 to the open position includes transitioning the first panel 7000 from being substantially parallel to the frame 6000 to being substantially perpendicular to the frame 6000.

With continued reference to FIG. 34, which shows the fenestration unit 20 in the open position, each of the first and second panels 7000 and 8000 are decoupled and released from the frame 6000 proximate their respective first stiles 7006 and 8006, while each of the first and second panels 7000 and 8000 remain pivotally coupled to the frame 6000 proximate their respective second stiles 7008 and 8008.

While the various examples and embodiment discussed above include second panels (e.g., 3000 and 8000) that are pivotally coupled to their respective frames (e.g., 1000 and 6000), in some examples, the second panels may be configured to pivot and translate relative to the frame in a manner similar to the first panels (e.g., 2000 and 7000). As such, the fenestration units may be configured such that the each of the first and second panels are operable to be translate and pivot relative to the frame.

In various embodiments, a method of assembling a fenestration unit (e.g., fenestration units 10 or 20) includes constructing a frame (e.g., frames 1000 and 6000), constructing a first panel (e.g., first panels 2000 and 7000), constructing a second panel (e.g., second panels 3000 and 8000), coupling the first panel to the frame, and coupling the second panel to the frame.

In some examples, constructing the frame includes fixedly coupling a sill (e.g., sills 1100 and 6100), a head (e.g., heads 1200 and 6200), a first jamb (e.g., first jambs 1300 and 6300), and a second jamb (e.g., second jambs 1400 and 6400). In various embodiments, constructing the frame includes coupling a first rider catch assembly (e.g., first rider catch assembly 6010) to the sill and coupling a second rider catch to the head. In some embodiments, constructing the frame includes forming one or more tracks in the sill (e.g., tracks 1102, 1104, and 6102), and forming one or more tracks in the head (e.g., track 6202 and slide track 1206). In some embodiments, constructing the frame includes providing one or more receptacles in one or more of the head and sill.

In certain examples, constructing the first panel includes coupling a plurality of riders, and optionally one or more retractable bolts, to the first panel such that the first panel is operable to be translated relative to the frame and such that the first panel is operable to be pivoted relative to the frame. In some examples, constructing the second panel includes coupling one or more retractable bolts to the second panel such that the second panel can be selectively decoupled from the frame proximate at least one of the first and second stiles of the second panel, such that the second panel is operable to be pivoted relative to the frame.

In some embodiments, coupling the first panel to the frame includes coupling the first panel to the frame such that the first panel is operable to be translated and pivoted relative to the frame. In some examples, coupling the first panel to the frame includes positioning a first rider and a second rider of the first panel into the one or more tracks of the sill. In some examples, coupling the first panel to the frame further includes slidingly coupling the first panel to the head. In certain embodiments, coupling the second panel to the frame includes coupling the second panel to the frame such that the second panel is operable to be at least pivoted relative to the frame.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A fenestration unit comprising:

a frame including a sill, a head opposite the sill, a first jamb, and a second jamb opposite the first jamb; and a first panel supported by the frame, the first panel including:

a first rider engaged to the first panel and to the sill, the first rider being actuatable such that a portion of the first panel is disengageable from the sill; and a second rider engaged to the first panel and to the sill;

wherein the first panel is operable to be translated laterally along the sill between the first and second jambs without pivoting relative to the frame, and wherein the first panel is operable to be pivoted relative to the frame while the second rider is engaged to the sill; and a turntable rotatably engaged to the sill of the frame and configured to rotate relative to the sill as the first panel is pivoted relative to the frame, wherein the turntable is part of a pivot assembly, the pivot assembly further comprising a hub having a hub channel configured to accommodate the second rider, the hub being fixed relative to the sill such that the turntable is operable to rotate relative to the hub and the hub channel.

2. The fenestration unit of claim 1, wherein the turntable is configured to receive the second rider of the first panel such that the second rider remains engaged to the sill while the first panel is pivoted relative to the frame.

3. The fenestration unit of claim 1, wherein an orientation of the second rider relative to the turntable is maintained while the first panel is pivoted relative to the frame.

4. The fenestration unit of claim 1, wherein the sill includes a strike plate, wherein the strike plate is configured to facilitate the disengagement of the first rider from the frame.

5. The fenestration unit of claim 1, further comprising a slider bar slideably engaged to the head and releasably engaged to the first panel.

6. The fenestration unit of claim 5, wherein the slider bar is configured to slide relative to the frame when engaged to the first panel, and wherein the slider bar is configured to fixedly engage to the frame when the first panel is released from the slider bar.

7. The fenestration unit of claim 5, wherein the first panel further includes a retractable bolt, and wherein the retractable bolt defines the releasable engagement between the first panel and the slider bar.

8. The fenestration unit of claim 1, wherein the first rider is one of a wheel, a unidirectional roller bearing, a multidirectional roller bearing, and an omnidirectional roller bearing.

9. The fenestration unit of claim 1, further comprising a catch in one or both of the head and the sill, each catch being transitionable between an extended configuration and a retracted configuration, wherein in the extended configuration, each catch is operable to secure the first panel against translation along the frame.

10. The fenestration unit of claim 9, wherein the catch is in the sill, and includes a rider receptacle that is configured to accommodate the second rider of the first panel.

11. The fenestration unit of claim 1, wherein the sill defines a first track portion configured to receive the first rider and a second track portion configured to receive the second rider.

12. The fenestration unit of claim 11, wherein the first and second tracks track portions are portions of the same track.

13. The fenestration unit of claim 1, further comprising a second panel supported by the frame, the second panel being releasably engaged to the sill such that the second panel is operable to pivot relative to the frame and relative to the first panel, wherein the first panel is operable to translate relative to the second panel without pivoting relative to the second panel.

* * * * *